(12) United States Patent
Pusateri et al.

(10) Patent No.: US 7,870,238 B2
(45) Date of Patent: Jan. 11, 2011

(54) VENDOR-INDEPENDENT NETWORK CONFIGURATION TOOL

(75) Inventors: Thomas J. Pusateri, Wake Forest, NC (US); Charles Keith Hubbard, Raleigh, NC (US)

(73) Assignee: !j Incorporated, Wake Forest, NC (US)

( * ) Notice: Subject to any disclaimer, the term of this patent is extended or adjusted under 35 U.S.C. 154(b) by 163 days.

(21) Appl. No.: 12/365,692

(22) Filed: Feb. 4, 2009

(65) Prior Publication Data
US 2009/0216867 A1 Aug. 27, 2009

Related U.S. Application Data

(60) Provisional application No. 61/029,139, filed on Feb. 15, 2008.

(51) Int. Cl.
*G06F 15/177* (2006.01)
(52) U.S. Cl. .................. 709/222; 709/217; 709/220; 709/223; 709/224; 709/227; 709/230; 709/238; 709/249; 370/230; 370/235; 370/389; 370/390
(58) Field of Classification Search .............. 709/217, 709/220, 223, 224, 222, 227, 230, 238, 249; 370/230, 235, 389, 390, 400, 401, 465–467, 370/392
See application file for complete search history.

(56) References Cited

U.S. PATENT DOCUMENTS 7,150,037 B2 * 12/2006 Wolf et al. .................. 726/6
7,457,853 B1 * 11/2008 Chari et al. ................. 709/220
2004/0117466 A1 * 6/2004 Bodin et al. ................ 709/222

OTHER PUBLICATIONS

D. Crockford, RFC 4627, entitled "The application/json Media Type for JavaScript Object Notation (JSON)," Network Working Group of the Internet Engineering Task Force (IETF), dated Jul. 2006, (10 pgs.), www.ietf.org/rfc/rfc4627.txt.

E. Guttman et al., RFC 2608, entitled "Service Location Protocol, Version 2," Network Working Group of the Internet Engineering Task Force (IETF), dated Jun. 1999, (51 pgs.), www.ietf.org/rfc/rfc2608.txt.

(Continued)

*Primary Examiner*—Wing F Chan
*Assistant Examiner*—Hitesh Patel
(74) *Attorney, Agent, or Firm*—Shumaker & Sieffert, P.A.

(57) ABSTRACT

Techniques are described for managing and configuring network devices from a plurality of vendors with a single network configuration tool. This vendor-independent network configuration tool may extract configuration information stored to devices from disparate vendors, and parse tags from extracted configuration information. Each tag defines a configuration property. The tool may further analyze the tags to determine relationships and present configuration information based primarily on the determined relationship and only secondarily on the devices. The tool may also perform analysis on the tags to detect one or more errors or configuration inconsistencies, as well as, update or change tags, which causes the tool to push any changes to the appropriate device. Furthermore, the tool by automatically share information related to the above described steps with other vendor-independent network configuration tools to more quickly propagate efficient extraction and updating techniques.

18 Claims, 17 Drawing Sheets

OTHER PUBLICATIONS

B. Aboba et al., RFC 3539, entitled "Authentication, Authorization and Accounting (AAA) Transport Profile," Network Working Group of the Internet Engineering Task Force (IETF), dated Jun. 2003, (39 pgs.), www.ietf.org/rfc/rfc3539.txt.

S. Farrell et al., RFC 2906, entitled "AAA Authorization Requirements," Network Working Group of the Internet Engineering Task Force (IETF), dated Aug. 2000, (22 pgs.), wwvv.ietf.org/rfc/rfc2906.txt.

J. Vollbrecht et al., RFC 2905, entitled "AAA Authorization Application Examples," Network Working Group of the Internet Engineering Task Force (IETF), dated Aug. 2000, (50 pgs.), www.ietf.org/rfc/rfc2905.txt.

J. Vollbrecht et al., RFC 2904, entitled "AAA Authorization Framework", Network Working Group of the Internet Engineering Task Force (IETF), dated Aug. 2000, (33 pgs.), www.ietf.org/rfc/rfc2904.txt.

C. de Laat et al., RFC 2903, entitled "Generic AAA Architecture," Network Group of the Internet Engineering Task Force (IETF), dated Aug. 2000, (25 pgs.), www.ietf.org/rfc/rfc2903.txt.

* cited by examiner

VENDOR-INDEPENDENT NETWORK CONFIGURATION TOOL

This application claims the benefit of U.S. Provisional Application Ser. No. 61/029,139, filed Feb. 15, 2008, the entire content of which is incorporated herein by reference.

TECHNICAL FIELD

The invention relates to computer networks and, more particularly, to managing and configuring devices within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. Commonly, these computing devices interact with one another to facilitate the transfer of packets across the network. Example devices include firewalls, routers, acceleration devices, load balancers, wireless access points, virtual private network (VPN) appliances, Dynamic Host Configuration Protocol (DHCP) servers, Domain Name System (DNS) servers, Digital Subscriber Line Access Multiplexers (DSLAMs), border gateway controllers, gateways, and application layer gateways.

To configure these devices, the various vendors or manufacturers of these devices may provide various configuration tools with which a network administrator may interact to view, edit, update, alter, or otherwise manage configuration information stored to these devices. These configuration tools are typically vendor specific. That is, a first vendor may supply a first configuration tool to configure only those devices sold by the first vendor, while a second vendor may supply a second configuration tool to configure only those devices sold by the second vendor. Each of these vendor specific configuration tools may provide different interfaces, such as a command line interface (CLI) or a graphical user interface (GUI) and utilize different command structures for interacting with the device, which in turn may provide and present configuration data and other information to the network administrator in different formats. The administrator may therefore be required to learn and understand the varying vendor-specific interfaces, as well as, vendor specific configuration terminology and/or command definitions used by the multiple network configuration tools. Moreover, some vendors offer different network configuration tools for different subsets of devices, such as one type of configuration tool to configure routers and another type of configuration tool to configure wireless access points, further burdening the administrator and hampering the administrator's ability to quickly configure the network or troubleshoot problematic network configurations.

In an attempt to alleviate this burden, network service provides may employ large and complex provisioning systems. Provisioning systems allow the administrator to interact with a centralized system to configure multiple of the above listed devices within the network. While provisioning systems enables the administrator to configure a portion of the network, these provisioning systems are often vendor specific as well. That is, vendor-specific provisioning systems only permit the network administrator to configure those devices manufactured by the same vendor that provided the provisioning system. Moreover, provisioning systems are often expensive and, due to the cost, typically only employed only in very large networks composed of a large number of devices from the same vendor.

Because neither the network configuration tools nor the provisioning systems work across vendors, the administrator may be unable to easily view the configuration of a network or sub-network composed of devices from different vendors. Instead, the network administrator may manually piece together the network configuration from among the configurations presented by multiple network configuration tools, which may result in an incorrect view of the network configuration. Due to the time necessary to piece the view together, the view is often dated or out of synch with the current network configuration. As a result, the administrator may improperly configure the network devices and thereby misuse network resources.

SUMMARY

In general, the invention is directed to techniques for managing a network composed of a plurality of network devices from different vendors. In particular, a vendor-independent network configuration tool is described that is capable of managing configuration information stored to the plurality of network devices, regardless of which vendor manufactured the network devices. Thus, this vendor-independent network configuration tool may reduce or possibly eliminate the reliance on vendor-specific network configuration tools by providing a common interface and overall framework by which an administrator can access and maintain configuration information stored within each of the plurality of network devices. The network configuration tool may analyze the configuration information stored to those devices and present a full and timely view of the network configuration. This tool may further provide interactive troubleshooting of the entire network by performing error detection, statistical analysis, and other algorithms on a collection of configuration information from multiple network devices manufactured by varying vendors. Further, the network configuration tool may further interact with disparate management software interfaces presented by network devices from different vendors to edit, alter, replace, or update configuration information stored to each of the network devices.

In an example embodiment, the network configuration tool executes within an operating environment provided by a computing device connected to the network having the various network devices, where at least one of the network devices is from a different vendor than the other network devices. The network configuration tool is typically software that includes a management interface module that interfaces with management software interfaces presented by the plurality of network devices regardless of the vendor that manufactured the network devices. As a simple example, the management interface module executes protocols to connect to at least a first one of the plurality of devices provided by a first vendor and a second one of the plurality of network devices provided a second vendor. The management interface module receives device identification information from each of the first and second devices that identifies, for example, a type of the respective devices and a type of the respective management software interfaces presented by each of the devices.

Based on this device identification information, an extraction module of the network configuration tool applies a framework to seamlessly and transparently invoke any necessary vendor-specific pluggable modules to issue vendor-specific commands that are compatible with the management software interfaces presented by each of the first and second network devices. The extraction module receives responses to these commands that typically include at least a portion of the device-specific configuration information stored within each of the first and second network devices. The extraction module then selects a compatible "tagger," which generally represents a software module defined in accordance with a scripting, programming, or other language to parse one or more "tags" (e.g., keywords or other tokens) from the received configuration information. Each of the tags typically defines a single configuration property specified within the respective portions of the received configuration information.

The extraction module may adaptively apply the taggers by organizing the taggers in accordance with a hierarchical directory structure in which the taggers are arranged with increasing device-specificity from higher to lower levels of the hierarchy. For example, upon applying a first tagger to parse a first tag from the response device configuration, the extraction module, based on the first tag, may traverse the hierarchical directory structure to access and select another tagger stored in a directory associated with the first tag. By applying this next tagger to parse a second tag, the extraction module may traverse to another, lower-level directory in the hierarchical directory structure based on the second tag. In this manner, the extraction module may, without having any prior knowledge of the first and second network devices, adaptively extract configuration information stored to each of the first and second devices. The extraction module may store the extracted tags to an archive file associated with each of the first and second devices.

Once extracted and stored, an administrator may interact with a user interface presented by the network configuration tool to select one or more of the plurality of network devices to manage. Upon receiving this selection, a graph module included within the network configuration tool may retrieve the tags of those archive files associated with the selected devices and construct a graph data structure based on the parsed configuration data represented by the tags, where the nodes in the graph data structure are used to represent the different tags identified within the parsed configuration data and the edges of the graph represent identified interrelations between the tags. The graph module may determine the edges by inspecting a tag's context, which each tag may include to indicate the relationships between the tags of a given archive file. For example, the context may identify a previous parsed tag. The previously parsed tag represents the current tag's "context" because it defines the scope in which the current tag applies.

After constructing the graph data structure, the graph module may automatically analyze the graph data structure to determine one or more views associated with the graph data structure. In particular, the graph module may traverse the graph, node by node, and compute statistics, such as the number of tags of a given category or kind of tag. This statistical analysis may be used to generate one of the views associated with the graph data structure. The graph module may further infer interrelationships among the tags and determine improper configuration properties referenced by one or more tags. In this manner, the graph module may analyze the graph data structure and perform error-checking algorithms to alert the administrator to any configuration inconsistencies. The user interface module may present via a user interface these error messages to the administrator.

In response to the error messages or in an attempt to improve the configuration of the network, the administrator may interact with another user interface presented by the network configuration tool to reconfigure the configuration information of the network devices by changing or otherwise manipulating the configuration or property defined by one or more of the tags. The management interface module, upon receiving input specifying a change to a tag, determines to which of the plurality of network devices the changed tag corresponds and connects to the determined one or more of the plurality of network devices. Once connected, a generator engine included within the network configuration tool invokes one or more compatible "generators" to push the changes to the tag to the determined one or more of the plurality of network devices by issuing a vendor-specific command to the management software interface presented by those network devices. A generator, like a tagger, may comprise an independent software module that is defined in accordance with one of the plurality of scripting, programming, or other languages. In this manner, an administrator may interact with a single vendor-independent network configuration tool to extract, view, edit and alter configuration information stored to a plurality of network devices from different vendors. Moreover, such operation may be performed from a tag-based perspective rather than on a per-device basis.

The network configuration tool may further include an exchange module that permits an administrator to configure sharing policies that define the scope of information that the network configuration tool shares with other vendor-independent network configuration tools. The administrator may interact with the network configuration tool to define the sharing policies. The information that can be shared between network configuration tools includes the taggers, generators, and tags, as well as, other information such as the archive files, the graph data structure, and meta data. The sharing of information between network configuration tools may enable these tools to quickly and automatically populate network configuration tools of different network systems controlled by different service providers with effective taggers and generators and thereby improve the amount and/or quality of configuration information extracted from and/or input to each of the plurality of network devices. Moreover, these techniques allow the different service provides to view limited configuration information of devices within neighboring networks so as to best configure the devices in their own networks without requiring that the service provides divulge too much information regarding their own network topology and configuration.

In one embodiment, a method comprises connecting, with a computing device that executes a network configuration tool, to a first network device from a first vendor, wherein the first network device stores a first set of configuration information and adaptively extracting, with the network configuration tool, the first set of configuration information stored to the first network device by issuing vendor-specific commands to and receiving, in response to the commands, the first set of configuration information from a first management software interface presented by the first network device. The method further comprises parsing, with the network configuration tool, from the first set of configuration information a first tag, wherein the first tag defines a configuration property for the first network device, connecting, with the computing device, to a second network device from a second vendor, wherein the second network device stores a second set of configuration information, and adaptively extracting, with the network configuration tool, the second set of configuration information stored to the second network device by issuing commands to and receiving, in response to the commands, the second set of configuration information from a second management software interface presented by the second network device. The method also comprises parsing, with the network configuration tool, from the second set of configuration information a second tag, wherein the second tag defines a configuration property for the second network device, determining, with the network device, a relationship between the first and second tags, and presenting, with the network device, aggregate configuration information in a manner that organizes a least a portion of the first and second sets of configuration information based primarily on the determined relationships between the first and second tags and secondarily on the network devices from which the first and second sets of configuration information was received.

In another embodiment, a computing device comprises a control unit that includes a network configuration tool to manage a plurality of network devices from different vendors. The network configuration tool comprises a management interface module that connects to first and second network devices of the plurality of network devices, wherein the first network device is from a first vendor and stores a first set of configuration information, and the second network device is from a second vendor and stores a second set of configuration information. The network configuration tool further comprises an extraction module that adaptively extracts the first and second sets of configuration information stored to the respective first and second network devices by interfacing with first and second management software interfaces presented by the first and second network devices, parses from the first and second sets of configuration information respective first and second tags, and stores the stores the first and second tags to a database, wherein the first tag defines a configuration property for the first network device and the second tag defines a configuration property for the second network device. The network configuration tool also comprises a graph module that determines a relationship between the first and second tags, and a user interface module that presents aggregate configuration information in a manner that organizes a least a portion of the first and second sets of configuration information based primarily on the determined relationships between the first and second tags and secondarily on the network devices from which the first and second sets of configuration information was received.

In another embodiment, a computer-readable medium contains instructions. The instructions cause a programmable processor to connect, with a computing device that includes a network configuration tool, to a first network device from a first vendor, wherein the first network device stores a first set of configuration information and adaptively extract, with the network configuration tool, the first set of configuration information stored to the first network device by interfacing with a first management software interface presented by the first network device. The instructions further cause the processor to parse, with the network configuration tool, from the first set of configuration information a first tag, connect, with the computing device, to a second network device from a second vendor, wherein the second network device stores a second set of configuration information, and adaptively extract, with the network configuration tool, the second set of configuration information stored to the second network device by interfacing with a second management software interface presented by the second network device. The instructions further cause the processor to parse, with the network configuration tool, from the second set of configuration information a second tag, determine, with the network device, a relationship between the first and second tags, and present, with the network device, aggregate configuration information in a manner that organizes a least a portion of the first and second sets of configuration information based primarily on the determined relationships between the first and second tags and secondarily on the network devices from which the first and second sets of configuration information was received.

In another embodiment, a method comprises receiving with a network configuration tool included within a computing device a selection of network devices, wherein the selection identifies a first network device from a first vendor and a second network device from a second vendor and determining for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time. The method further comprises constructing with the network configuration tool a graph data structure from both the first and second sets of tags, and analyzing the graph data structure to determine one or more views associated with the data structure. The method also comprises presenting with the network configuration tool the one or more views associated with the data structure to a user to enable the user to view at least a portion of the first and second sets of configuration information from the respective first and second network devices in a manner that organizes the portions of the first and second sets of configuration information based primarily on a relationship determined between the first and second sets of tags and secondarily on the devices from which the first and second sets of configuration information was extracted, wherein each of the tags of the first and second sets of tags defines a configuration property for the respective first and second network devices.

In another embodiment, a computing device comprises a control unit that includes a network configuration tool to manage a plurality of network devices from different vendors. The network configuration tool comprises a user interface module that receives a selection of the plurality of network devices, wherein the selection identifies at least a first network device from a first vendor and a second network device from a second vendor. The network configuration tool further comprises a graph module that determining for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time, constructs a graph data structure from the first and second sets of tags, and analyzes the graph data structure to determine one or more views associated with the data structure. The user interface module further presents the one or more views associated with the data structure to a user to enable the user to view at least a portion of the first and second sets of configuration information from the respective first and second network devices in a manner that organizes the portions of the first and second sets of configuration information based primarily on a relationship determined between the first and second sets of tags and secondarily on the devices from which the first and second sets of configuration information was extracted, wherein each of the tags of the first and second sets of tags defines a configuration property for the respective first and second network devices.

In another embodiment, a computer-readable medium contains instructions. The instructions cause a programmable processor to receive with a network configuration tool included within a computing device a selection of network devices, wherein the selection identifies a first network device from a first vendor and a second network device from a second vendor, and determine for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time. The instructions further cause the processor to construct with the network configuration tool a graph data structure from the first and second sets of tags, analyze the graph data structure to determine one or more views associated with the data structure, and present with the network configuration tool the one or more views associated with the data structure to a user to enable the user to view at least a portion of the first and second sets of configuration information from the respective first and second network devices, wherein each of the tags of the first and second sets of tags defines a configuration property for the respective first and second network devices.

In another embodiment, a method comprises determining, with a network configuration tool executing within a computing device, a relationship between a first tag and a second tags, wherein the first and second tags each define a configuration property associated with a first and a second network device of first and second vendors respectively, and presenting, with the network configuration tool, aggregate configuration information in a manner that organizes first and second sets of configuration information based primarily on the determined relationships between the first and second tags and secondarily on the network devices from which the first and second sets of configuration information was received. The method further comprises receiving, with the network configuration tool, a first input that specifies a first change to the first tag associated with the first network device from the first vendor, and receiving, with the network configuration tool, a second input that specifies a second change to the second tag associated with the second network device from the second vendor. The method also comprises connecting, with the network configuration tool, to the first network device, wherein the first network device stores the first set of configuration information, and updating, with the network configuration tool, the first set of configuration information stored to the first network device in accordance with the first change to the first tag by interfacing with a first management software interface presented by the first network device. Moreover the method comprises connecting, with the network configuration tool, to the second network device, wherein the second network device stores the second set of configuration information, and updating, with the network configuration tool, the second set of configuration information stored to the second network device in accordance with the second change to the second tag by interfacing with a second management software interface presented by the second network device.

In another embodiment, a computing device comprises a control unit that includes a network configuration tool to manage a plurality of network devices from different vendors. The network configuration tool comprises a module that determines a relationship between a first tag and a second tags, wherein the first and second tags each define a configuration property associated with a first and a second network device of first and second vendors respectively, a user interface module that presents aggregate configuration information in a manner that organizes first and second sets of configuration information based primarily on the determined relationships between the first and second tags and secondarily on the network devices from which the first and second sets of configuration information was received and presents a user interface to receive a first input that specifies a first change to the first tag associated with the first network device from the first vendor and receive a second input that specifies a second change to the second tag associated with the second network device from the second vendor. The network configuration tool further comprises a management interface module that connects to the first network device and the second network device, wherein the first network device stores a first set of configuration information and the second network device stores a second set of configuration information. The network configuration tool also comprises a generator engine that updates the first set of configuration information stored to the first network device in accordance with the first change to the first tag by interfacing with a first management software interface presented by the first network device and updates the second set of configuration information stored to the second network device in accordance with the second change to the second tag by interfacing with a second management software interface presented by the second network device.

In another embodiment, a computer-readable medium contains instructions. The instructions cause a programmable processor to determine, with a network configuration tool executing within a computing device, a relationship between a first tag and a second tags, wherein the first and second tags each define a configuration property associated with a first and a second network device of first and second vendors respectively, and present, with the network configuration tool, aggregate configuration information in a manner that organizes first and second sets of configuration information based primarily on the determined relationships between the first and second tags and secondarily on the network devices from which the first and second sets of configuration information was received. The instructions further cause the processor to receive, with a network configuration tool, a first input that specifies a first change to the first tag associated with the first network device from the first vendor, and receive, with the network configuration tool, a second input that specifies a second change to the second tag associated with the second network device from the second vendor. The instructions also cause the processor to connect, with the network configuration tool, to the first network device, wherein the first network device stores a first set of configuration information, and update, with the network configuration tool, the first set of configuration information stored to the first network device in accordance with the first change to the first tag by interfacing with a first management software interface presented by the first network device. Moreover, the instructions cause the processor to connect, with the network configuration tool, to the second network device, wherein the second network device stores a second set of configuration information, and update, with the network configuration tool, the second set of configuration information stored to the second network device in accordance with the second change to the second tag by interfacing with a second management software interface presented by the second network device.

In another embodiment, a method to manage a plurality of network devices from different vendors. The method comprises receiving, with a vendor-independent network configuration tool included within a computing device, input from a user specifying at least one sharing policy, wherein the sharing policy defines a scope of information that the network configuration tool shares with other vendor-independent network configuration tools executing within other computing devices, and determining, with the vendor-independent network configuration tool, the other computing devices executing the other vendor-independent network configuration tools in accordance with a discovery protocol. The method further comprises connecting, with the vendor-independent network configuration tool, to one of the other computing devices in accordance with an Authentication, Authorization and Accounting (AAA) protocol, and exchanging the information in accordance with the at least one sharing policy, wherein the information includes one or more of a tagger, a generator, or a tag.

In another embodiment, a computing device comprises a control unit that executes a network configuration tool to manage a plurality of network devices from different vendors. The network configuration tool comprises a user interface module that presents a user interface to receive input from a user specifying at least one sharing policy, wherein the sharing policy defines a scope of information that the network configuration tool shares with other vendor-independent network configuration tools executing within other computing devices, and a management software interface that interfaces with the plurality of network devices to manage configuration information stored to the plurality of network devices, at least two of the plurality of network devices from different vendors. The network configuration tool further comprises an exchange module that determines the other computing devices executing the other vendor-independent network configuration tools in accordance with a discovery protocol, connects to one of the other computing devices in accordance with an Authentication, Authorization and Accounting (AAA) protocol, and exchanges the information in accordance with the at least one sharing policy, wherein the information includes one or more of a tagger, a generator, or a tag.

In another embodiment, a computer-readable medium contains instructions. The instructions cause a programmable processor to receive, with a vendor-independent network configuration tool included within a computing device, input from a user specifying at least one sharing policy, wherein the sharing policy defines a scope of information that the network configuration tool shares with other vendor-independent network configuration tools executing within other computing devices, and determine, with the vendor-independent network configuration tool, the other computing devices executing the other vendor-independent network configuration tools in accordance with a discovery protocol. The instructions further cause the processor to connect, with the vendor-independent network configuration tool, to one of the other computing devices in accordance with an Authentication, Authorization and Accounting (AAA) protocol and exchange the information in accordance with the at least one sharing policy, wherein the information includes one or more of a tagger, a generator, or a tag.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 9A-9F are screenshots illustrating example user interfaces presented by the vendor-independent network configuration tool.

DETAILED DESCRIPTION

Figure 1:
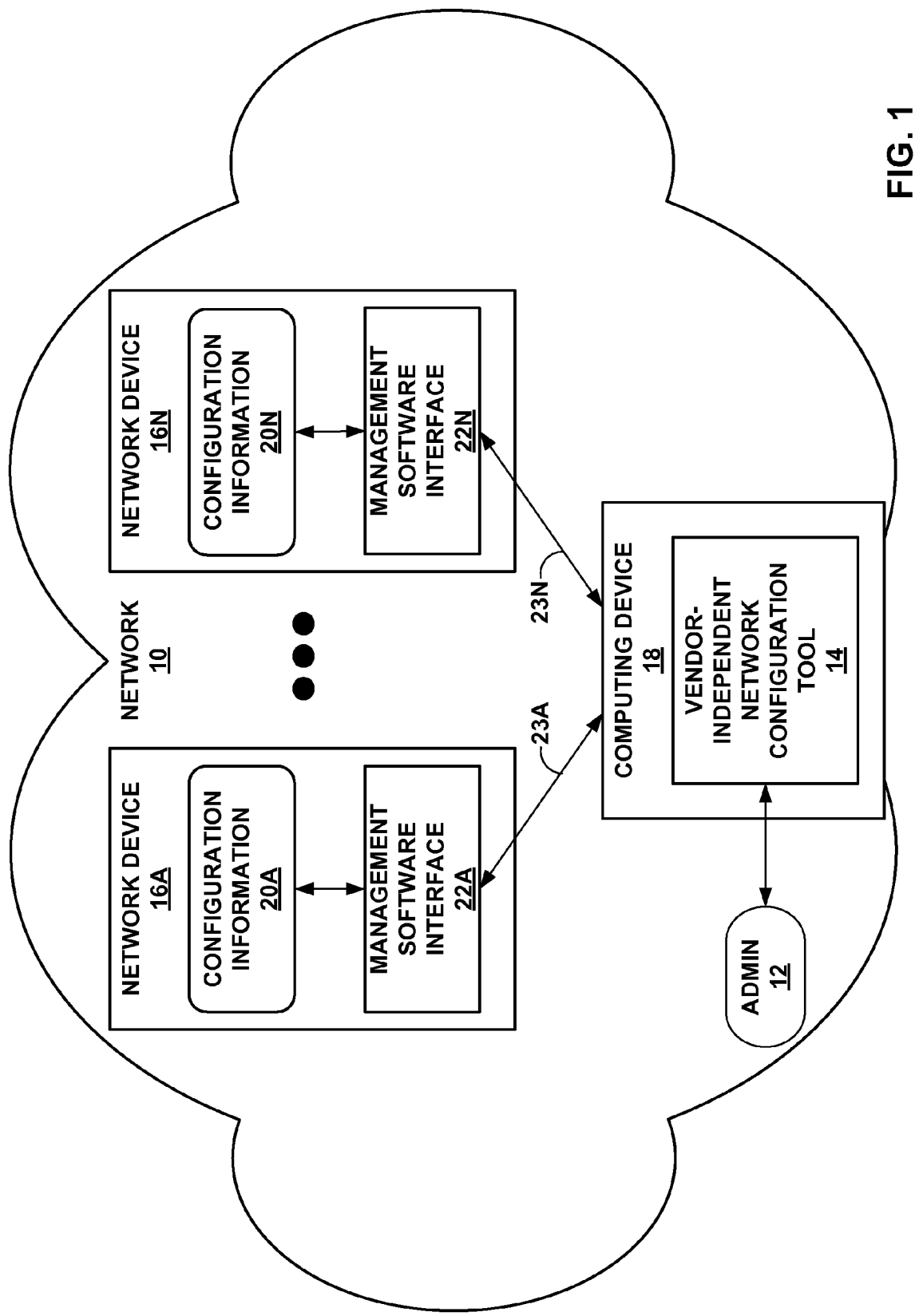
FIG. 1 is a block diagram illustrating a network in which an administrator interacts with a vendor-independent network configuration tool to configure the network.

FIG. 1 is a block diagram illustrating a network 10 in which an administrator 12 interacts with a vendor-independent network configuration tool 14 to configure network 10. As shown in FIG. 1, network 10 includes network devices 16A-16N ("network devices 16") and a computing device 18. Administrator 12 ("admin 12") configures network 10 by interacting with network configuration tool 14 executing within computing device 18 to configure each of network devices 16, thereby controlling the interaction of network devices 16 and the flow of data, e.g., packets, between network devices 16.

Although not shown in FIG. 1, one or more of network devices 16 may interconnect with one another via communicative links to form network 10, as well as, one or more sub-networks comprised of subsets of network devices 16. Further, one or more of network devices 16 may interconnect with other endpoint computing devices or client devices, which are also not shown in FIG. 1 for ease of illustration purposes. Network devices 16 may therefore route or otherwise facilitate the transfer of data between these endpoint client devices, usually in a manner transparent to the endpoint user devices. The invention therefore should not be limited strictly to network 10 as shown in FIG. 1.

Network 10 may comprise a network managed by an Internet Service Provider (ISP) that serves client devices and which provides access to a public network, such as the Internet. In this disclosure, it is assumed that network 10 comprises an ISP managed network. Vendor-independent network configuration tool 14 may however facilitate the configuration of any network, including private networks, wide area networks (WANs), local area networks (LANs), virtual networks, wireless networks, or any other type of network that includes a plurality of network devices 16 from different vendors.

Network devices 16 may comprise one or more types of devices falling within varying subsets of network devices, each subset enabling one or more functionalities within network 10. For example, network devices 16 may each comprise one or more of a router to route packets or other data units across network 10, a wireless access point to provide client devices with wireless access to network 10, a Dynamic Host Configuration Protocol (DHCP) server to provide various parameters necessary for other devices, such as endpoint user devices, to operate in an Internet Protocol (IP) network, a Domain Name System (DNS) server to provide domain names to client devices, a Digital Subscriber Line Access Multiplexer (DSLAM) to facilitate high-speed access to a network via a telephone line, a border gateway controller to control the interconnection of networks or sub-networks, a general gateway that controls access between networks, an application layer gateway that controls access to a network or sub-network based on application layer data, as well as, any other device commonly found in a network, such as network 10. Although not explicitly shown in FIG. 1, it is assumed for purposes of illustration that at least one of network devices 16 is from a different vendor or manufacturer than the other devices 16.

Each of network devices 16 includes respective sets of configuration information 20A-20N ("configuration information 20") and a management software interface 22A-22N ("management software interfaces 22"). Each set of configuration information 20 represents information or data stored within respective network devices 16 that defines a current operational state of each network device 16. Each of management software interfaces 22 represents hardware, software, or both that presents an interface with which either a user, such as admin 12, or a configuration device, such as a provisioning system, interact to view, update, alter, or otherwise manage configuration information 20. As at least one of network devices 16 is presumed to be from a different vendor or manufacturer, it is further assumed for purposes of illustration that the different one of network devices 16 comprises configuration information 20 and a management software interface 22 different than those devices 16 from the same vendor.

For example, configuration information 20A may be stored within a first network device 16A from a first vendor while configuration information 20N may be stored within a second network device 16N from a second vendor. Configuration information 20A may differ from configuration information 20N in format, content, or both. For example, information 20A may be formatted in accordance with a comma oriented format specific to the first vendor, while information 20N may be formatted in accordance with a proprietary hierarchical format specific to the second vendor. Alternatively or in conjunction with varying formats, information 20A may specify a first set of variables and associated values using configuration terminology specific to the first vendor, while information 20N may specify a second set of variables and associated values using configuration terminology specific to the second vendor. The first and second set of variables may overlap in that they refer to the same underlying network property, such as an IP address, a port number, a domain name, and a Media Access Control (MAC) address, but utilize separate and different variable names to identify each property. In other words, similar devices 16 from different vendors may encode configuration information 20 in accordance with varying formats that may prevent one network configuration tool provided by the first vendor from viewing, editing, altering or otherwise managing configuration information 20 stored to a network device 16 from another or second vendor.

Likewise, a management software interface 22 presented by a device 16 from the different vendor may also be substantially different from those management software interfaces 22 from the same vendor. For example, management software interface 22A of network device 16A from the first vendor may comprise a command line interface (CLI), while management software interface 22N of network device 16N from the second vendor may comprise an. Moreover, management software interface 22A may accept commands or input in accordance with a first format or command definition while interface 22N accepts input in accordance with a second format or command definition. As above, the input may specify configuration information 20A, 20N that overlaps, but that disparate vendor specific network configuration tools cannot understand or properly access due to the different command definitions. An administrator, such as admin 12, when using these conventional vendor specific network configuration tools, therefore typically pieces together the configuration of network 10 from the disparate configurations presented by the conventional network configuration tools. Thus, admin 12 may overlook improper configurations of network devices 16 by failing to correctly identify pertinent places of overlap where consistent configuration may improve network performance.

In accordance with the invention, admin 12 need not interact with conventional vendor specific tools and instead interacts with a vendor-independent network configuration tool 14. Network configuration tool 14 is "vendor independent" in that it represents a tool capable of accessing configuration information 20 of network devices 16 regardless of the vendor or manufacturer of network devices 16. Thus, tool 14 may reduce or possibly eliminate the reliance on vendor-specific network configuration tools. As a result, network configuration tool 14 may provide a common interface by which admin 12 accesses configuration information 20 stored to respective network devices 16. Also, network configuration tool 14 may analyze configuration information 20 stored to devices 16 from different vendors and present a full view of network 10, as well as, provide interactive troubleshooting by performing error detection, statistical analysis, and other algorithms. Network configuration tool 14 may further interact with disparate management software interfaces 22 to edit, alter, replace, or otherwise manage configuration information 20 stored to each of network devices 16.

For example, admin 12 may interact with network configuration tool 14 to load one or more independently created modules, which are herein referred to individually as a "tagger" and a "generator." Each tagger or generator may comprise a software module defined in accordance with a computer programming or scripting language, such as Python, Perl, Ruby, C++, or JAVA. Each tagger represents a module for interacting with management software interfaces 22 to extract respective configuration information 20 and parse one or more configuration properties, which are herein referred to individually as a "tag," from the extracted configuration information 20. Each generator, as described below, performs the opposite or inverse operation of the taggers to define or update configuration information 20 stored to network devices 16. The modules may be developed external from network 10 and imported into network 10 either manually by admin 12 loading taggers into network configuration tool 14 or automatically by sharing of these modules among multiple network configuration tools 14.

Upon loading the modules, admin 12 may direct network configuration tool 14 to inspect devices 16 within network 10. In some embodiments, network configuration tool 14 may be pre-programmed with access information, such as a user name and password, and automatically inspect devices 16 for which network configuration tool 14 maintains access information. Network configuration tool 14 may inspect these devices 16 on a regular basis, such as a daily, weekly, or monthly schedule. After gaining access to those devices 16, network configuration tool 14 retrieves configuration information 20 stored to those devices 16, parses tags from information 20 stored to those devices 16, and presents the tags to admin 12 via another user interface.

To access these devices 16, network configuration tool 14 may connect to each of network devices 16 according to a standard network protocol, such as a Secure SHell (SSH) protocol, a TELecommunication NETwork (TELNET) protocol, an eXtensible Markup Language (XML)-based Network Management (XNM) protocol, a Simple Network Management Protocol (SNMP), or a HyperText Transfer Protocol (HTTP). Typically, network configuration tool 14 establishes a secure connection, such as one of secure connections 23A-23N ("connections 23"), with those devices 16 by employing an encryption layer to privately transfer the data, e.g., commands and portions of configuration information 20, between tool 14 and devices 16. An encryption layer may be established in accordance with a security protocol, such as an Extensible Authentication Protocol (EAP), a Transport Layer Security (TLS) protocol, a Secure Socket Layer (SSL) protocol, or a RSA protocol.

Upon establishing a connection 23 with one of devices 16, that device 16 typically transmits data or information that identifies a type of device 16, such as a vendor name, device or product number and name, or any other name, number or alphanumeric identifier, as well as, other information that identifies, for example, the name and version of the respective management software interface 22. Based on this identifying information, network configuration tool 14 may invoke only those taggers capable of parsing tags from configuration information 20 stored to the identified type of device 16 and management software interface 22, which may be referred to as "compatible taggers." Taggers therefore act as "plug-ins" or independent modules, and network configuration tool 14 provides a platform or executing environment in which taggers may execute after being "plugged in" to or loaded on network configuration tool 14.

Network configuration tool 14 may organize taggers in a hierarchical manner and associate each tagger with a particular command. In some instances, network configuration tool 14 may store the taggers in an increasing device-specificity from higher to lower levels of the hierarchy. For example, network configuration tool 14 may store in a first higher-level directory a first command to retrieve configuration information 20 directed to a plurality of interfaces of the associated network device 16 and associate a tagger with that first command. In a directory below or lower than the first higher-level directory, network configuration tool 14 may store a second command to retrieve configuration information 20 concerning one of the plurality of interfaces and associate another tagger with this second command.

Thus, network configuration tool 14 may issue a command, receive a portion of configuration information 20 stored to one of network devices 16, and invoke one or more of the taggers associated with the command to extract configuration information 20 from a higher level of specificity to a lower level of specificity (e.g., information concerning a plurality of interfaces down to information concerning a particular interface). Network configuration tool 14 may base the invocation of successive taggers upon a tag parsed by a previously invoked tagger.

That is, by storing the taggers in the hierarchical manner, network management tool 14 may invoke successive taggers in higher to lower levels of specificity upon learning more about the capabilities of a device 16. For example, tool 14 may invoke a first tagger to determine whether a device 16 executes an operating system. Upon determining that device 16 executes an operating system, tool 14 may invoke a next tagger to determine a specific version of the operating system. Accordingly, network configuration tool 14 may adapt to the capabilities of devices 16 without prior knowledge about configuration information 20 stored to a particular device 16. As configuration information 20 indicates the current operational state of respective network devices 16, the taggers may be characterized as extracting a "snapshot" or time-based representation of the current operational state of each of network devices 16 present within the above specified domain.

Once all or a portion of information 20 is extracted, network configuration tool 14 creates an archive or package to store extracted configuration information 20 (which may be referred to in this disclosure as "raw data" or "command output"). Next, network configuration tool 14, by executing the taggers, parses the relevant properties from the raw files and/or command output to characterize the given device 16 according to properties that are of interest to admin 12 or other operators of devices 16. The extracted properties are then stored as tagged identifiers (or "tags") within an associated archive files (or "archive") for later comparison and analysis. As a result of some properties being common to a class of devices, similar tags across dissimilar devices 16 from disparate vendors may be compared.

The taggers may also cause tool 14 to store a tag's "context" by storing a reference within the tag that identifies another tag (which may be referred to herein as a "context tag") with which the tag is associated. That is, the tagger while parsing the current tag may traverse the configuration information and identify the scope in which the current tag exists. Upon identifying the scope, the tagger may cause tool 14 to parse the context tag and include a reference to this context tag within the current tag. For example, a tagger may cause tool 14 to parse a first tag that defines an interface configuration property and a second tag that defines a subnet configuration property for the interface from one set of configuration information 20. This first tagger may cause tool 14 to identify the scope, e.g., the interface, for the second tag and include a reference to the first interface tag in the second tag, thereby establishing a relationship between tags.

Alternatively, tool 14 may execute two taggers, one to parse the interface tag and another to parse the subnet tag. The second tagger may cause tool 14 to identify the interface tag as the scope and include a reference to this interface tag in the second subnet tag. Whether a single tag or multiple tags cause tool 14 to include the context tag within the second tag, the previously parsed tag represents the current tag's context because this previously parsed tag defines the scope in which the current tag applies.

After extracting the relevant properties in the form of tags and storing the associated archive file for each network device 16 within a given domain, network configuration tool 14 may analyze the tags associated with each network device 16 of the domain and present the analysis via one or more additional user interfaces. Each of the above user interfaces may present a different view of the analysis or present a different manner of organizing and displaying the tags, as described below in more detail. Network configuration tool 14 may present the analysis of one or more archives, each archive associated with a different device 16. Alternatively, network configuration tool 14 may present the analysis of one or more archives associated with a single device 16, where each archive represents a snapshot of the operational state at a different point in time. Thus, the different contexts within which the analysis of tags are presented may enable admin 12 to troubleshoot how a property associated with a tag is used across multiple devices 16, as well as, how that property has changed over time with respect to a single device 16 or even multiple devices 16.

As an example, network device 16 may determine relationships between tags from devices 16 of different vendors. In some instances, network device 16 may group the tags from devices 16 of different vendors into one or more groups such that each group includes tags that define like or similar configuration properties, if not exactly the same configuration property. As each group of tags may include configuration properties extracted from various sets of configuration information 20, network configuration tool 14 may aggregate configuration information 20 that is stored to devices 16 to generate aggregate configuration information. Network configuration tool 14 may present via a user interface the aggregate configuration information in a manner that organizes various sets of configuration information 20 based primarily on the determined relationships, e.g., groupings, between the tags and secondarily on network devices 16 from which the various sets of configuration information 20 was received.

Network configuration tool 14 may further analyze the tags by arranging the tags according to a data structure, such as a graph data structure. In terms of mathematics, a graph is a set of vertices connected with edges, and a graph data structure, as used in terms of computer science, attempts to replicate the mathematical definition of a graph as a data structure. Commonly a graph data structure is expressed either in terms of an adjacency list or an adjacency matrix. Because tags reflect generally global properties or network-wide properties, network configuration tool 14 may derive relationships across independent property snapshots or archives.

For example, interfaces (not shown in FIG. 1) included within one of devices 16 may be configured to connect to a common IP subnet. When network configuration tool 14 extracts the IP subnet property associated with each of the interfaces included within the associated device 16, tool 14 may associate a common IP subnet tag with each of the interfaces. Network configuration tool 14 may then analyze the common IP subnet tag, including the common tag's context (e.g., one or more tags that each identify a separate interface of the IP subnet), and determine the relationship between each tag representing the interfaces and the common IP subnet tag. Network configuration tool 14 may then form the graph with the relationships between the tags with the tags' context forming the edges of a connected graph and the tags (e.g., the subnet tag and interface tags) forming the vertices.

Using the graph, network configuration tool 14 may also present tags at different scales by expanding or contracting the context of the graph. As an example, the same graph may specify tags for a set of interfaces of one of devices 16 or for a set of devices 16.

A number of algorithms to analyze a graph exist, such as a depth-first search, a breadth-first search, a Ford-Fulkerson algorithm, and Dijkstra's algorithm. Network configuration tool 14 may employ one or more of these algorithms to analyze the graph. Moreover, tool 14 may employ error-checking algorithms to identify tags associated with improperly configured properties present within a given scope of the graph. The error-checking algorithms may be embodied in the form of "smart" tags, where a smart tag is similar to the above described tags but includes further functionality that defines and implements the error-checking algorithm. Thus, network configuration tool 14 may execute a tagger to extract configuration information 20, parse tags from information 20, and write error-checking algorithms to the tags to create smart tags.

During analysis of the graph, network configuration tool 14 executes the error-checking algorithm embodied in the smart tag to determine whether an error, warning, or other improper configuration as embodied within the graph exists. Upon determining that an error exists, tool 14 may generate additional "error" tags that define as a configuration property an alert, error, or warning message or code. Tool 14 may insert these error tags into the graph data structure, whereby tool 14 may determine a view that includes one of these error tags and present these error tags to admin 12.

Upon identifying an error either through manual inspection or application of smart tags and/or other algorithms, admin 12 may interact with another user interface of network configuration tool 14 to correct the error. That is, admin 12 may via the other user interface specify or input changes to the tags. Network configuration tool 14 upon receiving the specified changes may invoke one or more generators, which like the taggers, interface with the one of management software interfaces 22 of devices 16 for which the tag is associated. Although described herein as separate from taggers, the functionality of generators may be incorporated into taggers and vice versa.

Similar to what was described above with respect to taggers, tool 14 may establish a secure connection 23 with the designated one of devices 16, receive the above described identifying information concerning the associated one of devices 16 and management software interfaces 22, and invoke a generator capable of interfacing or compatible with the specified device 16 and management software interface 22. The generator inputs the appropriate commands to update configuration information 20 to reflect the changes to the tags input by admin 12 via the user interface of network configuration tool 14.

Network configuration tool 14 may further enable admin 12 to specify configuration changes for a set of devices 16, including a class or arbitrary group of devices 16 in the same manner. Moreover, network configuration tool 14 may infer devices 16 from tags and changes to those tags may cause network configuration tool 14 to configure these inferred devices 16 so as to maintain a consistent configuration across similar devices. For example, changes to a name server tag may cause network configuration tool 14 to infer one or more devices 16, e.g., those devices 16 that employ a name server device 16 to map a domain name to an IP address, for which configuration information 20 need be updated from the change to the single name server tag. Thus, network configuration tool 14 may enable failsafe configuration of network 10 such that one device 16 may not be left with an improper configuration due to oversight.

In this manner, network configuration tool 14 may interact with devices 16 from disparate vendors, thereby alleviating substantially the burdens associated with configuring and troubleshooting a large network comprised of a large number of devices 16 from different vendors, as is commonly present in large ISP managed networks. In particular, network configuration tool 14 may provide a single tool by which admin 12 may view configuration information 20 of devices 16 regardless of the vendor, as well as, perform analysis upon and edit, change, or otherwise manage the extracted configuration information 20 to correct errors or other improper configurations. Moreover, network configuration tool 14 may automatically detect these errors by way of smart tags and other rules that implement error-checking algorithms. Thus, network configuration tool 14 may reduce or possibly eliminate the reliance on vendor specific tools, as well as, provide a lower cost alternative to expensive provisioning systems.

Network configuration tool 14 may execute, as shown in FIG. 1, within a computing device 18 as a software module. That is, computing device 18 may store instructions to a computer-readable storage medium, and include a processor or control unit (neither shown in FIG. 1) to execute the instructions, whereby the instructions cause the processor to perform the functionality described in this disclosure with respect to network configuration tool 14. Alternatively, network configuration tool 14 may comprise hardware or a combination of hardware and software that is included within computing device 18 to perform the functions described herein with respect to network configuration tool 14. More detail concerning the configuration and functionality of network configuration tool 14 is described below with respect to FIG. 2.

Figure 2:
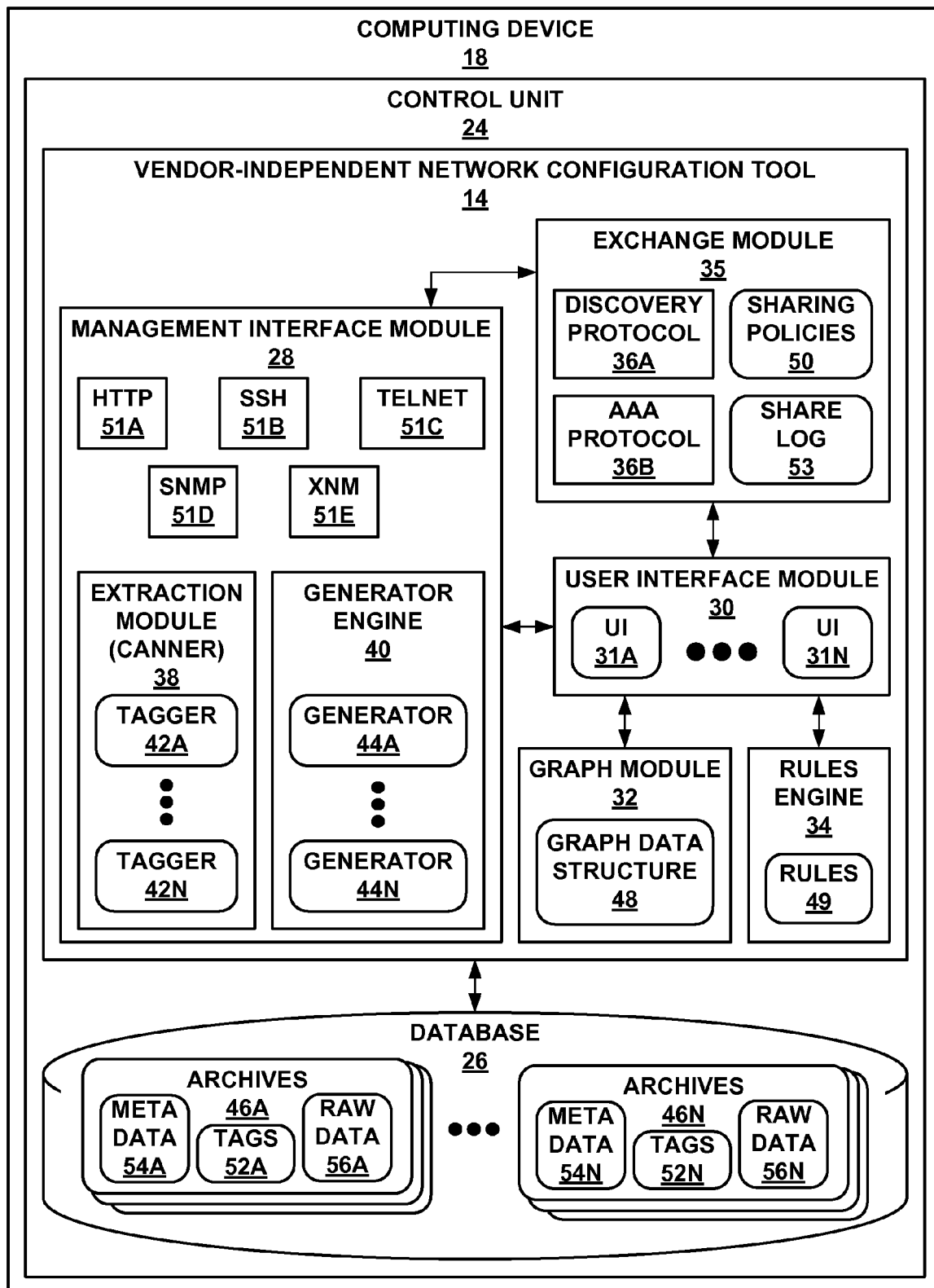
FIG. 2 is a block diagram illustrating the network configuration tool of FIG. 1 in more detail.

FIG. 2 is a block diagram illustrating network configuration tool 14 of FIG. 1 in more detail. As described above, network configuration tool 14 executes within an operating environment provided by a computing device 18. Computing device 18 may comprise one or more of a personal computer, a laptop computer, a workstation, a cellular phone, a Personal Digital Assistant (PDA), a network device, or any other device capable of executing or otherwise implementing the techniques described with respect to vendor-independent network configuration tool 14. As shown in FIG. 2, computing device 18 includes a control unit 24.

Control unit 24 may comprise one or more processors, an Application Specific Integrated Circuit (ASIC), or both. Control unit 24 executes vendor-independent network configuration tool 14 and includes database 26 communicatively coupled to network configuration tool 14. Network configuration tool 14 includes a management interface module 28, a user interface module 30, a graph module 32, a rules engine 34, and an exchange module 35.

Management interface modules 28 represents a module for interfacing with management software interfaces 22 of network devices 16 regardless of the vendor that manufactured network devices 16. Management interface module 28 includes an extraction module 38, which may be referred to in this disclosure as "canner 38," and generator engine 40. Extraction module or canner 38 provides an execution environment or platform in which taggers 42A-42N ("taggers 42") may execute. Taggers 42, as described above, represent independently created software modules or "plug-ins" that enable canner 38 to parse tags from extracted configuration information 20. Extraction module 38 may be referred to as a "canner" in that after extracting configuration information 20 or the raw data or command output and parsing this information into tags, extraction module 38 may "can" or package the data into cans or archive files (e.g., "archives 46").

Generator engine 40 represents a module that provides an executing environment or platform in which generators 44A-44N ("generators 44") may execute. Generators 44, as described above, are similar in nature to taggers 42 in that generators 44 may comprise independently created software modules or "plug-ins." Generators 44 may also be loaded or shared similar to taggers 42. However, generators 44 enable generator engine 40 to perform the inverse function of taggers 42 and, instead of parsing tags or configuration properties from information 20, generate and issue vendor-specific commands to vendor specific management interfaces 22 so as to update configuration information 20.

User interface module 30 represents a module for presenting via a display (not shown in FIG. 2) one or more user interfaces with which admin 12 may interact to view, analyze, edit, change, update, or other manage various forms or portions of, as well as, tags parsed from configuration information 20. User interface module 30 includes user interfaces 31A-31N ("UIs 31"). UIs 31 may comprise a user interface in a variety of formats, such as HTML, JavaScript, Macromedia Flash™, Apple Cocoa, and XML, as well as, provide multiple frames or windows, each displaying information in one or more of the above formats. UIs 31 may accept a wide variety of inputs and present a number of interactive buttons, sliders, drop-down lists, text boxes, radio buttons, check boxes, or any other type of input with which a user, such as admin 12, may interact to input information.

Graph module 32 represents a module that constructs a graph data structure from tags and performs analysis on the constructed graph data structure. Graph module 32 includes a graph data structure 48, which represents one example of a data structure capable of storing or representing multiple interrelations between various nodes. As described above, graph data structure 48 attempts to mirror a graph as understood in mathematical terms.

Rules engine 34 represents a module for executing rules that may be defined by admin 12 or embodied within tags, such as the above described error checking algorithms or rules contained within smart tags. Rules engine 34 includes rules 49, which represent those rules not included within smart tags but defined by a user, such as admin 12, or exchanged with a tool 14 executing on another computing device, similar to computing device 18.

Exchange module 35 represents a module responsible for sharing or exchanging taggers, generators, archives, tags, raw data and/or meta data with other network configuration tools substantially similar to tool 14. Exchange module 35 includes protocol modules 36A, 36B and sharing policies 50. Discover protocol module 36A ("discovery protocol 36A") represents a module that implements a discovery protocol, such as a service location protocol, to enable the discovery of other local computing devices that execute or implement a particular application or service, such as network configuration tool 14. More information regarding the service location protocol can be found in Request for Comments (RFC) 2608, titled "Service Location Protocol, Version 2," prepared by the Network Working Group of the Internet Engineering Task Force (IETF), dated June 1999, herein incorporated by reference.

Authentication, Authorization and Accounting protocol module 36B ("AAA protocol 36B") represents a module capable of implementing the AAA protocol to authenticate a user, authorize the user to access a specific type of service or network resource, and account for or track the use of the service or network resource the user was authorized to use. More information concerning the AAA protocol can be found in a number of RFCs, including RFC 3539 (titled, in part, "(AAA) Transport Profile," dated June 2003), RFC 2906 (titled "AAA Authorization Requirements," dated August 2000), RFC 2905 ("AAA Authorization Application Examples," dated August 2000), RFC 2905 (titled "AAA Authorization Framework," dated August 2000), and RFC 2903 (titled "Generic AAA Architecture," dated August 2000). The above RFCs concerning the AAA protocol are each prepared by the Network Working Group of the IETF and herein incorporated by reference.

Sharing polices 50 represent policies that define the sharing of taggers 42, archives 46, graph data structure 48, and any other data relevant to network configuration tool 14 with other network configuration tools 14 executing on other devices similar to computing device 18.

Database 26 may comprise one or more of a flat file database, a structured query language (SQL) database, a Kerberos database, a lightweight directory access protocol (LDAP) database, or an Active Directory database. In some instances, an interface may be provided that overlays functionality upon one of the above listed database types. For example, the database may comprise a SQL database or other relational database upon which an object database schema is constructed. Thus, a standard SQL database may be used to support an object-based database schema. An exemplary object-based database schema is illustrated below in more detail.

Database 26 stores archives 46A-46N ("archives 46"). Each of archives 46 are illustrated as a stack or set of layered archives to represent that each set of archives 46 may be associated with a specific device 16, but comprises a separate "snapshot" of the operational status of that device 16 at different sequential points of time. That is, the first archive in the set of archive 46A, for example, may represent a snapshot of configuration information 20A of device 16A taken at a first, more recent point in time. The second partially obscured archive in the set of archives 46A may represent another snapshot of configuration information 20A of device 16A taken at a second, less recent point of time. Archives 46 may therefore be referred to herein as a "snapshot," as the archive represents a file that stores a representation of the operational state of a device 16 a given point in time.

Although shown as a stack or set of historical versions of archives 46, database 26 may store a single archive for each device that comprises sub-archives delineating changes from a starting point of time until the latest point in time. Moreover, database 26 may only store the most recent snapshot or archive locally, while another memory that is not local to computing device 18 stores past snapshots or archives 28. Moreover, database 26 may reside within a network server and not be included within computing device 16. In this instance, control unit 24 access database 26 via a secure connection, for example, to perform the below described techniques. Thus, the invention should not be strictly limited to the illustrated embodiment.

Although not shown in FIG. 1, control unit 24 may comprise additional memory. The additional memory may include any combination of static memory (e.g., a hard drive, read only memory (ROM), electrically erasable programmable ROM (EEROM), and flash memory) and/or dynamic memory (e.g., random access memory (RAM), static RAM (SRAM), dynamic RAM (DRAM), and a cache). The additional memory may provide memory to store the various modules, engines, or components described herein, as well as, instructions that cause a processor of control unit 24 to perform the functions described with respect to tool 14.

As described above, admin 12 interacts with a UI 31 presented by user interface module 30 to load or define one or more of taggers 42 into canner 38. Alternatively, admin 12 may define sharing policies 50 via interactions with another UI 31 presented by user interface module 30, and network configuration tool 14 may implement those policies 50 to share taggers 42 between similarly situated network configuration tools 14. In other words, exchange module 35 of network configuration tool 14 may automatically transmit and receive, exchange, or share taggers 42 with another network configuration tool 14 executing within a similarly situated computing device.

To share either of taggers 42 or generators 44, exchange module 35 may employ discovery protocol 36A to identify these similarly situated computing devices. Upon finding these devices, exchange module 35 may access policies 50 to determine whether to share taggers 42, generators 44, and/or archives 46, as well as, possibly other data, such as graph data structure 48 and/or rules 49. Assuming policy 50 enables to some extent sharing with the other device, exchange module 35 securely connects to the other computing device in accordance with AAA protocol 36B.

Exchange module 35, in accordance with AAA protocol 36B, may authenticate itself to the other device, whereupon exchange module 35 executing within respective devices 18 share taggers 42, for example. Exchange module 35 may log the transaction to share log 53 in accordance with AAA protocol 36B so that admin 12 may later review log 53 to determine which taggers 42 were shared and adjust polices 50 as needed to prevent the receipt of malicious taggers, for example, or otherwise limit or expand sharing policies 50.

Whether loaded or shared, management interface module 28, upon receiving the hostname, for example, from user interface module 30, establishes a connection with one of devices 16 of the defined hostname in accordance with HTTP module 51A ("HTTP 51A"), SSH module 51B ("SSH 51B"), TELNET module 51C ("TELNET 51C"), a SNMP module 51D ("SNMP 51D"), or an XNM module 51E ("XNM 51E"). Upon establishing the connection, management interface module 28 may receive information describing the one of devices 16 and/or the respective one of management software interfaces 22.

Based on this identifying information, canner 38 may identify one or more of taggers 42 capable of properly parsing tags from configuration information 20 stored to the identified management software interface 22 and associated device 16. Canner 38 may execute those taggers 42 to parse tags from the identifying information as well as configuration information 20. Typically, in response to connecting to one of devices 16, canner 38 retrieves an appropriate vendor-specific command or, in other words, a command that corresponds to the command definition of the particular management software interface 22, from a memory (not shown in FIG. 1) and inputs the appropriate command to interface with the management software interfaces 22. Upon receiving configuration information 20, canner 38 invokes one of taggers 42 to parse a tag from the received configuration information 20. Alternatively, canners 38 may execute taggers 42 to interface with management software interfaces 22, issue the vendor-specific commands, receive configuration information 20, and parse the tags from the configuration information.

In either instance, admin 12 need not input the vendor-specific command nor remember command definitions associated with various vendor-specific configuration tools, as network configuration tool 14 may store the appropriate command and issue these commands to properly interface with management software interfaces 22 presented by devices 22 of different vendors. Moreover, admin 12 may only need to identify or select devices 16, and forgo entering commands altogether, to retrieve configuration information 20 stored to the selected or identified devices 16. Thus, network configuration tool 14, because it stores the commands, may automatically extract configuration information 20 stored to devices 16 of different vendors in accordance with an extraction schedule, such that admin 12 may simply view continuously updated configuration information 20 without entering any commands.

As described above, canner 38 may issue a first command to and receive an associated response or portion of configuration information 20L from management interface 22L. Canner 38 in accordance with tagger 42A may next extract or parse one or more tags from the received portion of configuration information 20L. Based on these parsed tags, canner 38 may issue another command and invoke additional taggers 42 to further extract and parse additional tags. In this manner, canner 38 may adaptively extract configuration information 20 without any prior knowledge of the particular device 16.

Canner 38 may extract sets of tags 52 ("tags 52") in accordance with taggers 42 in a number of different ways depending on the format of the raw data received from each of devices 16. For example, upon receiving raw data, such as one of raw data 56, or command output in a structured eXtensible Markup Language (XML) document, canner 38 in accordance with one of taggers 42 may utilize an XML Path language, commonly referred to as "XPath," to extract specific nodes (e.g., tags) from a document tree. Most of the popular computer programming or scripting languages described above support or provide XPath functionality. More information regarding XPath can be found in a document entitled "XML Path Language (XPath) 2.0," published by the World Wide Web Consortium ("W3C"), and dated Jan. 23, 2007. Upon receiving raw data 56 that is self-contained on a line-per-line basis, as another example, canner 38 in accordance with one of taggers 42 may utilize regular expression pattern matching techniques. Alternatively, upon receiving raw data 56 that conforms to a language specific syntax, canner 38 again in accordance with one of taggers 42 may utilize token parsing and pattern matching against known grammars to extract tags.

Once the tags are parsed, canner 38 may package or "can" the tags, as well as, the raw data within one of archives 46 and store the tags and raw data to database 26, where sets of tags 52A-52N ("tags 52") and raw data 56A-56N ("raw data 56") represent the parsed and tags and raw data or extracted configuration information stored to respective archives 46. Canner 38 may store each of tags 52 in formatted file, such as a file formatted in accordance with a JavaScript Object Notation (JSON). More information concerning JSON file formats can be found in RFC 4627, titled "The application/json Media Type for JavaScript Object Notation (JSON)," prepared by the Network Working Group of the Internet Engineering Task Force (IETF), dated July 2006, herein incorporated by reference.

Canner 38 may also parse meta data 54A-54N ("meta data 54") or otherwise determine and store meta data 54 to respective archives 46 of database 26. Meta data 54 represents any data, such as log data, not included within tags 52 and raw data 56 but necessary to form graph data structure 48, debug or log action taken by taggers 42, etc. Canner 38 may also pre-generate HTML files of each of the files, such as each of tags 52, meta data 54, and raw data 56, so that user interface module 30 may quickly access and present these files via one of UIs 31 for review by admin 12. Thus, tags 52A, meta data 54A, and raw data 56A may include multiple formats of the underlying data, some in natural or received formats and others in converted formats, such as HTML or XML formats.

As described in further detail below, each of tags 52 represent a collection of one or more properties, where typically each tag 52 represents a single fact or property, such as "is running JUNOS 7.5" or "has an MTU of 1500," that is global in nature and meaningful alone. Each tag 52 may further comprise the above described "context" or relationships to other tags 52 associated with the same device 16 or another device 16 with which the current tag 52 is associated. Each reference to another tag 52 may include a link to the source file from which the reference was derived (e.g., one of raw data files 56), thereby allowing network configuration tool 14 to cross reference and correlate between summarized information and the raw data or command output.

Each tag 52 may also be associated with or define a "kind" or category of tags. For example, one kind of tag may be a "DNS server" or "BGP peer" kind. By categorizing or assigning tags 52 to standard or global kinds, tags 52 from different devices 16 may be compared, correlated, or otherwise analyzed regardless of any vendor specific incompatibilities. Kinds may also provide for a set definition or format by which a tag 52 of that kind presents information, thereby more readily facilitating the comparison of tags 52 from different sets of configuration information 20 of the same kind.

The kind defined each tag 52 may therefore enable network configuration tool 14 to establish relationships between sets of configuration information 20 despite configuration information 20 being formatted in accordance with a incompatible vendor-specific formats. In other words, the "kind" provides a global relationship by which network configuration tool 14 may identify similar tags 42 that define configuration properties that may be a subject of comparison. Moreover, one or more of tags 52 may comprise the above described "smart tags," which include error-checking algorithms implemented as functional code snippets or portions.

After storing archives 46 to database 26, admin 12 may interact with one of UIs 31 presented by user interface module 30 to view, analyze, update, alter, or troubleshoot configuration information 20 as represented in archives 46. For example, user interface module 30 may receive, from admin 12 via a UI 31, one or more tags upon which to filter archives 46. That is, admin 12 may select one or more tags that define a particular configuration property and/or one or more tags that have a configuration property set to a particular value. User interface module 30 may interact with graph module 32 to send this filter tags input, whereupon graph module 32 may search archives 46, or better stated, tags 52 of each of archives 46 for tag 52 that correspond to the filter tags. Although not shown in FIG. 2, database 26 may further store an index (not shown in FIG. 2) to facilitate access to tags 52 associated with commonly searched terms.

In this manner, network configuration tool 14 may enable an administrator to view devices 16 from the "bottom up," unlike conventional network configuration tools that typically require admin 12 to select one of devices 16 and traverse configuration information 20 stored to that device 16 in a "top down" manner to reach the selected configuration property. Instead, network configuration tool 14 allows admin 12 to select particular configuration properties of interest and provide configuration information 20 in the form of tags 52 for each device 16 that maintains configuration information 20 that corresponds to the filter tags input.

Upon determining which of archives 46 are associated with filter tags input, graph module 32 may construct graph data structure 48 based on tags 52 included within the determined archives 46. During construction, graph module 32 may employ mathematical operations referred to as "set arithmetic" to determine which of tags 52 "contexts" include or exclude other tags 52. Once constructed, graph module 32 provides either graph data structure 48 or a view of graph data structure 48 to user interface module 30, which in turn presents graph data structure 48 or the view to admin 12 via one of UIs 31. Admin 12 may further interact with this interface to toggle between different views of graph data structure 48, and graph module 32 may provide these other views to user interface module 30 upon receiving input that requests these other views, as described below in more detail.

Graph module 32 may traverse graph data structure 48 to determine views in one of two ways. First, graph module 32 may traverse graph data structure 48 along an edge from tag/graph vertices to the context (or referenced tag)/graph vertex. Alternatively, graph module 32 may traverse graph data structure 48 from the context (or referenced tag)/graph vertex to the tag/graph vertices. In one direction, graph module 32 may, for example, reveal that device 16A executes a particular application, while traversing in the other direction reveals all of devices 16 executing the particular application.

Because of the bottom up (or tag-based or configuration property centered) nature of the filter tag input, graph module 32 may determine views that organize a least a portion of the first and second sets of configuration information 20 based primarily on the determined relationships between the first and second tags, e.g., a tag kind, and secondarily on the network devices 16 from which the first and second sets of configuration information 20 was extracted or received. That is, graph module 32 may traverse graph data structure 48 and determine how many tags of each kind exist and organize the tags according first to the kind of tags and secondly according to the device that stored the configuration from which the tag was extracted. As the bottom up nature was contrary to conventional configuration tools, so too is the presentation of the tags, as the presentation of the tags continues the bottoms up (or tag-based or configuration property centered) nature. In other words, graph module 32 may organize a view, which user interface module 30 presents via one of UIs 31, such that the view if primarily based on the relationship between tags, such as the kind of tag, and only secondarily based on which device stores the configuration information 20 from which the tag was extracted.

Within these views, admin 12 may define the scope of tags 52 that user interface module 30 presents, as well as, expand or contract the scope of the view to focus on a single device 16, a subset of devices 16, or the entire set of devices 16. The scope may identify the above described filter tag input. A number of other options are also available and described below in more detail. In each instance, graph module 32 may return the defined view of graph data structure 48 to user interface module 30, which updates a currently displayed UI 31 or provides a new one of UIs 31 to display the view.

While interacting with graph data structure 48 via one of UIs 31 presented by user interface module 30, admin 12 may also define and invoke rules or algorithms, such as the above described error-checking algorithms. Alternatively, the rules, such as rules 49, may have been previously defined or loaded into database 26 and admin 12 merely invokes the previously defined rules 49. Some of the algorithms may comprise statistical algorithms that graph module 32 applies to graph data structure 48 to determine instances where similar properties (or tags 52 of the same "kind") are configured differently, thereby revealing anomalies in the extracted properties.

User interface module 30, in response to input by admin 12 to invoke a rule, supplies the rule or algorithm to either or both of graph module 32 or rules engine 34. Graph module 32 may execute some algorithms, particularly those algorithms that require traversal of graph data structure 48. Graph module 32 may automatically, during traversal of graph data structure 48, execute algorithms contained within nodes of graph data structure 48 that are associated with smart tags. Graph module 32 may, in executing these smart tags, detect errors and generate the above described "error" tags and insert these error tags into graph data structure 48, such that one or more of the determined views may present the error tag to admin 12. Other rules may not require graph module 32, such as rules 49, and rules engine 32 may execute these rules 49 and issue any alerts, warnings, or errors related to the execution of rules 49 to user interface module 30 for presentation to admin 12 via one of UIs 31.

Admin 12 may, either in response to an error tag, or in an attempt to improve the performance or update the configuration of network 10, modify, alter, edit, or update tags 52. Admin 12 may interact with one of UIs 31 presented by user interface module 30 to specify or input a change to tags 52. User interface module 30 in response to receiving the specified changes interacts with management interface module 22 and forwards the changes or the entire updated tags 52 to generator engine 40.

In response to receiving the updated tags 52, management interface module 28, as described above, establishes a session with device 16 associated with the updated tags 52 in accordance with one or more of HTTP 51A, SSH 51B, TELNET 51C, SNMP 51D, and XNM 51E, receives information identifying the device 16 and respective management software interface 22, and executes one or more of generators 44 to "push" the changes with respect to associated tags 52 to configuration information 20 stored within the associated one of devices 16. Generators 44 push the changes by inputting the changes in a format that the associated management software interface 22 understands. The changes may add, remove, or edit configuration information 20 stored to the associated one of devices 16. User interface module 30 may present via the one of UIs 31 a message or other notification stating that the changes were successfully or unsuccessfully applied to configuration information 20. In this manner, network configuration tool 14 may provide vendor independent UIs 31 by which admin 12 may view, analyze, share, exchange, update, delete or otherwise interact with a large number of devices 16 from disparate vendors.

Network configuration tool 14 is described above with respect to a number of modules, engines, and components; however, these modules, engines, and components are presented merely for purposes of illustration. The modules may be implemented as separate functionalities of a single hardware component or of a single software program. Moreover, the modules may be implemented as a combination of both hardware and software. The techniques, therefore, should not be strictly limited to the particular exemplary embodiments described herein and may include a number of other embodiments.

Figure 3:
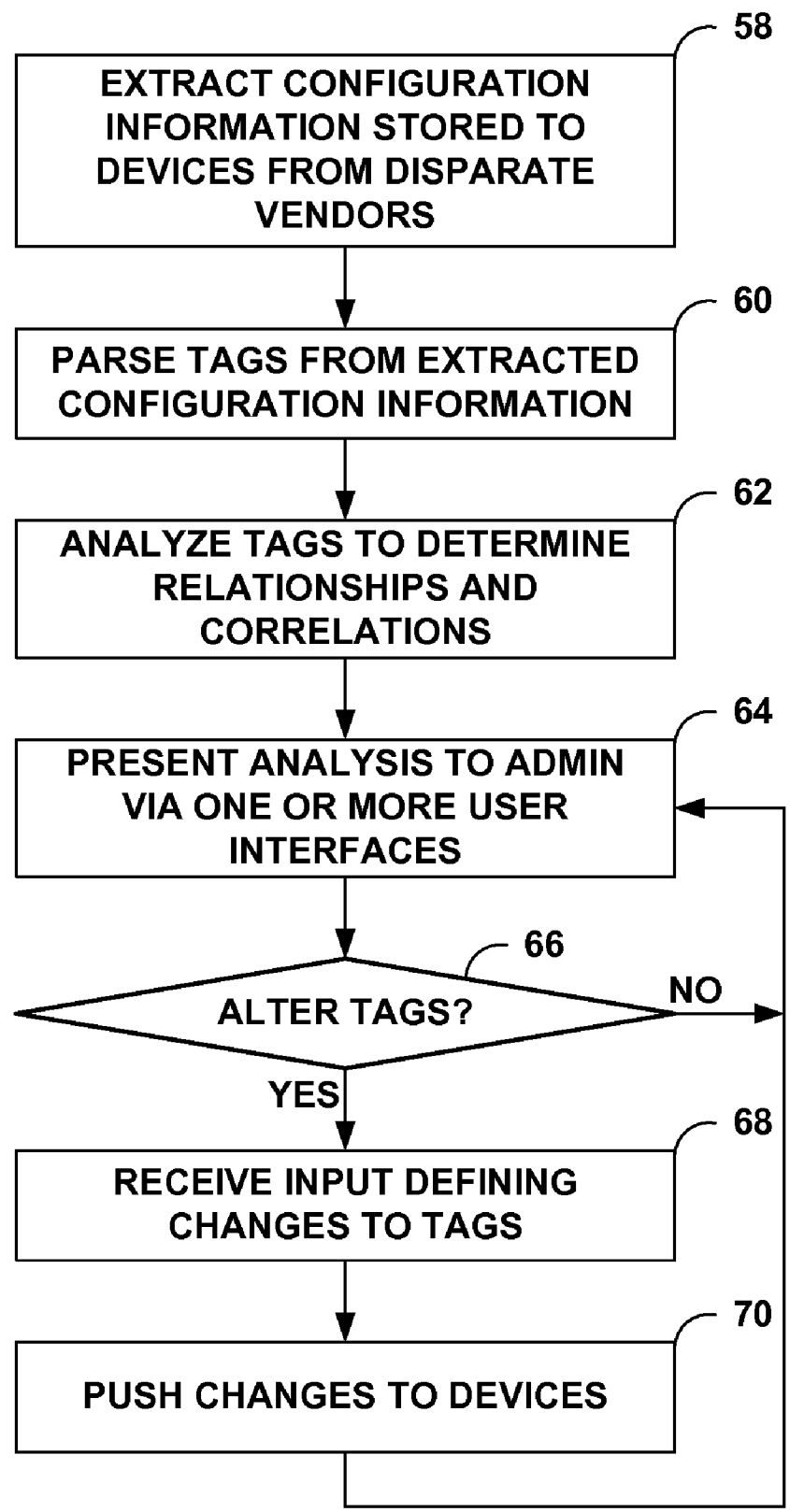
FIG. 3 is a flowchart illustrating example high-level operation of the network configuration tool.

FIG. 3 is a flowchart illustrating example high-level operation of a network configuration tool, such as network configuration tool 14 of FIG. 2, in providing a vendor independent interface. A user, such as admin 12 of FIG. 1, may interact with the vendor independent interface provided by network configuration tool 14 to view, analyze, alter, and otherwise manage configuration information, such as configuration information 20, stored within multiple devices from disparate vendors, such as devices 16.

Initially, admin 12 may interact with one of UIs 31 presented by user interface module 30 of network configuration tool 14 to extract information stored to one or more of devices 16 from disparate vendors in the manner described above. Management interface module 28 in accordance with one of HTTP 51A, SSH 51B, TELNET 51C, SNMP 51D or XNM 51E establishes a connection 23 with the specified ones of devices 16. After establishing one of connections 23, canner 38, as described above, extracts respective configuration information 20 from the specified ones of devices 16 from disparate vendors (58).

Once extracted, canner 38 in accordance with compatible taggers 42 parses tags 52 from extracted configuration information 20, as described above (60). Typically, canner 38 packages those tags 52 within a JSON formatted file and stores those tags 52 to one of archives 46 of database 26.

Upon parsing tags 52 from extracted configuration information 20, network configuration tool 14 analyzes tags 52 to determine interrelations and correlations between tags 52, as described above (62). For example, graph module 32 of network configuration tool 14 may construct a graph data structure 48 based on one or more of tags 52, where graph data structure 48 as described above provides a data structure for defining the various interrelations and correlations between tags 52 in the form of an adjacency matrix or adjacency table. Graph module 32 may analyze tags 52 by analyzing graph data structure 48 according to the above described algorithms designed, for example, to detect errors. Graph module 32 may further analyze graph data structure 48 by performing statistical analysis on graph data structure 48 to, for example, detect configuration inconsistencies.

Graph module 32 may transmit the analysis in the form of varying views of graph data structure 48 to user interface module 30, which in turn presents the analysis to admin 12 via one or more of UIs 31, as described above (64). Based on the analysis or views presented by one or more of UIs 31, admin 12 may input changes to tags 52 via another one or more of UIs 31. Thus, network configuration tool 14 may present the analysis or views of graph data structure 31 until admin 12 alters tags 52 ("NO" branch of 66, 64).

Upon receiving input to alter tags 52 ("YES" branch of 66, 68), user interface module 30 may interact with management interface module 28 to push those changes to devices 16, as described above (70). To push the changes, management interface module 28 may, as described above, establish a connection with the device 16 associated with the changed or updated one of tags 52, determine a compatible generator 44, and execute the compatible generator 44 to enter vendor specific commands to a respective one of management software interfaces 22 of associated device 16. In this manner, network configuration tool 14 may present a vendor independent user interface by which admin 12 may view, analyze, and alter configuration information 20 stored to devices 16 from disparate vendors.

Figure 4:
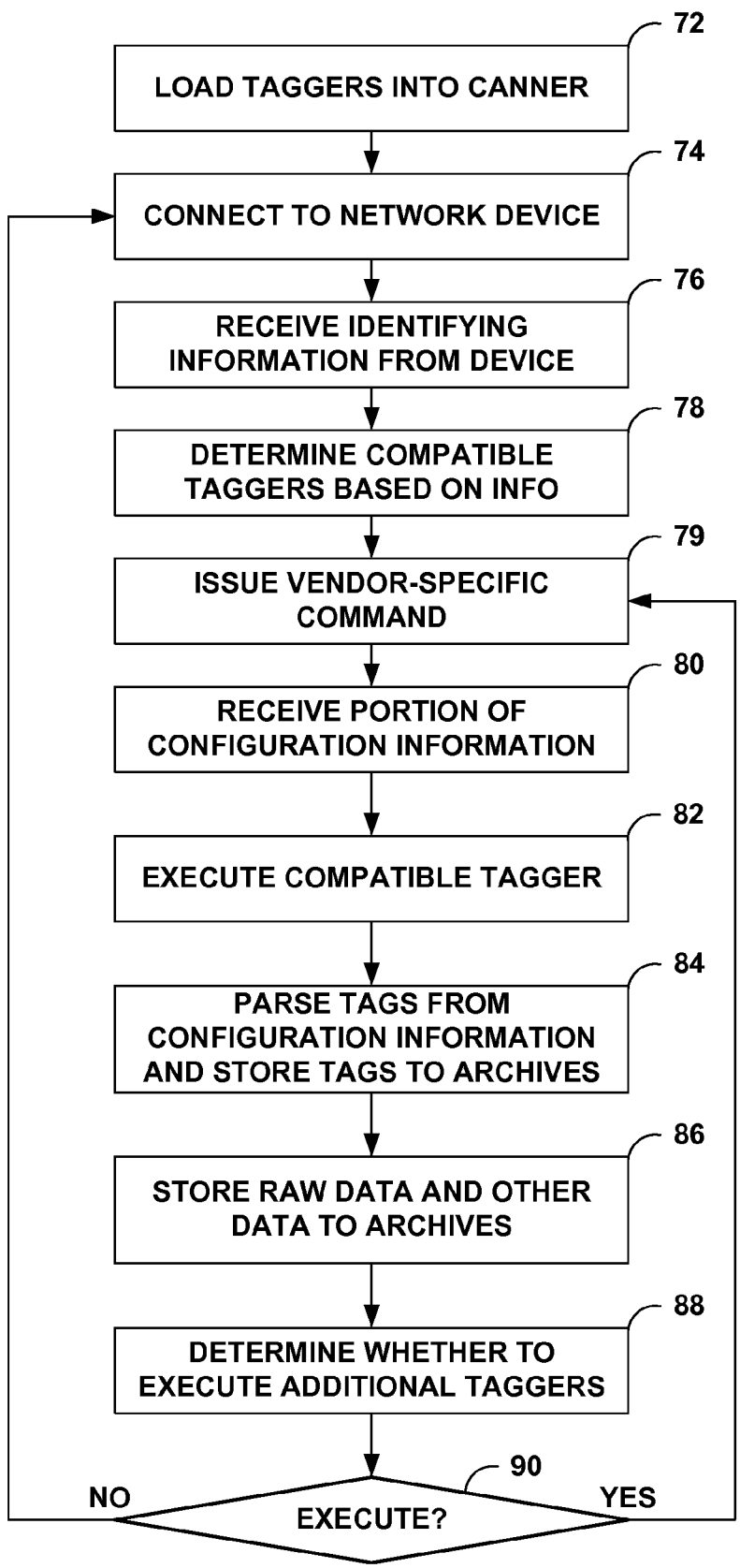
FIG. 4 is a flowchart illustrating example operation of the network configuration tool when adaptively extracting configuration information from various network devices and parsing tags from the extracted configuration information.

FIG. 4 is a flowchart illustrating example operation of a network configuration tool, such as network configuration tool 14 of FIG. 2, when adaptively extracting configuration information from various network devices and parsing tags from the extracted configuration information. Initially, as described above, a user or operator, such as admin 12 of FIG. 1, interacts with one of UIs 31 presented by user interface module 30 of network configuration tool 14 to load one or more of taggers 42 into canner 38. Once loaded, admin 12 may direct network configuration tool 14, again via input entered via one or more of UIs 31, to access configuration information 20 stored to one or more of devices 16.

Upon receiving this access request, user interface module 30 communicates with management interface module 28 and transmits one or more IP addresses to which management interface module 28 should connect. Management interface module 28, as described above, connects to network devices 16 assigned to the received IP addresses in accordance with one or more of HTTP 51A, SSH 51B, TELNET 51C, SNMP 51D and XNM 1E (74). Management interface module 28, upon connecting to one of devices 16, receives identifying information from the one of devices 16 (76). The identifying information, as described above, typically identifies the type of device 16 or product and the version and name of the respective one of management software interfaces 22.

Based on the identifying information, canner 38 determines compatible taggers 42 in the manner described above (78). Canner 38 may provide or make available to taggers 42 a number of environment variables. For example, canner 38 may provide a "SESSION_DEVICE" environment variable or a variable that designates the device 16 to which management interface module 28 is currently connected. Canner 38 may also provide a "SESSION_ID" variable, a "TRIGGER_KIND" variable, a "TRIGGER_NAME" variable, and a "TRIGGER_FILENAME" variable.

The SESSION_ID variable is a variable that designates a unique identifier or "ID" that identifies the current session. The TRIGGER_KIND variable is a variable that designates a classification or category of any tags 52 for which taggers 42 parse from extracted configuration information 20. The TRIGGER_NAME variable is a variable that designates a tag 52 that caused canner 38 to execute the currently executing tagger 48. The TRIGGER_FILENAME variable is the filename or raw data file 56 that triggered the execution by canner 38 of the currently executing tagger 48. Canner 38 may maintain and update these variables to facilitate the execution and operation of taggers 42 and further enable the parsing of tags 52 such that tags 52 may correctly express the above described tag's context. Canner 38 may also permit run-time arguments to be passed to taggers 42 during execution so as to enable taggers 42 additional accesses to run-time variables or other data.

As described above, canner 38 may issue vendor-specific command and, in response to the commands, receive a portion of configuration information 20 (79, 80). After extracting or receiving this portion of configuration information 20, canner 38 by executing compatible taggers 42 may parse one or more tags 52 from the received portion of configuration information 20 and store those tags 52 to an associated archive 46 (82, 84). Alternatively, as described above, canner 38 may execute compatible taggers 42 to issue the vendor-specific commands, extract configuration information 20, and parse those tags 52 from configuration information 20. Tags 52, also as described above, represent one of the outputs that result of canner 38 executing compatible taggers 42. Canner 38 may output tags 52 in the above described JSON format.

Typically, canner 38 provides each tag 52 with a name qualified by the above described "kind." For example, canner 38 may provide a tag name "1.1.1.1" (an IP address) with a kind of "name server." With tags 52, canner 38 may define relationships or a tag's context with either or both of an "implies" or "implied_by" designator. Further, canner 38 may specify within tags 52 a "sort_name" and a "display_name" field, which enable the author of a tagger 42 to designate specific names by which database 26 or user interface module 30 may respectively sort or display the associated tag 52.

Two example output tags 52 from one of taggers 42 are as follows:

```
[
  {
    "location": "foo.txt:100",
    "tag": "IPv4 subnet--24.1.2.0/28",
    "sort_name": "18010200/28",
    "display_name": "24.1.2/28",
```

-continued

```
    },
    {
        "location": "foo.txt:100",
        "tag": "IPv4 address--24.1.2.3",
        "sort_name": "18010203"
        "implies": "IPv4 subnet--24.1.2.0/28"
    }
]
```

The above "location" handle indicates a line number ("100") in an associated raw data file 56 identified as "foo.txt." The "tag" handle indicates the tag kind "IPv4 subnet" followed by a double dash ("--") and then a tag name (e.g., in the first output, "24.1.2.0/28"). When combined, the kind and name represent a single configuration property. If the tag has no kind or name, the remaining kind or name, in this instance, represents the configuration property. The "sort_name" handle indicates a name (e.g., in the first output, "18010200/28") by which to sort the tag. If no sort_name is provided, the tag is typically sorted according to the value associated with the "tag" handle. The "display_name" handle indicates a name (e.g., in the first output, "24.1.2/28") by which to display the tag. Again, if no display_name is provided, the tag is typically displayed according to the value associated with the "tag" handle.

As described above, canner 38 may also store other data, such as raw data files 56 and meta data 54, to archives 46 (86). After finishing executing one of compatible tagger 42, canner 38 may determine whether to execute additional compatible taggers 42 (88). Canner 38 may base this determination on previously extracted configuration information 20, e.g., raw data files 56, meta data 54, or tags 52 parsed by previously executed compatible taggers 42.

In some embodiments, canner 38 may maintain taggers 42 in accordance with a hierarchical directory structure that implies the dependency of taggers 42 to other taggers 42. Each of the directories has a name that is either a tag "kind" or a qualified tag containing a "kind--name." For example, the top level directory may include a sub-directory for each known operating system (OS) as well as other potential qualified tag names or kinds. Within that directory, canner 38 may execute a general tagger 42 which parses the OS name or other potential qualified tag names or kinds from configuration information 20 received in response to a "show version" command. Upon receiving that tag, canner 38 traverses to the directory indicated by the tag name or kind. Thus, canner 38 descends each directory, executing those taggers 42 stored in each directory.

Additionally, by executing taggers 38 and uncovering tags 52, canner 38 may discover new taggers 38 to execute, thereby expanding the extraction of configuration information 20. That is, canner 38 may execute one tagger 42 that parses one of tags 52 defining a new tag or tag "kind." The new "kind" may identify a directory not previously traversed, and canner 38 may return to and traverse that identified directory, executing new taggers 42. The directory structure therefore creates a dependency chain, ensuring compatible taggers 42 are executed for only select devices 16.

In some embodiments, taggers 42 may not each include the vendor specific commands by which canner 38 may properly interface with management software interfaces 22 of devices 16 from disparate vendors. Instead, in each of the above described directories, a new sub-directory is created of kind "file" followed by a double dash ("--") and the name of the file in which to save the output of the command. The actual command to run on the device is placed inside this directory using a filename of "Command." For example, a subdirectory of "file--running.cfg" may contain a file called "Command" containing the line "show running config." This directory may also include taggers 42 that canner 38 executes to parse the output of the command. In one embedment, taggers 42 may parse output to generate tags and not define the pertinent vendor specific commands to extract configuration information 20 from devices 16.

A number of well known tag kinds may be present within canner 38 and used to identify tags, as well as, directories. Exemplary kinds include an "address family" kind, an "admin status" kind, an "autonomous system" kind, a "BGP group" kind, a "BGP peer" kind, a "BOOTP relay" kind, a "chassis" kind, a "config log" kind, a "config user" kind, a "domain name" kind, a "file" kind, a "flag" kind, a "hostname" kind, an "interface" kind, an "interface description" kind, an "interface type" kind, an "IPv4 address" kind, "IPv4 subnet" kind, an "IPv6 address" kind, an "IPv6 subnet" kind, a "module" kind, a "MSDP group" kind, a "MSDP peer" kind, a "name server" kind, a "NTP server" kind, an "OS" kind, an "OSPF area" kind, an "OSPFv2 area" kind, an "OSPFv3 area" kind, a "physical interface" kind, a "RADIUS server" kind, a "registered network" kind, a "registered network subnet" kind, a "registered organization" kind, a "routing protocol" kind, a "service" kind, a "snapshot date" kind, a "snapshot device" kind, a "snapshot ID" kind, a "snapshot month" kind, a "snapshot timestamp" kind, a "snapshot user" kind, a "snapshot year" kind, a "user" kind, a "version" kind, and a "VLAN ID" kind.

Additional kinds may be defined by any user, and a website or other interactive computing environment may enable standard definitions of additional kinds. Typically, kinds do not overlap or contain information that may relate to another tag so as to maximize comparisons, as only tags 52 of the same or like kind can be compared later during analysis, and overlap may cause some tags of overlapping kinds to not be compared, as one tag is associated to a first overlapping kind while another tag is associated with a second overlapping kind.

Canner 38 may therefore determine whether to execute additional taggers 42 based on the directory structure and issue additional vendor specific command, receive additional portions of configuration information 20, execute compatible taggers 42 to parse and store tags 52, and store the other data until reaching the last tag in the last sub-directory ("YES" branch 90, 80-88). Upon traversing this last directory structure, canner 38 may stop executing compatible taggers 80 and wait until a connection is established with another device 16 for which canner 38 may be required to extract respective configuration information 20 (74-90). Accordingly, network configuration tool 14 may extract configuration information 20 from devices 16 supplied by disparate vendors and parse tags 52 from configuration information 20.

Figure 5:
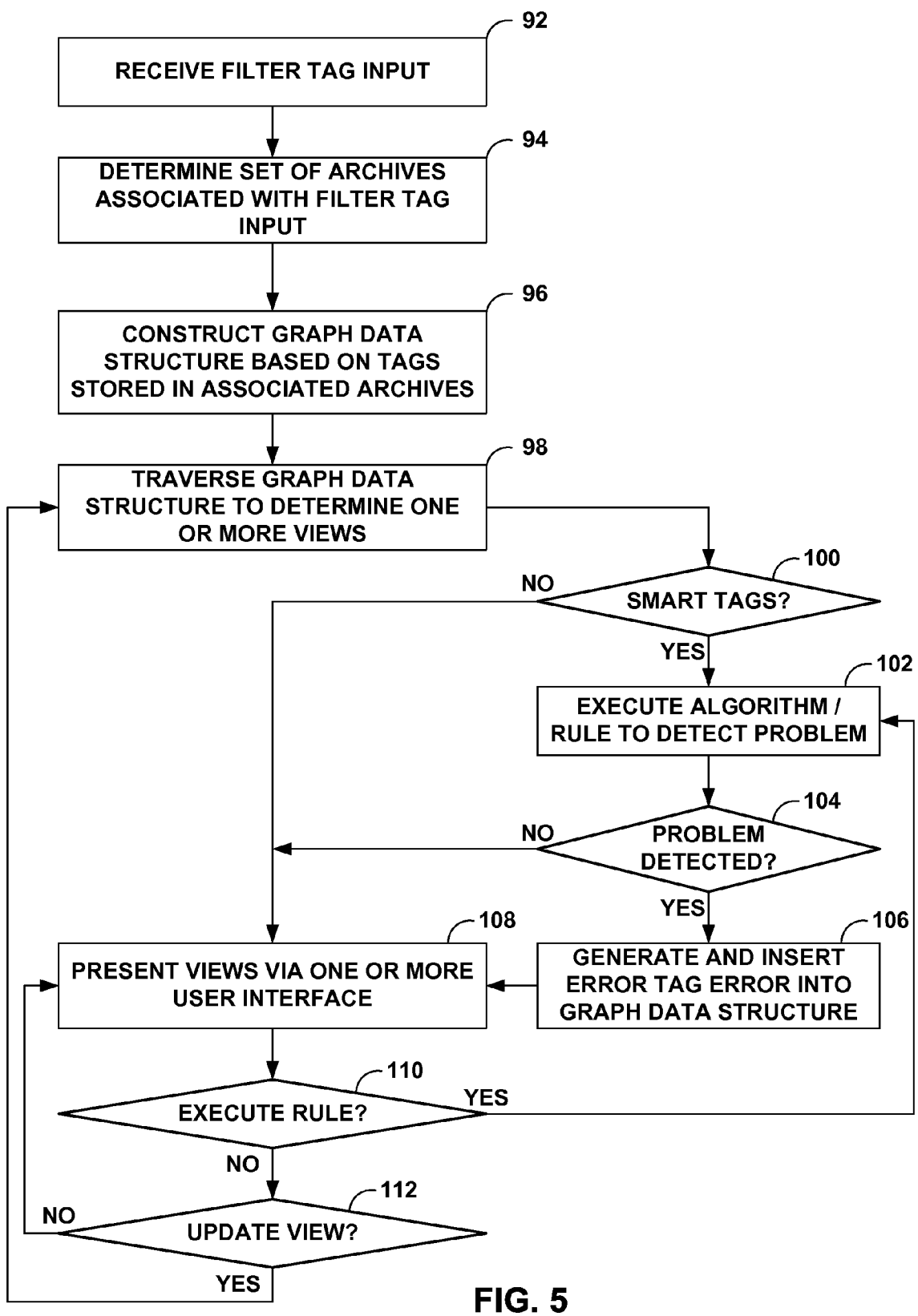
FIG. 5 is a flowchart illustrating example operation of the network configuration tool in analyzing tags parsed from extracted configuration information stored to network devices.

FIG. 5 is a flow chart illustrating example operation of a network configuration tool, such as network configuration tool 14 of FIG. 2, in analyzing tags parsed from extracted configuration information stored to network devices. Initially, a user, such as admin 12 of FIG. 1, may, for example, enter input specifying one or more tag kinds, one or more tag names, and/or one or more values assigned to one or more configuration properties defined by tags via one of UIs 31 presented by user interface module 30 of network configuration tool 14. This input is described herein as the filter tag input. User interface module 30 may receive this filter tag input (92) and forward the input to graph module 30.

Based on the entered input, graph module 30 may, as described above, determine a set of archives 46 (94). In the manner described above, graph module 30 constructs graph data structure 48 based on tags 52 stored within the associated set of archives 46 (96). Graph module 30 may in some instances utilize Boolean logic to infer additional tags from existing tags 52 and add these inferred tags 52 to graph data structure 48. Graph module 30 may traverse graph data structure 48 to determine one or more view, also as described above (98).

Graph module 30 may, for example, traverse graph data structure 48 by moving between nodes of an adjacency matrix, where each node references one of tags 52. Graph module 30 may access the referenced tags 52 to determine whether the referenced tag 52 is a smart tag (100). Upon a determination that the referenced tag 52 is a smart tag, graph module 30 may execute the algorithm, code and/or rule defined within the smart tag 52 to, for example, detect a configuration problem, error, or warning ("YES" branch of 100, 102).

An example algorithm that may be referenced by a smart tag 52 is as follows:

```
# Check for MTU mismatches
# This would be run for 'IPv4 subnet' tags
def check(subnet_tag):
    error = False
    common_mtu = None
    for if_tag in subnet_tag.ancestors_of_kind("interface"):
        mtu_tag = if_tag.descendant_of_kind("MTU")
        if !mtu_tag:
            pass
        elif !common_mtu:
            common_mtu = mtu_tag.name
        elif mtu_tag.name != common_mtu:
            error = True
    if error:
        subnet_tag.add_tag("error", "MTU mismatch")
```

The first two lines, which are preceded by the "#" sign, indicate comments. The programmer or coder of the tagger 42 may want to input comments so that upon inspection of this tag 52, admin 12 may determine how the error tag was generated and to what the error relates. The third line defines a check "subnet tag" algorithm. The fourth line species a variable "error," which is initially set to false to indicate that no error has yet been detected. The fifth line designates another variable "common_mtu," which may store a configuration property (e.g. a maximum transfer unit or MTU configuration property). Currently this variable is set to "none," which indicates the value has yet to be determined from graph data structure 48.

The sixth line indicates a "for" loop that loops through all nodes of graph data structure 48 starting from a "subnet tag" and that reference tags defining a kind designated as "interface." The ancestors_of kind function shown in the fifth line indicates that graph module 32 may traverse edges from the subnet tag to ancestral nodes or nodes that depend from the smart tag or subnet tag in search for tags that define a tag kind of "interface." Upon finding a node that defines a kind of "interface," the next seven lines or the seventh through fourteenth lines determine whether the tag is an MTU tag, and if so, parse the value assigned to the configuration property of the MTU tag. These lines seven through fourteen further determine whether the MTU value of the tag under analysis is equal to a common MTU value (which in some configurations should be the case) shared by other tags in the subnet. If not, in the fourteenth line, the "error" variable is set to True.

Lines fifteen and sixteen cause graph module 32 to generate and insert a new tag of name "error" which defines a configuration property of "MTU mismatch." Graph module 32 may set the context of this new tag as the subnet tag, which is currently under analysis. Conceptually, smart tags 52 are similar to taggers 42 that run against tags 52 from one or more snapshots or archives 46 instead of against a device's raw configuration files or raw data files 56.

Upon detecting a problem, graph module 30 may create or generate a new tag that defines an error configuration property and be of an error tag kind. The error configuration property may specify an error, warning, or alert message or code. The error tag may further include a tag "context" that references the tag that defines the improperly configured configuration property, and using this context, graph module 30 may insert the error tag into graph data structure 48, such that upon traversal of graph data structure 48 the error may appear in one or more of the determined views, as described below in more detail (106, 108). However, if the tag is not a smart tag ("NO" branch of 100) or no problem is detected ("NO" branch of 104), user interface module 30 presents one or more of the views determined by graph module 30 via one or more of UIs 31 (108).

Admin 12 may further interact with the one or more of UIs 31 that present the views to execute a rule, such as one of rules 49 (110). Particularly, admin 12 may execute a rule 49 if no previous error was detected and admin 12 is attempting to troubleshoot a network connection. In response to receiving this input, rule engine 34 executes the specified one of rules 49, which proceeds to perform the problem detection, error tag generation, and view presentation via one of UIs 31, as described above (102-108).

Admin 12 may also traverse between views, increase or decrease the scope of a current view, or otherwise alter a view such that user interface module 30 may update, refresh, or replace the current one of UIs 31 (112). Upon the occurrence of such a view altering event, user interface module 30 may invoke graph module 30 to traverse graph data structure 38 to determine one or more new views (98). If no such view altering event occurs, however, user interface module 30 continues to present the one or more views via one or more of UIs 31. Thus, network configuration tool 14 may enable a user, such as admin 12, to view, analyze, troubleshoot, or otherwise traverse configuration information 20 extracted from devices 16 from disparate vendors.

Although not shown in FIG. 5, admin 12 may clear the filter tag input to reset the current graph data structure 48 and subsequently specify another filter tag input (92), whereupon graph module 32 begins the process of determining archives 46 and constructing graph data structure 48 again (94, 96). Thus, admin 12 may update the view entirely by clearing the filter tag input to reset the current view.

Figure 6:
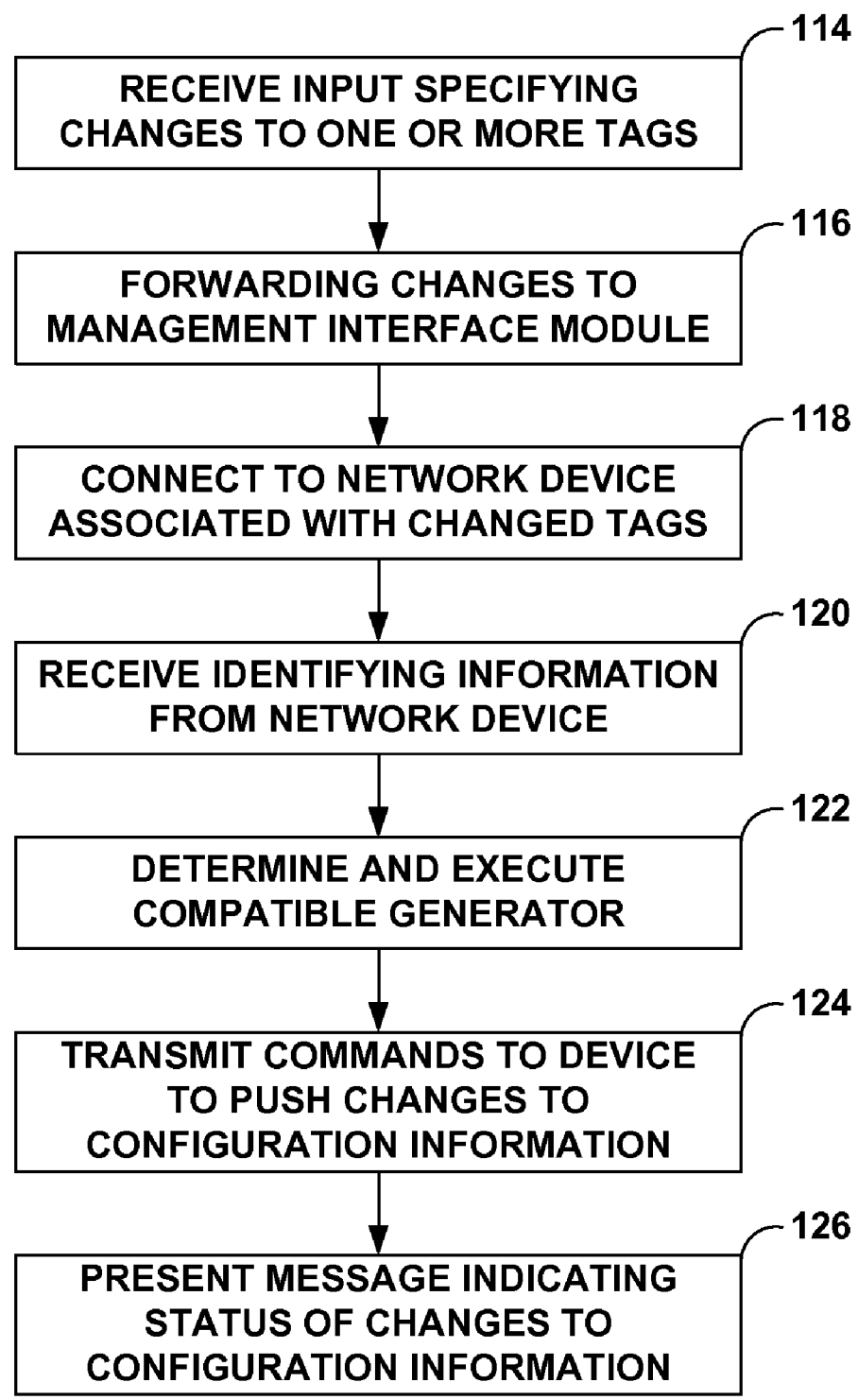
FIG. 6 is a flowchart illustrating example operation of the network configuration tool in pushing changes made to tags back to the configuration information stored on the network devices.

FIG. 6 is a flowchart illustrating example operation of a network configuration tool, such as network configuration tool 14 of FIG. 2, in pushing changes to tags back to configuration information stored on network devices. As described above, a user, such as admin 12 of FIG. 1, may interact with a UI 31 presented by user interface module 30 of network configuration tool 14 to input changes to one or more of tags 52. User interface module 30 may receive the input specifying the changes to one or more of tags 52 and forward those changes or the changed tags 52 to management interface module 28 (114, 116).

Upon receiving the changes, management interface module 38 may determine which of devices 16 are associated with the changed tags 52 and establish a secure connection to the determined devices 16, as described above (118). Management interface module 28 may receive information identifying the determined devices 16 and respective management software interfaces 22 executing within the determined devices 16 (120). In the above described manner, generator engine 40 may invoke or execute one or more of generators 44 (122). Similar to how canner 38 stores taggers 42, generator engine 40 may store generators 44 to a hierarchical directory structure so as to correctly determine which generators 44 to execute.

As further described above, generator engine 40, by executing those compatible generators 44, may transmit commands to the determined devices 16 via a secure connection, such as connection 23, to push changes to configuration information 20 stored to the determined devices 16. Generator engine 40 may cause user interface module 30 to present via one of UIs 30 a message indicating the status, e.g., success or failure, of the update to configuration information 20. In this manner, network configuration tool 14 may enable a user, such as admin 12, to update, alter, replace, or otherwise change configuration information 20 stored to devices 16 regardless of the vendor that manufactured each of devices 16.

Figure 7:
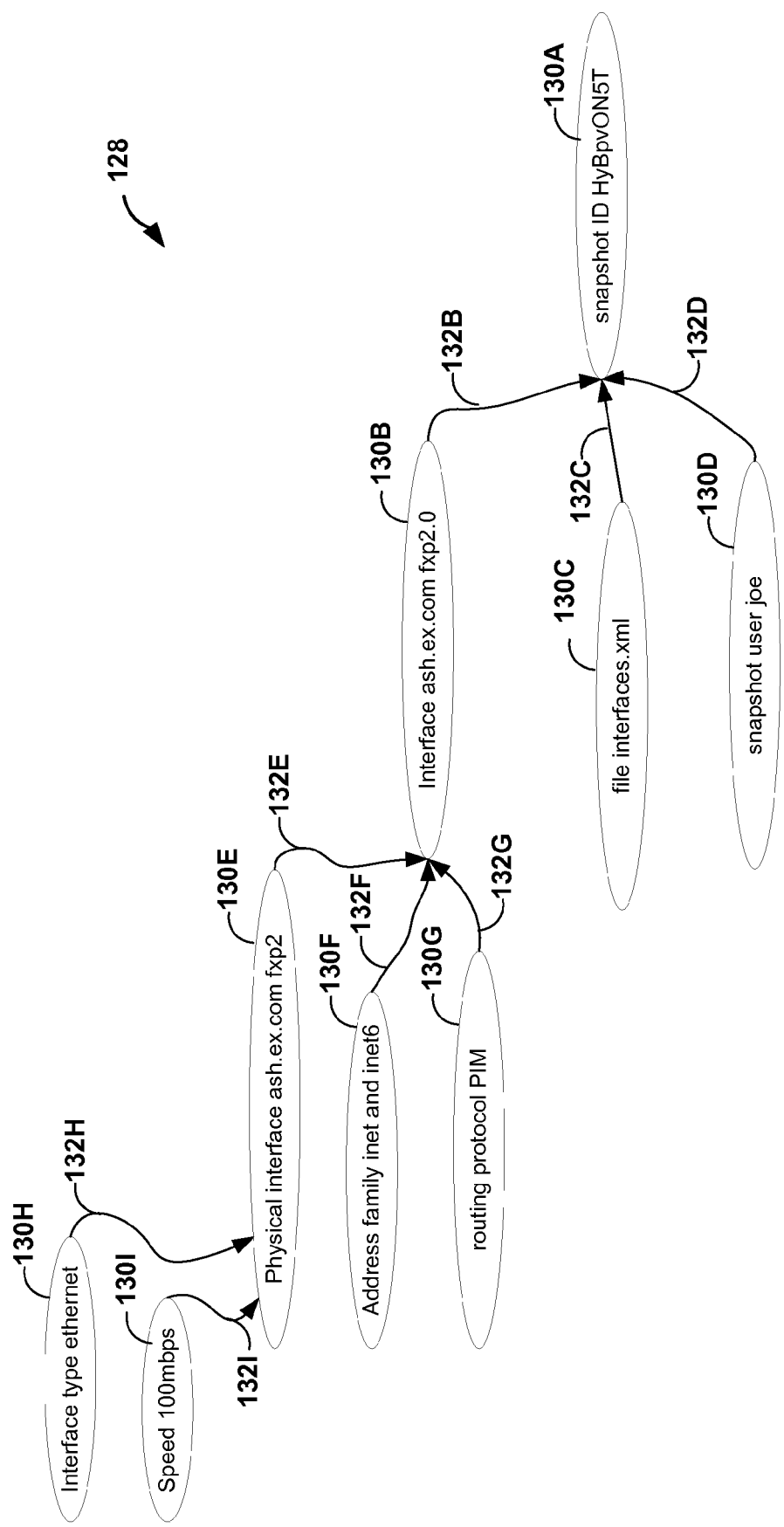
FIG. 7 is a schematic diagram illustrating an exemplary graph data structure that a network configuration tool may construct based on tags associated with devices from different vendors.

FIG. 7 is a schematic diagram illustrating an exemplary graph data structure 128 that a network configuration tool, such as network configuration tool 14 of FIG. 2, may construct based on tags associated with devices from different vendors. Graph data structure 128 includes a plurality of nodes 130A-130I ("nodes 130") and a plurality of edges 132B-132I ("edges 132"). Typically, graph data structure 128 as constructed by a graph module, such as graph module 32, includes tens, hundreds, or even thousands of nodes. Moreover, as described above, graph data structure 128 may be stored as an adjacency list or adjacency matrix. FIG. 7 presents this adjacency list or matrix graphically, so as facilitate the discussion of graph data structure 128, but network configuration tool 14 may also present a graphical view of data structure 128 via one of UI 31 to facilitate debugging of taggers or otherwise enable admin 12 to graphically view data structure 128. Thus, the invention should not be strictly limited to the illustrated graph data structure 128 and contemplates much larger and more complex data structures stored in adjacency lists or matrixes.

Each of nodes 130 represents a tag, such as one of tags 52. In this instance, only tags 52 from a single snapshot, or archive 46, are included within graph data structure 128, as node 130A identifies a single snapshot by its identifier or "ID" of "HyBpvON5T." However, graph data structure 128 may be constructed from one or more sets of tags 52, including tags 52 from two archives 46 of the same set or associated with the same device 16, as well as, tags 52 from two archives 46 from different sets or associated with different devices 16. Nodes 130B-130D each respectively identify a tag 52 with a name or "display_name," as described above, of "Interface ash.ex-.com fxp2.0," "file interfaces.xml," and "snapshot user joe." Each of these nodes 130A-130C further include a reference or tag's context, which are represented by edges 132B-132D. These edges 132B-132D specify the context as node 130A.

Each of nodes 130E-130G is dependent on node 130B, in a similar manner as nodes 130B-130D depend on node 130A. That is, the context for each of tags 52 represented by nodes 130E-130G is tag 52 represented by node 130B. These contexts are represented by edges 132E-132G. Nodes 130H-130I depend on nodes 130E and edges 132H-132I represent this context.

By following edges 132, graph module 32, for example, may analyze graph data structure 128 by inspecting each of nodes 130. Graph module 32 may further traverse graph data structure 128 by following edges 132 and generate views from graph data structure 128. For example, graph data structure 128 may traverse graph data structure 128 searching for interfaces types and speeds and may traverse to nodes 130H and 130I, whereupon graph module 32 extracts the information from these nodes and presents an "interface" view by causing user interface module 30 to present the interface view via a UI 31. Graph module 32 may further, while traversing graph data structure 128, execute error-checking algorithms. For example, graph module 128 may execute an error-checking algorithm to determine whether the speed for this type of interface is properly configured. The tag 52 represented by node 130E may comprise a smart tag that includes the error-checking algorithm graph module 128 executes. In this manner, network configuration tool 14 may construct and analyze configuration information 20 extracted from devices 16 from disparate vendors.

Figure 8:
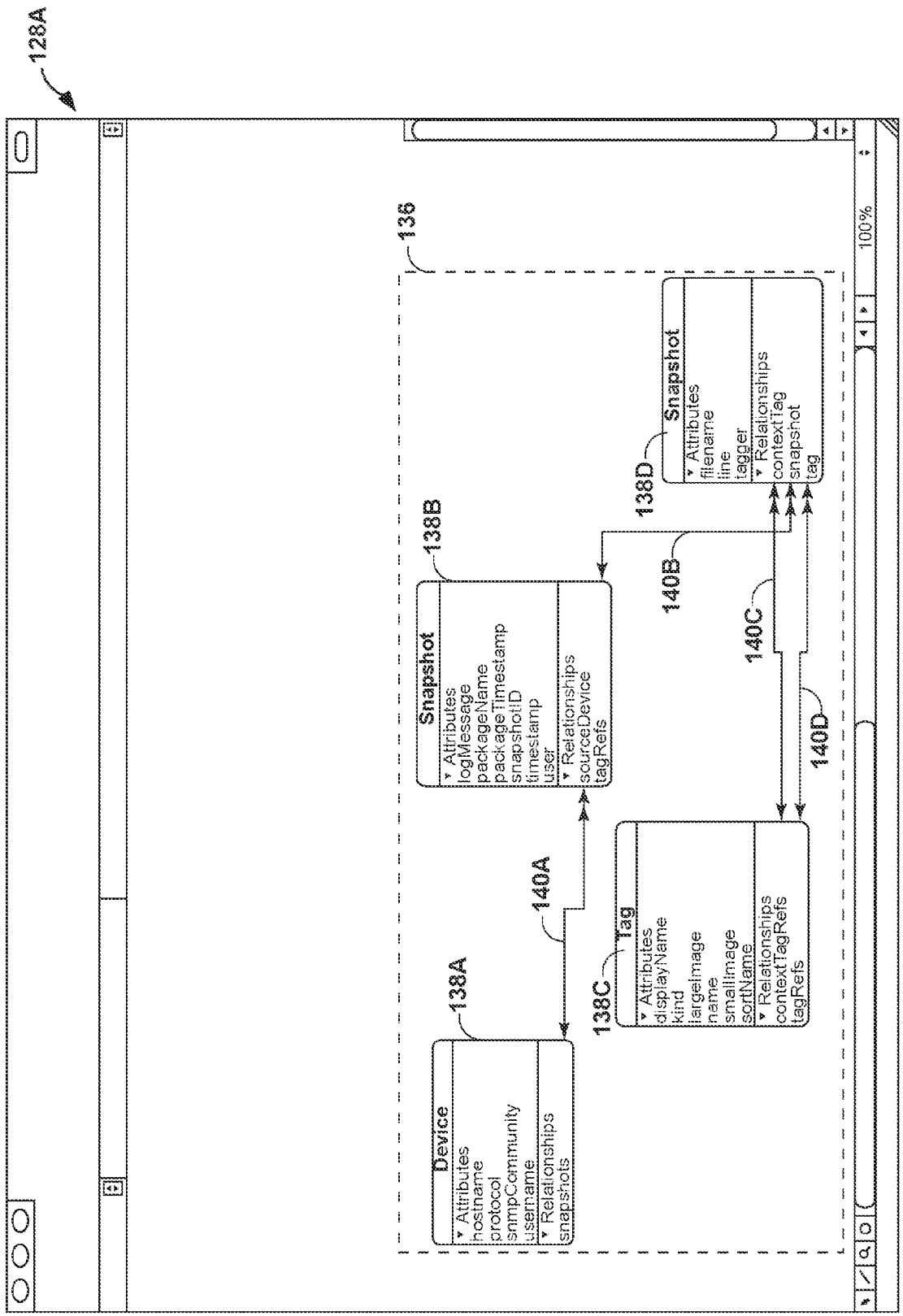
FIG. 8 is a screenshot illustrating an example screenshot presenting a portion of an example database schema of a database maintained by the network configuration tool.

FIG. 8 is a screenshot illustrating a user interface 134 in presenting an example portion of a database schema 136 for a database, such as database 26 of FIG. 2, maintained by a network configuration tool, such as network configuration tool 14. Network configuration tool 14 may present user interface 134 or alternatively, a database configuration tool may present user interface 134.

Database schema 136 may comprise an object-based database scheme. In an object-based scheme, each object or entity may be defined to relate to other objects. Database scheme 136 includes objects 138A-138D ("objects 138") and relationships 140A-140D ("relationships 140"). Each of objects 138 may define attributes and include one or more of relationships 140. For example, objects 138A, as shown in FIG. 8 and identified as "Device" object or entity, includes four attributes: a "hostname" attribute, a "protocol" attribute, a "snmpCommunitiy" attribute, and a "username" attribute. Object 138A also includes a "snapshots" relationship.

Relationships 140 are represented as lines, with one or both ends of the arrows having one or more arrows. A line edge with no arrow indicates that no relationship exists in that direction between objects 138. A line end with only a single arrow represents a one way relationship between the referenced two objects 138 in the specified direction. A line edge with two or more arrows represents a many way relationship between the referenced two objects 138 in that direction. Lines where both ends have arrows may represent either a one-to-many relationship or a one-to-one relationship. All of relationships 140 of database schema 136 are one-to-many relationships, as relationships 140 each have a single arrow end and a multi-arrow end.

Considering the above representations, database schema 136 therefore presents an exemplary diagram of how archives, such as archives 46, are stored to a database, such as database 26. For example, devices object 138A has a relationship of one-to-many with snapshot objects 138B, which suggests that database 26 may store one or more archives 46 for each device 16. Devices 16 are identified within database 26 by the attributes shown in device object 138A and archives 46 may store those attributes shown with respect to snapshot object 138B. Archives 46 may therefore store a "log message," a "packageName," a "packageTimeStamp," a "snapshotID," a "timestamp," and a "user." One or more of these attributes may be termed meta data, and be stored as one of meta data 54.

Snapshot 138 also includes a one-to-many relationship 140B with TagRef object 138D. TagRef object 138D provides a reference to specific tags within a file, where, as described above, the tags were parsed from raw data file 56. TagRef object 138D defines attributes identifying the raw data file 56 "filename" and the "line" of the raw data file 45 from which the "tagger" parsed the referenced tag. TagRef object 138D therefore defines how raw data files 56 are stored to database 26.

TagRef object 138D includes two one-to-many relationships 140C, 140D with Tag object 138C. One relationship 140C provides the tags context or "contextTagRefs" and the second relationship, relationship 140D, defines a one-to-many relationship to the tag. Each tag object 138C comprises a number of attributes including a "displayName," a "kind," a "largeImage," a "name," a "smallImage," and a "sortName," most of which are described above in more detail. The large-Image and smallImage attributes may contain the location of respective small and large images or icons that user interface module 30 may load upon displaying the associated tag. In this manner, database 26 may adhere to database scheme 136 to store archives 46, tags 52, meta data 54, and raw data 56.

Figure 9A:
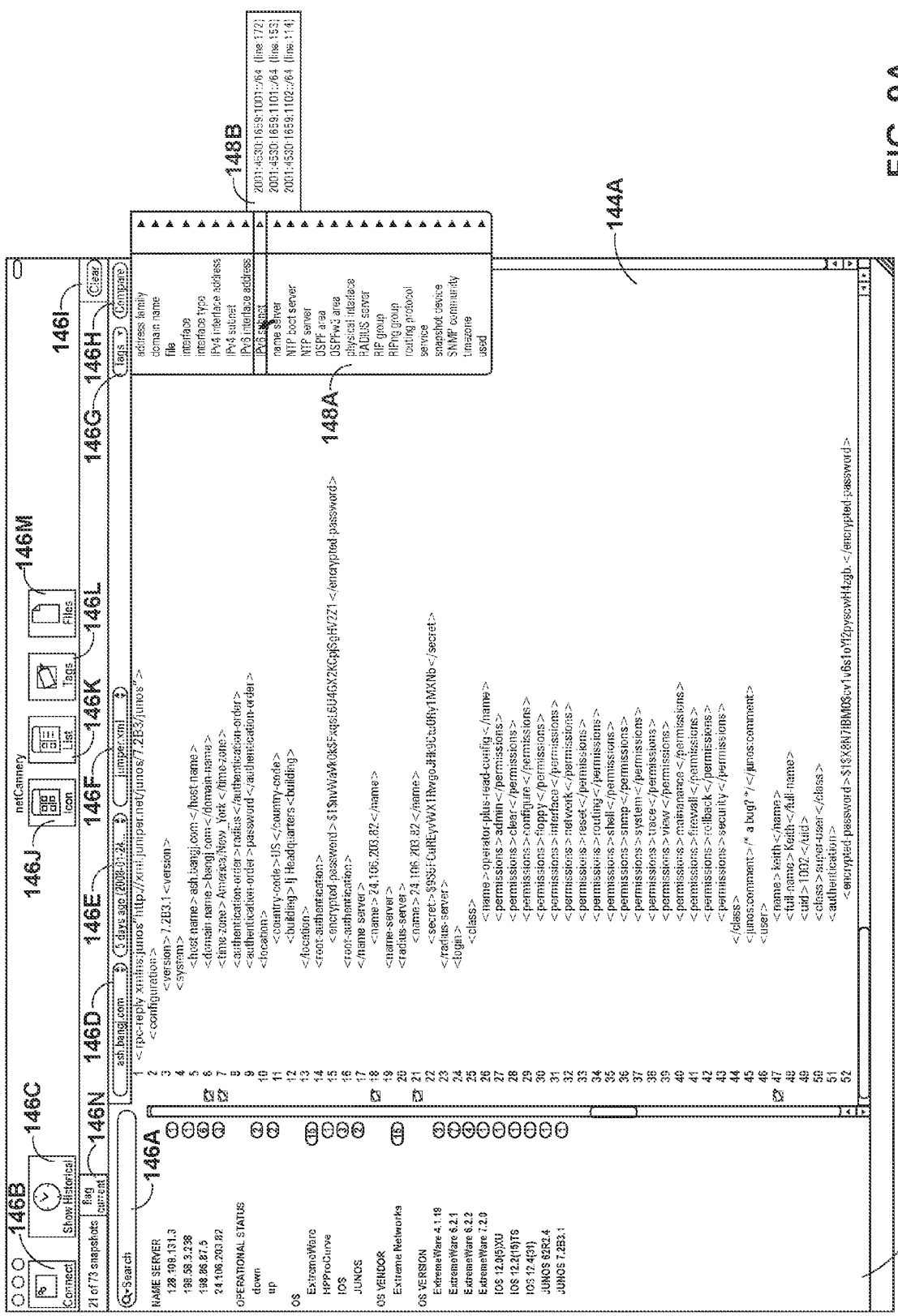

FIGS. 9A-9F are screenshots illustrating example user interfaces 142A-142C presented by a vendor-independent network configuration tool, such as network configuration tool 14 of FIG. 2. FIG. 9A is a screenshot illustrating a user interface 142A that presents a first view of raw data files, such as raw data files 56, and tags 52 parsed from or associated with the currently displayed raw data file 56. This first or file view may be determined through analysis of a graph data structure, such as graph data structure 48 of FIG. 2. Graph module 32 may traverse graph data structure 48 to determine this first view and transmit this view to user interface module 30, which presents this first view via one of UIs 30. User interface 142A therefore represents an exemplary representation of that one of UIs 30.

As shown in FIG. 9A, user interface 142A includes a first window or frame 144A and a second frame 144B. Within frame 144A, user interface 142A presents one of raw data files 56 for inspection by a user, such as admin 12 of FIG. 1. Within frame 144B, user interface 142B presents tags 52 parsed from the one of raw data files 56 under inspection and organized these tags 52 according to their respective kinds. For example, tags 52 having names or display names of "down" and "up" are of kind "operational status." Moreover, frame 144B presents, next to each tag, a number identifying the number of those tags in a determined list of currently matching snapshots or archives 46. These numbers may be computed by graph module 32 while traversing the graph and represent the result, for example, of the above described statistical analysis.

Admin 12 may interact with user interface 142A in a number of ways to update either of frames 144A, 144B. In particular, user interface 142A includes a search input 146A, a connect input 146B, a historical input 146C, a domain selection input 146D, a time selection input 146E, a format selection input 146F, a tag selection input 146G, a compare input 146H, a clear input 146I, an icon view input 146J, a list view input 146K, a tags view input 146L, a files view input 146M, and a filter bar 146N.

Search input box 146A allows admin 12 to search tags 52 as presented in frame 144B by inputting characters into search input box 146A. User interface module 30 may transmit these characters to graph module 30 which searches the underlying graph data structure 48 for nodes identifying tag names that match these input characters. Connect input 146B is inactive in this user interface 142A, but in other user interfaces 142, discussed below, connect input 146B may enable admin 12 to connect to the native management software interface 22 so that admin 12 may directly interact with those devices 16 to configure or otherwise manage configuration information 20 stored to the connected one of devices 16.

Historical input 146C may represent an input, that when selected, allows admin 12 to view historical changes that occurred to reach the presently displayed raw data files 56 for the currently selected device or domain. Alternatively, historical input 146C may represent an input that when selected allows admin 12 to analyze how tags 52 for one or more of archives 46 changes over time. When two or more archives 46 are selected, admin 12 may use this analysis to detect when changes were made to a set of devices 16 but not to other similar devices 16. This analysis may also allow admin 12 to compare tags 52 over time to determine unintentional configuration rollbacks. Unintentional configuration rollbacks, for example, may occur when admin 12, in an attempt to update configuration information 20 for a device 16, unintentionally commits a previous configuration to configuration information 20, thereby "rolling back" the configuration to a prior operational state.

Domain selection input 146D represents an input that enables admin 12 to select a domain and alter the first or files view to display raw data files 56 for devices 16 of the newly selected domain. Time selection input 146E represents an input that enables admin 12 to select a time or archive 46 of a given set of archives 46 from which user interface 142A presents the associated raw data file 56 within frame 144A. Format selection input 146F represents an input admin 12 may select to specify a format in which user interface 144A presents the selected raw data file 56.

Tags selection input 146G represents an input that admin 12 selects to cause user interface 142A to highlight a given tag within frame 144A. In this instance, admin 12 has selected tags selection input 146G, whereupon user interface 142A presents drop-down text box 148A. Using drop-down text box 148A, admin 12 may select one or more tag kinds, whereupon selecting a tag kind, user interface 142A presents text box 148B. Using text box 148B, admin 12 may select a tag presented in this box 148B, and user interface 142A, possibly by employing graph module 32 to traverse graph data structure 48, may update frame 144A to display the selected tag as found in the currently displayed raw data file 56. User interface 142A may also update frame 144B to display the selected tag's location within frame 144B.

Compare input 146H represents an input that admin 12 selects to cause user interface module 30 to present via one of UIs 31 a comparison view. The comparison view may, for example, display a comparison of the currently displayed raw data file 56 with another raw data file 56 or currently displayed tags 52 with other of tags 52. Clear input 146I represents an input that admin 12 selects to clear a currently specified filter tag input, which as described above may form the basis upon which graph module 32 determines which of archives 46 to include in graph data structure 48. Inputs 146J-146M represent inputs to toggle between respective "Icon," "List," "Tags", and "Files" views. Graph module 32 may traverse graph data structure to determine each of these views, and user interface module may present these views. User interface 142A may be presented upon admin 12 selecting files view input 146M.

Filter bar 146N (as shown by the white dashed-lined box) represents a "bar" or input that admin 12 may view to identify filter tag input. To specify filter tag input, admin 12 may "right-click" or otherwise select one of tags 52 presented in frame 144B. Alternatively, admin 12 may select one of those tags 52 and drag-and-drop the tag on filter bar 146N. By selecting one of the tags 52 shown in frame 144B in this manner, user interface module 30 may interact with graph module 32 to automatically determine one or more of archives 46 associated with the selected one of tags 52, as described above. Graph module 32 may further construct a graph data structure 48 from the determined archives and determine the current view, as shown in FIG. 9A. Alternatively, upon "right-clicking" with a mouse or other input peripheral, user interface 142A may present a pop-up window or other screen to select a value assigned to the configuration property defined by the selected on of tags 52. Regardless of the manner in which the filter tag input is specified, graph module 32 may determine at least a new view and/or user interface module 30 may update the current view to reflect the changes, as described above.

Filter bar 146N, in the example shown in FIG. 9A, shows that "21 of 73" snapshots have been determined from the filter tag input of "flag current." The "flag current" may indicate a tag kind, a tag name, or a tag value and represents a tag that defines a configuration property to indicate whether the archive 46 for which each of the tags 52 is associated is the current or most up-to-date archive of the set of archives 46. Thus, of the 73 archives, graph module 32 determined that 21 of the archives within sets of archives 46 of a given scope represent current archives 46 or have tags that define a configuration property having a value set to current. In this manner, the tag filter input, again, enables a bottom-up identification of devices contrary to the conventional top down approach offered by conventional configuration tools.

Figure 9B:
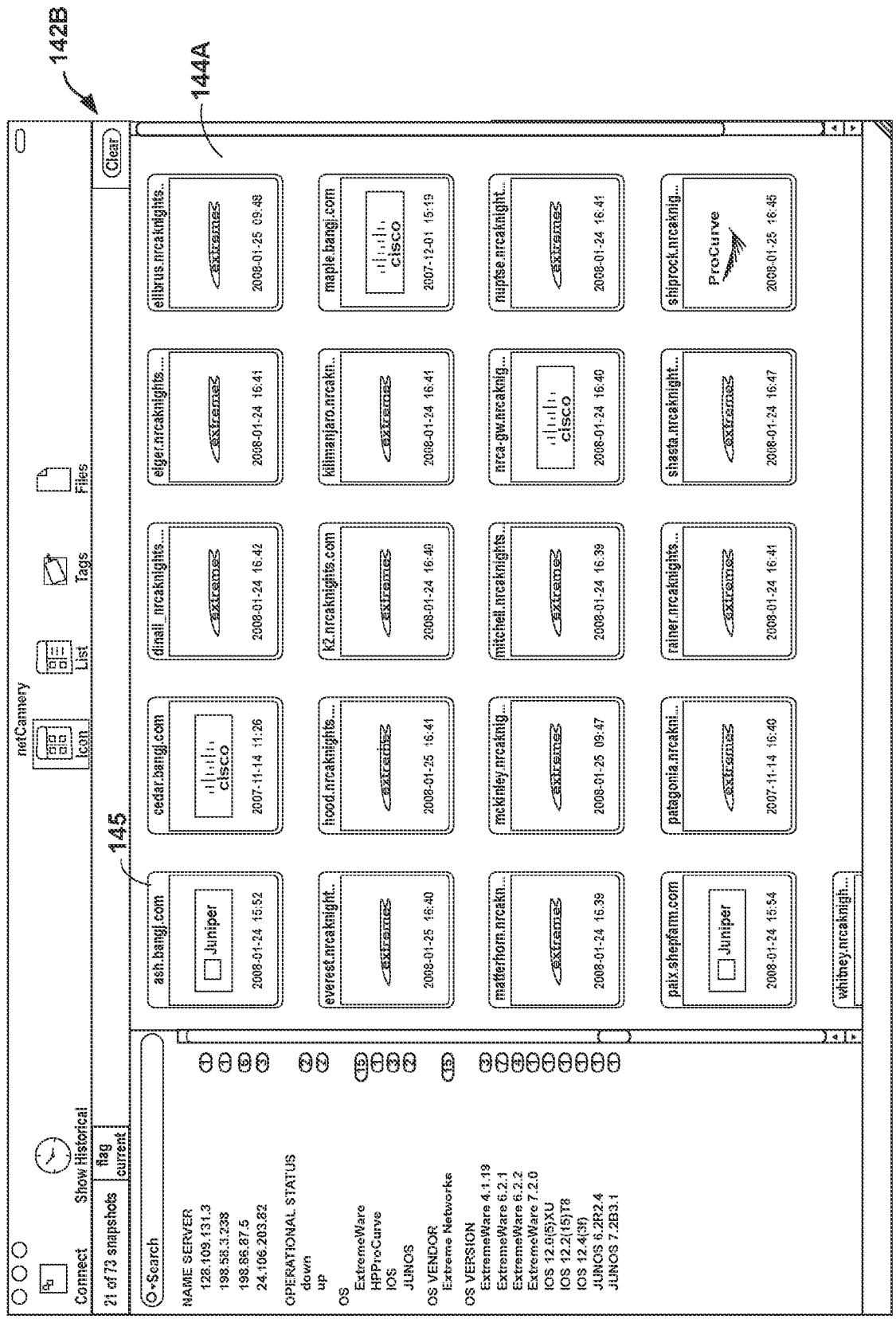

FIG. 9B is a screenshot illustrating a user interface 142B that presents a second view of snapshots or archives, such as archives 46. As above, this second or icon view may be determined through analysis of a graph data structure, such as graph data structure 48 of FIG. 2. Graph module 32 may traverse graph data structure 48 to determine this second view and transmit this view to user interface module 30, which presents this second view via one of UIs 30. User interface 142B therefore represents an exemplary representation of that one of UIs 30. User interface 144B may be presented in response to admin 12 selecting icon view input 146J of FIG. 9A.

User interface 142B is substantially similar to user interface 142A, except for user interface 142B has updated frame 144A to show a plurality of icons or small images, each small image representing a different device 16 within the a plurality of domains. Admin 12 may selecting one or more of these devices to inspect, analyze, edit, or otherwise manage configuration information 20 associated with each of these devices 16. For each icon, the device vendor, such as Juniper, Cisco, Extreme, and ProCurve shown in FIG. 9B, may be specified. Thus, user interface 142B may provide a single interface by which admin 12 may inspect configuration information 20 associated with devices 16 from different vendors.

While shown as displaying a single icon, each icon may present a number of configurable icons within each icon object. For example, icon object 145 contains a vendor icon specifying a vendor of Juniper; however, admin 12 may configure this icon with any image and this image does not necessarily have to indicate a vendor. Moreover, admin 12 may configure image object 145 to include multiple icons. One such configurable icon of the multiple icons may indicate whether any error tags are associated with that object 145 or device 16. Image object 145 may further include text boxes and other outputs, one of which as shown in FIG. 9B may presents a timestamp of the last extraction of configuration information 20 associated with the one of devices 16 that object image 145 represents. Thus, admin 12 may not only quickly traverse between multiple snapshots or archives 46 of devices 16 from different vendors, but also identify pertinent information concerning these devices as well, such as whether any error exists or when the last extraction occurred.

Figure 9C:
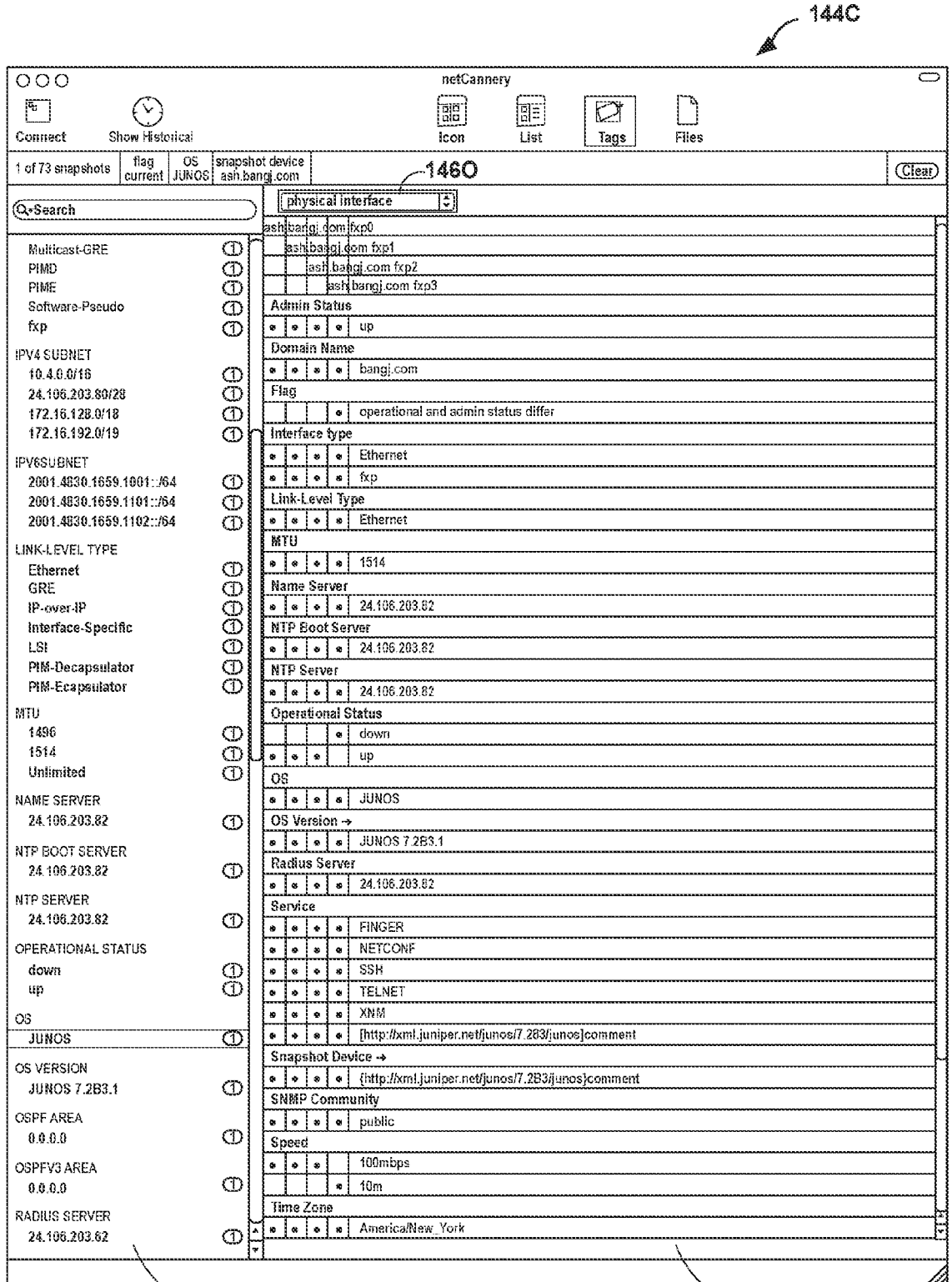

FIG. 9C is a screenshot illustrating a user interface 142C that presents a third view of tags, such as tags 52, associated with a particular device 16. As above, this third or tags view may be determined through analysis of a graph data structure, such as graph data structure 48 of FIG. 2. Graph module 32 may traverse graph data structure 48 to determine this third view and transmit this view to user interface module 30, which presents this third view via one of UIs 30. User interface 142C therefore represents an exemplary representation of that one of UIs 30. User interface 144C may be presented in response to admin 12 selecting tags view input 146L of FIG. 9A.

User interface 144C includes, similar to user interfaces 142A, 142B, two frames 144A, 144B. Within frame 144B, as described above, user interface 144C presents tags organized by kinds, as well as, the number of tags. Frame 144A, however, presents tags associated with a plurality of physical interfaces associated with one or more devices. User interface 144C includes a scope input 146O. Scope input 146O represents an input that enables admin 12 to select the scope for which frames 144A, 144B present tags 52. Currently, scope input 146O indicates a scope limited to "physical interface," which indicates that only tags 52 associated with the one or more physical interfaces of a single device are displayed in frames 144A.

By displaying tags 52 in this manner, admin 12 may readily determine configuration inconsistencies between the displayed physical interfaces. In the example shown in FIG. 9C, frame 144A includes, for example, a number of columns, each column corresponding to one of the interfaces listed directly below scope input 146O. The listed physical interfaces are "ash.bangj.com fxp0," "ash.bangj.com fxp1," "ash.bangj.com fxp2," and "ash.bangj.com fxp3." Below each of the listed interfaces, frame 144A presents rows and in some of these rows are tag kinds, such as "Admin Status," "Domain Name," etc. Below each tag kind is a tag name, such as "up" or "down" under "the Admin Status" kind or "bangj.com" under the "Domain Name" kind. Next to each tag name is one or more status indicators (e.g., the bold dot), one status indicator for each column or better stated physical interface of each column. Looking to these status indicators, admin 12 may quickly scan how each interface is configured.

For example, admin 12 may note that for interface "ash.bangj.com fxp3," under the "Flag" kind, the tag indicates that the "operational and admin status differ." Admin 12 may further note that for "ash.bangj.com fxp3," under the "Speed" tag kind, the tag indicates a speed of "10 m" which is different from the other interfaces that indicate a speed of "100 mbps." Admin 12 may therefore utilize user interface 144C to manually inspect configuration information 20 and determine configuration inconsistencies.

Figure 9D:
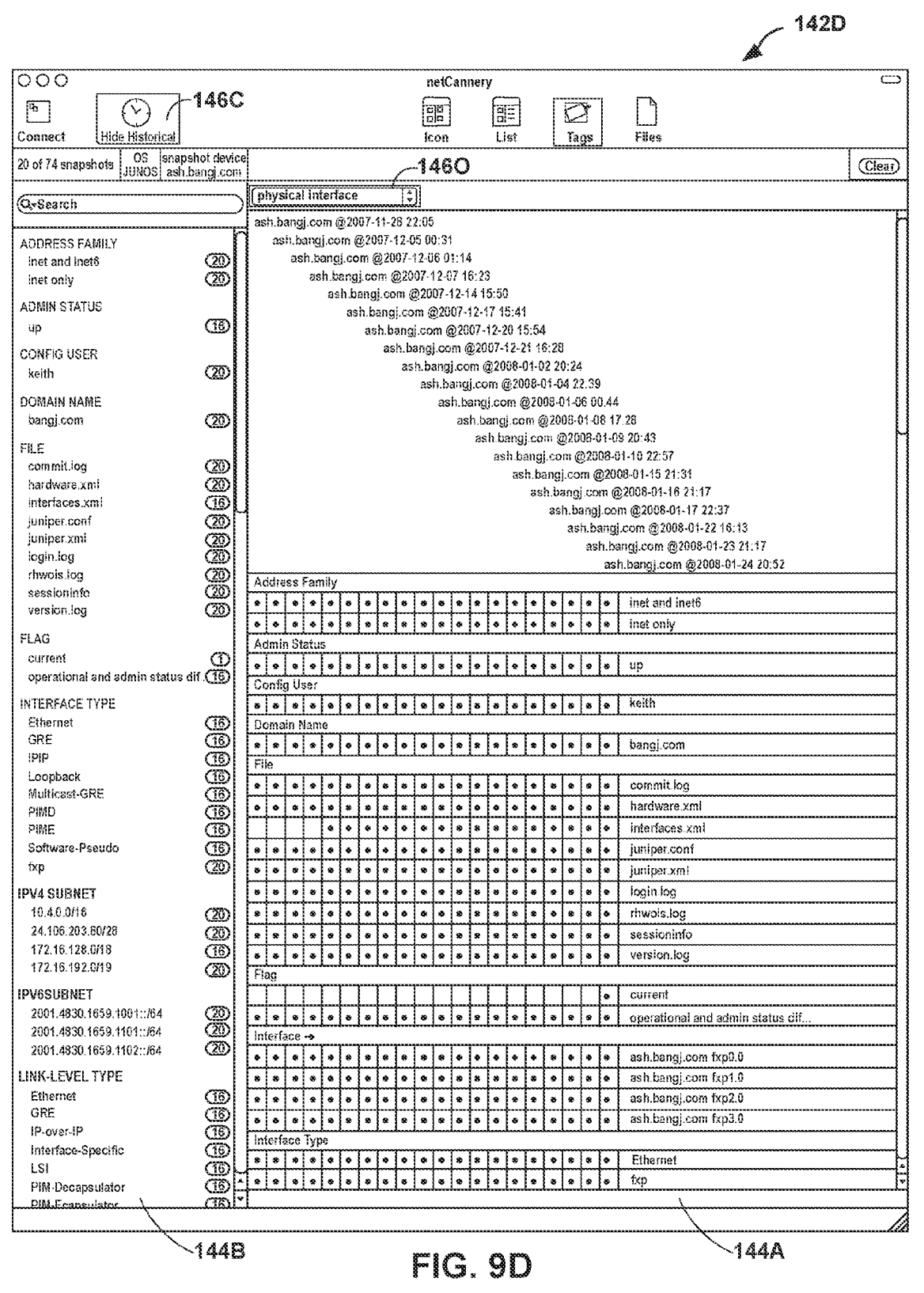

FIG. 9D is a screenshot illustrating a user interface 142D that presents a fourth view of tags, such as tags 52, associated with a particular device 16. As above, this fourth or historical view may be determined through analysis of a graph data structure, such as graph data structure 48 of FIG. 2. Graph module 32 may traverse graph data structure 48 to determine this fourth view and transmit this view to user interface module 30, which presents this fourth view via one of UIs 30. User interface 142D therefore represents an exemplary representation of that one of UIs 30. User interface 144D may be presented in response to admin 12 selecting historical input 146C, as shown in FIGS. 9A and 9D.

User interface 144D includes, similar to user interfaces 142A-142C, two frames 144A, 144B. Within frame 144B, as described above, user interface 144D presents tags organized by kinds, as well as, the number of tags. Frame 144A, however, presents tags associated with a plurality of archives 46 associated with one device 16, such as set of archives 46A. User interface 144D also includes a scope input 146O. Scope input 146O represents an input that enables admin 12 to select the scope for which frames 144A, 144B present tags 52. Currently, scope input 146O indicates a scope limited to "snapshot ID," which indicates that only tags 52 associated with the one or more snapshots or one of sets of archives 46 of a single device 16 are displayed in frames 144A.

By displaying tags 52 in this manner, admin 12 may readily determine how configuration information 20 changed over time. In the example shown in FIG. 9D, frame 144A includes, for example, a number of columns, each column corresponding to one of the snapshots listed directly below scope input 146O. For example a few of the listed snapshots or archives include "ash.bangj.com @2007-11-28 22:05," "ash.bangj.com @2007-12-05 00:31," and "ash.bangj.com @2007-12-06 01:14." The first "ash.bangj.com" indicates the device and the date and time of the snapshot follow the "@" sign. The whole therefore represents a snapshot for a device at a select time, e.g., one of historical sets of archives 46.

Below each of the listed interfaces, frame 144A presents rows and in some of these rows are tag kinds, such as "Address Family," "Admin Status," etc. Directly below each tag kind is a tag name, such as "inet and inet 6" or "inet only" under the "Address Family" kind or "up" under the "Admin Status" kind. Next to each tag name is one or more status indicators (e.g., the bold dot), one status indicator for each column or better stated snapshot or archive 46 of each column. Looking to these status indicators, admin 12 may quickly scan how a single device 16 was configured over time.

For example, admin 12 may note that for the first four snapshots the "interfaces.xml" tag was not defined under the "File" kind, which may indicate an improper configuration referred to herein as a rollback configuration issue or rollback issue. Admin 12 may therefore utilize user interface 144D to manually inspect configuration information 20 and determine configuration inconsistencies of a historical nature.

Figure 9E:
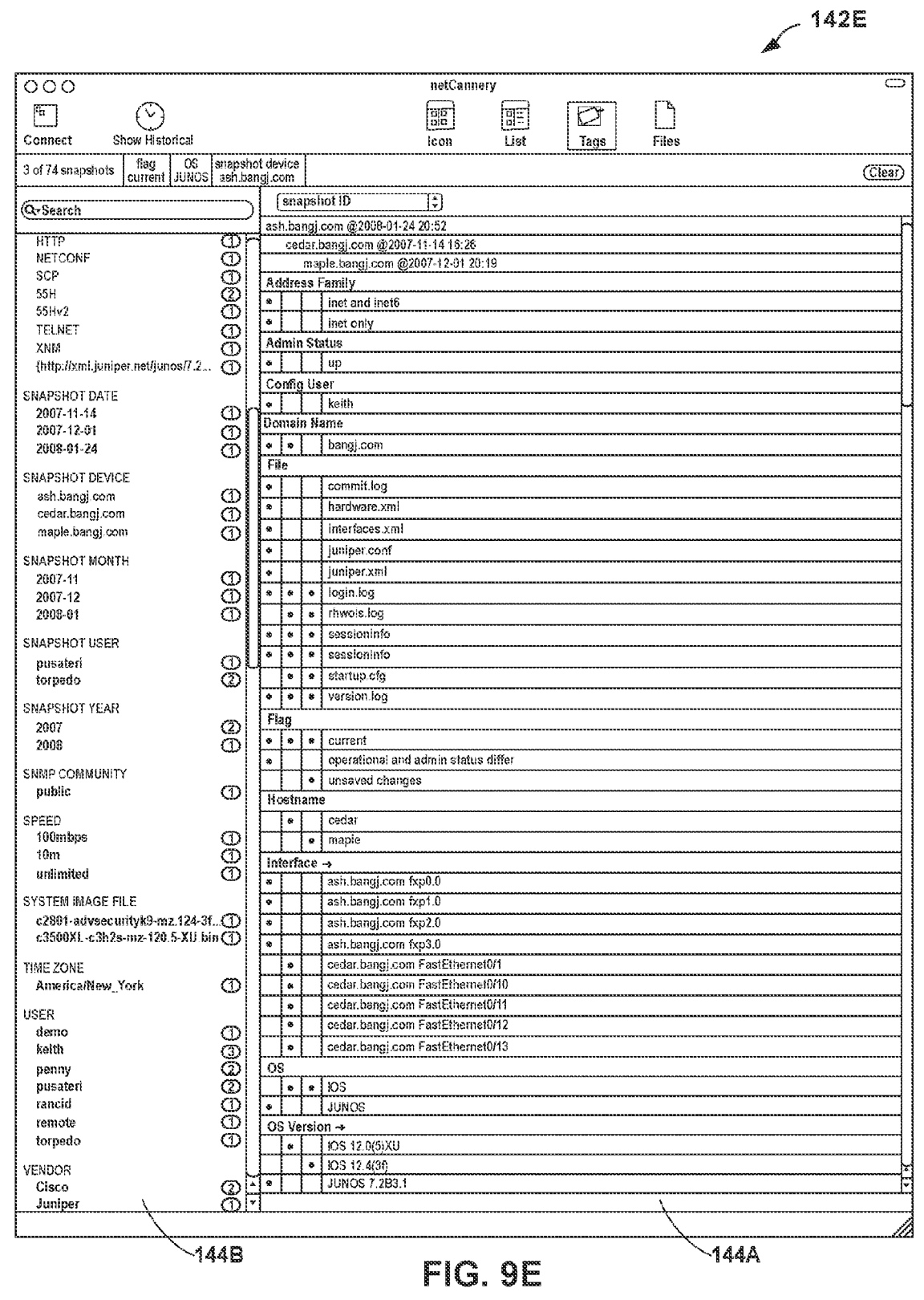

FIG. 9E is a screenshot illustrating a user interface 142E that presents a fifth view of tags, such as tags 52, associated with a plurality of devices 16. As above, this fifth or snapshot comparison view may be determined through analysis of a graph data structure, such as graph data structure 48 of FIG. 2. Graph module 32 may traverse graph data structure 48 to determine this fifth view and transmit this view to user interface module 30, which presents this fifth view via one of UIs 30. User interface 142E therefore represents an exemplary representation of that one of UIs 30. User interface 144E may be presented in response to admin 12 specifying or entering filter tag input in the manner described above.

User interface 144E includes, similar to user interfaces 142A-142D, two frames 144A, 144B. Within frame 144B, as described above, user interface 144D presents tags organized by kinds, as well as, the number of tags. Frame 144A, however, presents tags associated with a plurality of archives 46 associated with different device 16.

By displaying tags 52 in this manner, admin 12 may readily determine how configuration information 20 for multiple devices 16 of different vendors. In the example shown in FIG. 9D, frame 144A includes, for example, a number of columns, each column corresponding to one of archives 46. The listed snapshots or archives include "ash.bangj.com @2008-01-24 20:52," "cedar.bangj.com @2007-11-14 16:26," and "maple-.bangj.com @2007-12-01 20:19." The first portion indicates the device and the date and time of the snapshot follow the "@" sign. The whole therefore represents a snapshot for a device at a select time.

Below each of the listed interfaces, frame 144A presents rows and in some of these rows are tag kinds, such as "Address Family," "Admin Status," etc. Directly below each tag kind is a tag name, such as "inet and inet 6" or "inet only" under the "Address Family" kind or "up" under the "Admin Status" kind. Next to each tag name is one or more status indicators (e.g., the bold dot), one status indicator for each column or better stated snapshot or archive 46 of each column. Looking to these status indicators, admin 12 may quickly scan how a multiple devices 16 of different vendors are configured and thereby detect configuration inconsistencies even though devices 16 are of different vendors.

Admin 12 may determine that these devices 16 are from different vendors by inspecting the last two lines of frame 144B, which indicate two of the devices are of "Cisco" manufacture and one of the devices is of "Juniper" manufacture. Looking to frame 144A, admin 12 may also note in the above described manner (e.g., by inspecting the status indicators) that tags of the "OS" and "OS version" kinds differ as well. Thus, network management tool 14 may enable admin 12 to quickly and simultaneously inspect configuration information 20 stored to devices 16 of different vendors.

The above FIGS. 9C-9E in particular illustrate the presentation of aggregate configuration information in a manner that organizes a least a portion of the first and second sets of configuration information 20 based primarily on the determined relationships, e.g., kind of tag, between first and second tags and secondarily on the network devices 16 from which the first and second sets of configuration information 20 was received. That is, in FIG. 9C, configuration information 20 was presented for interfaces of a single device 16 was aggregated and presented primarily based on the kind of tags and tags rows and secondarily on the interfaces. In FIG. 9D, configuration information 20 was aggregated and presented in a historical manner such that tags were organized primarily according to tag kinds or relationships and only secondarily according to the snapshot.

In FIG. 9E particularly, graph module 32 determined relationships between at least first and second tags, each tag parsed from configuration information 20 stored to devices 16 of different vendors. Graph module 32 determined the relationship by inspecting the tag kind defined within each of tags 52. Graph module 32 aggregated configuration information 20 to form aggregate configuration information and organized this aggregate configuration information such that the configuration information 20 stored to each of devices 16 from different vendors was presented primarily upon this relationship, e.g., tag kind, and only secondarily on the devices 16. Frame 144A of user interface 144E thereby presented aggregate configuration information in a manner that organizes a least a portion of the first and second sets of configuration information based primarily on the determined relationships between the first and second tags and secondarily on the network devices from which the first and second sets of configuration information was received.

Figure 9F:
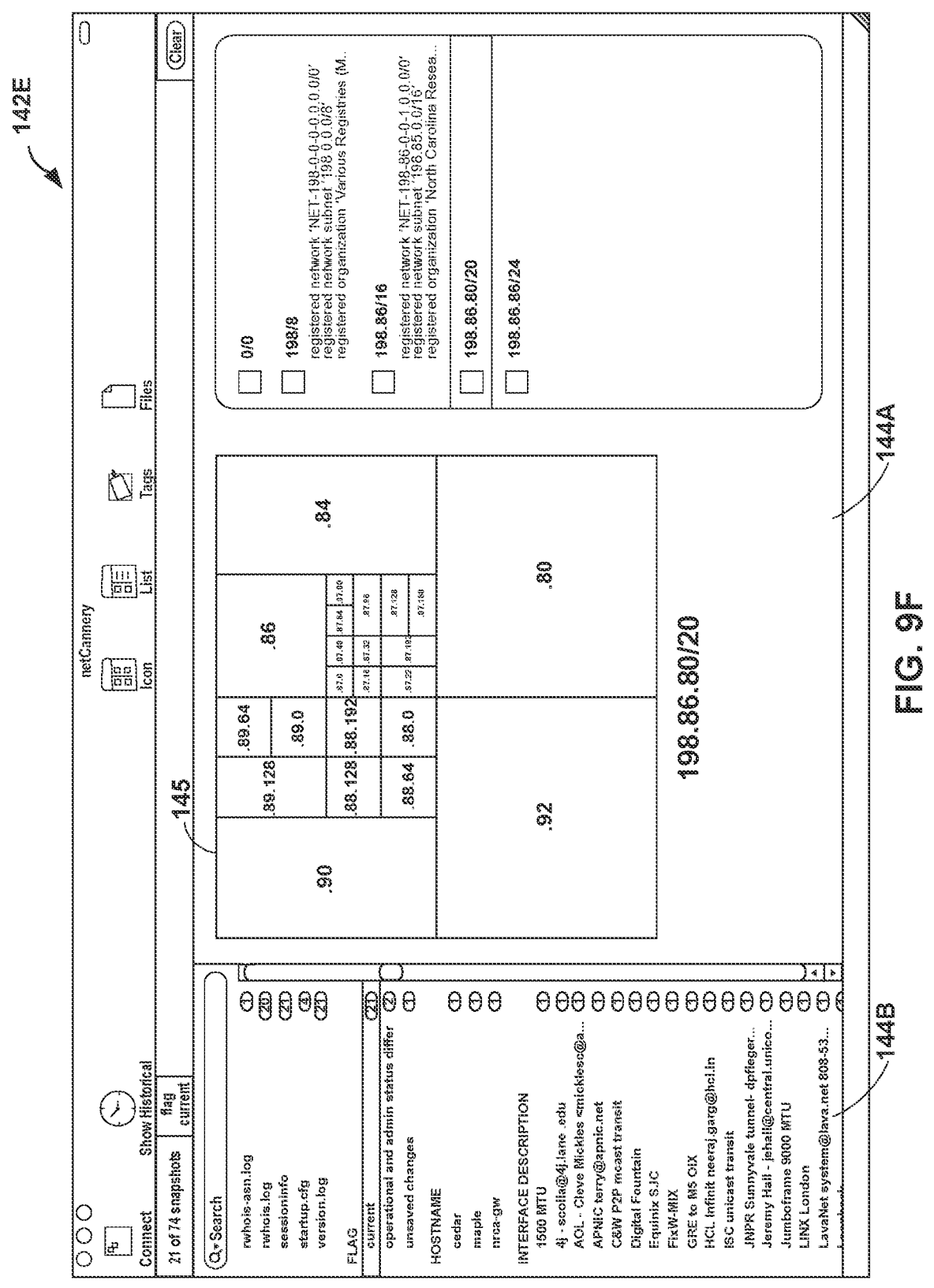

FIG. 9F is a screenshot illustrating a user interface 142F that presents a sixth view of tags, such as tags 52, associated with a plurality of devices 16. As above, this sixth or Hilbert curve view may be determined through analysis of a graph data structure, such as graph data structure 48 of FIG. 2. Graph module 32 may traverse graph data structure 48 to determine this sixth view and transmit this view to user interface module 30, which presents this sixth view via one of UIs 30. User interface 142F therefore represents an exemplary representation of that one of UIs 30. User interface 144F may be presented in response to admin 12 selecting or entering filter tag input in the manner described above and providing further input to select a format of the view.

User interface 144F includes, similar to user interfaces 142A-142E, two frames 144A, 144B. Within frame 144B, as described above, user interface 144D presents tags organized by kinds, as well as, the number of tags. Frame 144A, however, presents a real-time map of an IP address space.

Graph module 32 may determine this view using a real time Hilbert curve. A Hilbert curve refers to a continuous fractal space-filling curve first described by the German mathematician David Hilbert in 1891. The Hilbert curve can be used to map one dimensional data into two or more dimensions. As shown in FIG. 9F, frame 144A presents a one dimensional IP address as two dimensional areas. Notably, graph module 32 may update frame 144A dynamically depending on the determined ones of archives 46. That is, admin 12 may specify additional filter tag input, and graph module 32 may dynamically and in real-time update frame 144A in the manner described above to adjust the Hilbert representation of the IP address space to reflect the newly determined archives 46. In this manner, network management tool 14 may provide a graphical and often more easily understood view of IP address space allocation. Although shown as applying to IP addresses, the Hilbert curve technique described herein may be applied to any tag kind or individual tag.

Figure 10:
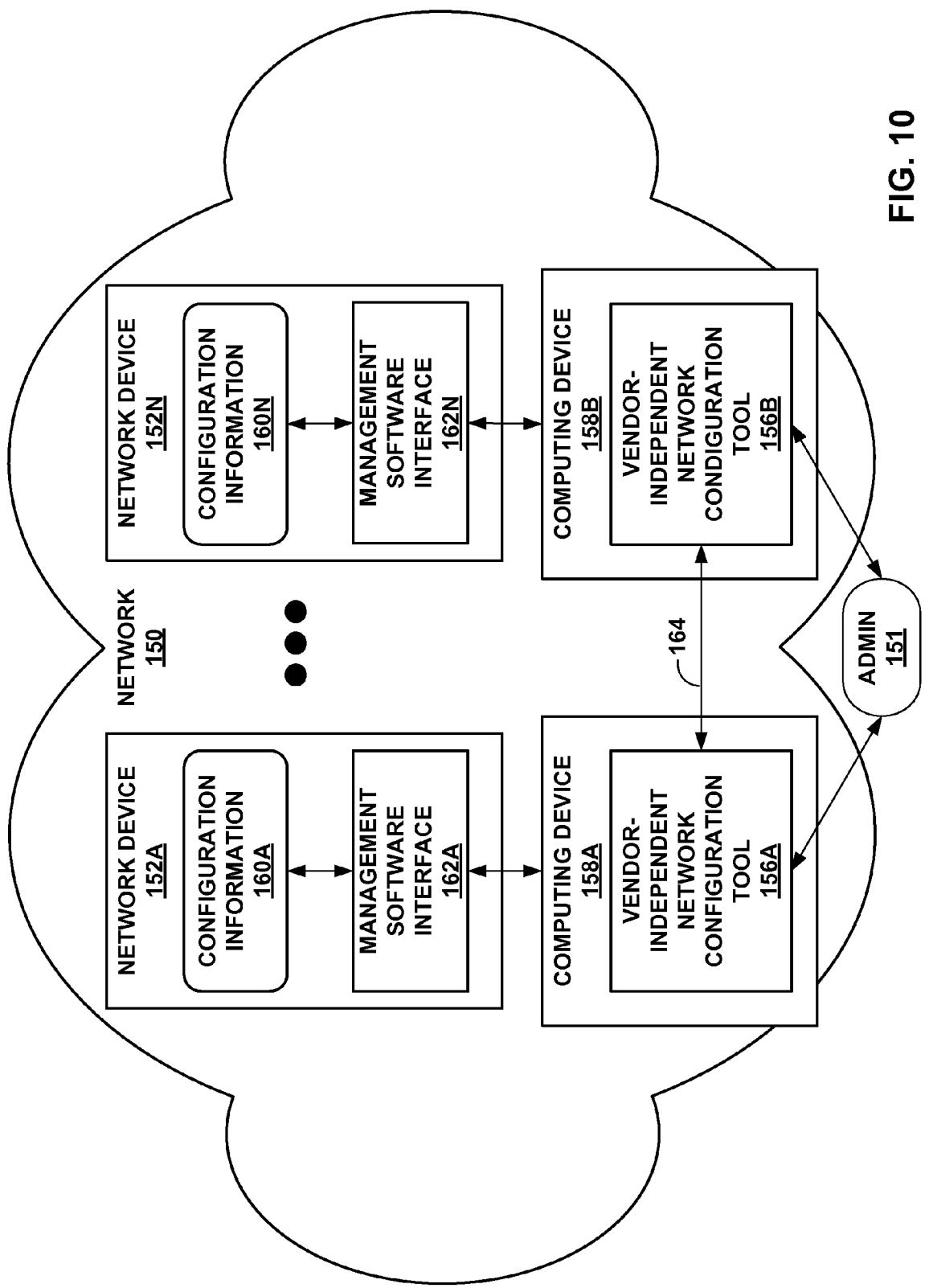
FIG. 10 is a block diagram illustrating a network in which an administrator interacts with two vendor-independent network configuration tools to share information.

FIG. 10 is a block diagram illustrating a network 150 in which a network administrator 151 interacts with two vendor-independent network configuration tools 156A, 156B to share information 164. As shown in FIG. 10, network 150 includes a plurality of network devices 152A-152N ("network devices 162") and computing devices 158A, 158B. Administrator 151 ("admin 151") configures network 150 by interacting with network configuration tools 156A, 156B ("network configuration tools 156"), each executing within respective computing device 158A, 158B ("computing devices 158"), to configure each of network devices 152.

Network 150 may be substantially similar to network 10 of FIG. 1 in that network 150 includes a plurality of devices 152 that store configuration information 160A-160N and enable a user, such as admin 151 or a system, such as a provisioning system, to manage that configuration information 160A-160N ("configuration information 160") by interacting with respective management software interfaces 162A-162N ("management software interfaces 162"). Moreover, similar to network 10 of FIG. 1, one or more of network devices 152 are assumed to be from different vendors and thus conventional vendor specific network configuration tools may enable admin 151 to view only configuration information 160 corresponding to devices 152 of that particular vendor.

Network 150 however differs from network 10 of FIG. 1 in that network 150 includes an additional computing device 158B that executes an additional vendor-independent network configuration tool 156B. Network 150 may include two network configuration tools 156, for instance, to manage two sub-networks within network 150. Alternatively, in a large network 150, multiple administrators, such as admin 151, may each configure geographically separate sub-networks within a larger network 150 and require a separate instance of network configuration tool 156 to enable vendor independent management of configuration information 160, as described above. Although shown as a single admin 151 interacting with both tools 156, multiple admins may interact with a separate one of tools 156. Moreover, more than two computing devices 158 may be included within network 150, each executing a separate instance of tool 156. The invention therefore should not be limited strictly to a single administrator or two computing devices, but contemplates multiple administrators and a plurality of computing devices 158.

Computing devices 158 and network configuration tools 156 may be substantially similar to computing device 18 and tool 14 of FIG. 1. As described above, each of tools 156 may include exchange modules, such as exchange modules 35, by which network configuration tools 156 may exchange information 164. This information may comprise one or more taggers (e.g., taggers 42), one or more generators (e.g., generators 44), a graph data structure (e.g., graph data structure 48), one or more rules (e.g., rules 49), and one or more archives (e.g., archives 46).

Admin 151 may configure each of exchange modules 35 of tools 156 by interacting with one of UIs 31 to input sharing policies 50. Admin 151 may define sharing policies 50 to limit or expand the scope of information 164 that may be exchanged. That is, admin 151 may define that only a set of taggers 42 or generators 44 may be shared, for example. Admin 151 may also require that other modules not shown in FIG. 2 be executed to ensure no malicious information 164 is exchanged. These additional modules may comprise antivirus modules, etc.

To exchange information 164, exchange module 35 of each of tools 156 discover each other of computing devices 158 that execute tools 156 in accordance with discovery protocol 36A, as described above. Upon discovering each other, exchange module 35 of each of tools 156 authenticate each other in accordance with AAA protocol 36B, as described above. Also in accordance with AAA protocol 36B, exchange modules 35 based on sharing policies 50 authorize the scope of information 164. Exchange modules 35, while exchanging information 164, account for the exchange in share log 53, which may also occur in accordance with AAA protocol 36B. In this manner, multiple tools 156 may exchange information 164 to share taggers 42, generators 44, and other information between each other.

Figure 11:
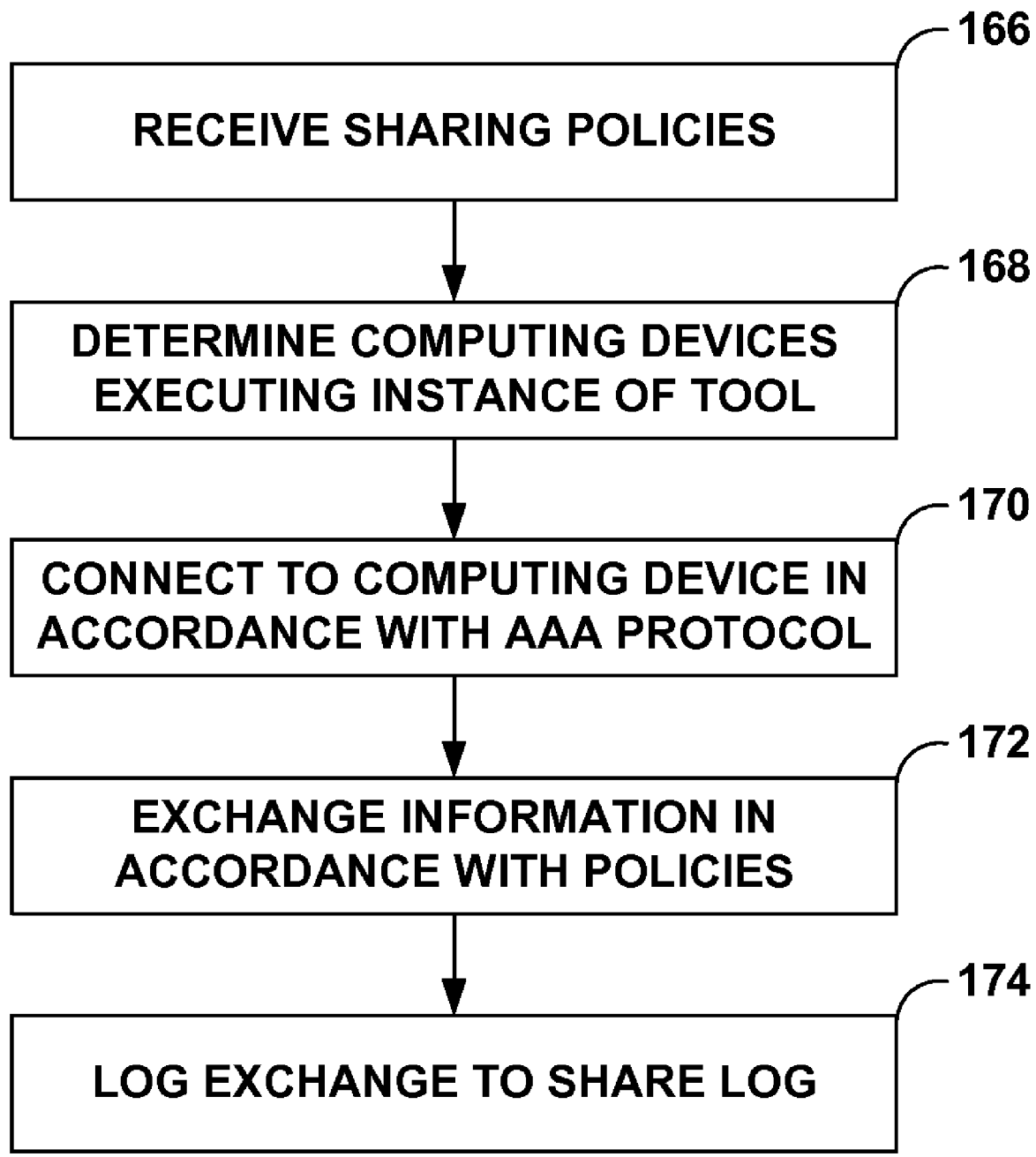
FIG. 11 is a flowchart illustrating exemplary operation of a computing device in exchanging information with another computing device.

FIG. 11 is a flowchart illustrating exemplary operation of a computing device, such as one of computing devices 158 of FIG. 10, in exchanging information, such as information 164, with another computing device. Initially, as described above, a user, such as admin 151, may input sharing polices, such as sharing policies 50 of FIG. 2, via a UI 31 presented by user interface module 30. User interface module 30 may receive sharing policies 50 and update exchange module 35 with sharing policies 50 (166). Admin 151 may next via another UI 31 cause exchange module 35 to search for or determine computing devices executing an instance of tool 156. Exchange module 35 may, as described above, determine these other computing devices 158 in accordance with discover protocol 36A (168).

Upon determining these computing devices 158, exchange module 35 may connect with the other computing device 158 in accordance with AAA protocol 36B, in the manner described above (170). Once connected, exchange module 35 exchanges information 164 with the other computing device 158 in accordance with sharing policies 50, again as described above (172). In accordance with AAA protocol 36B, exchange module 35 may log the exchange of information 164 to share log 53 (174).

The sharing of information between network configuration tools may enable these tools to quickly and automatically populate network configuration tools with effective taggers and generators and thereby improve the amount and/or quality of configuration information extracted from each of the plurality of network devices. Although described above with respect to a peer-to-peer exchange model, other models may also be employed, such as client-server based models or a combination of client-server and peer-to-peer models.

Figure 12:
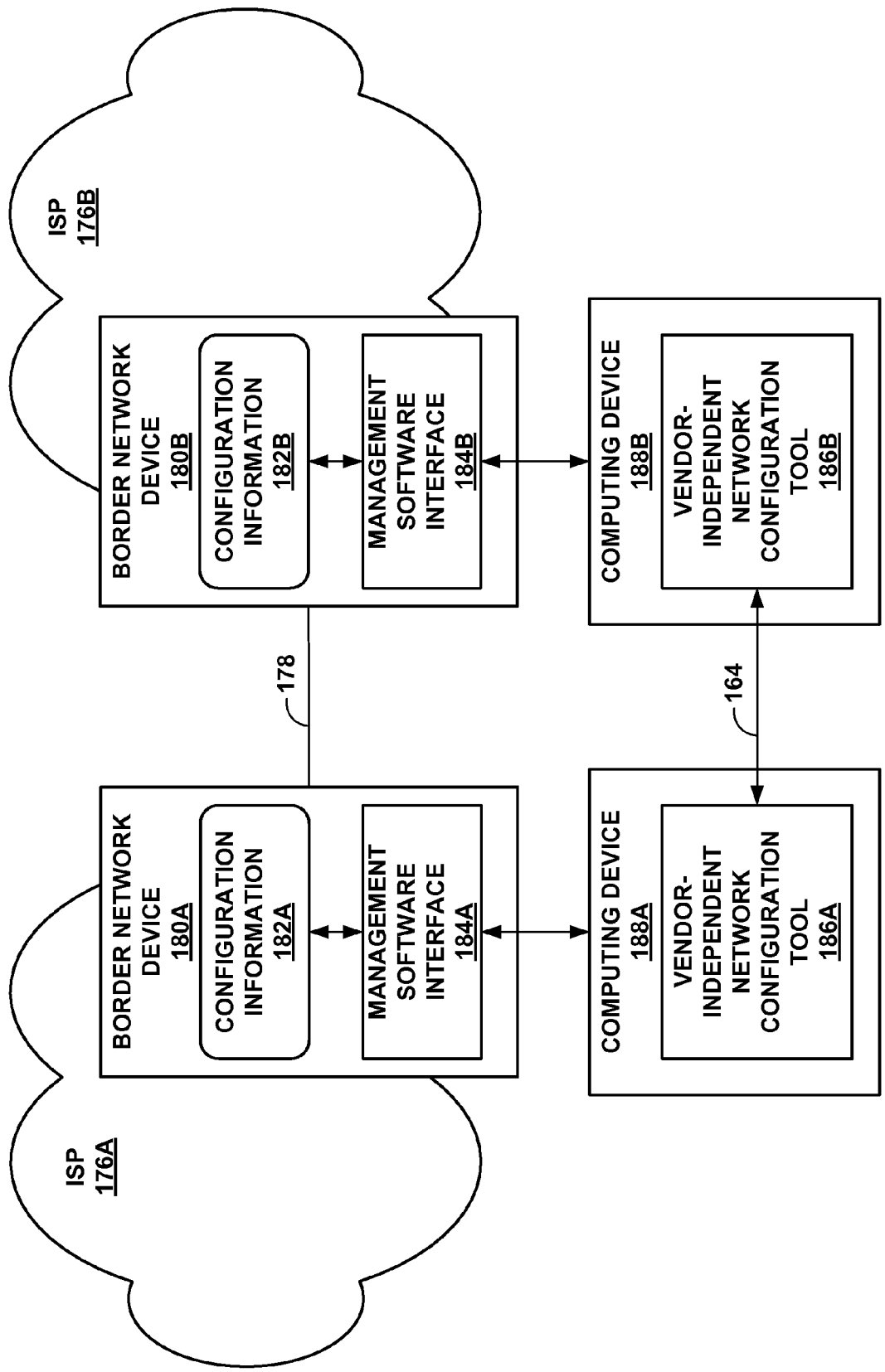
FIG. 12 is a block diagram illustrating two Internet service provider networks that are communicatively coupled to one another via at least one network link and that employ vendor-independent network configuration tools to more easily control the amount and manner in which configuration information is exposed and shared between the networks.

FIG. 12 is a block diagram illustrating internet service providers networks 176A, 176B that are communicatively coupled to one another via at least one link 178 and employ vendor-independent network configuration tools 186A, 186B to more easily control the amount and manner in which configuration information is exposed and shared between networks. Each of internet service provider networks 176A, 176B ("ISPs 178") include a border network device 180A, 180B ("devices 180"), respectively. Link 178 communicatively couples these devices 180A, 180B to one another.

Devices 180 may be substantially similar to devices 152 of FIG. 10 in that devices 180 similarly include configuration information 182A, 182B ("configuration information 182") and management software interfaces 184A, 184B ("management software interfaces 184"). Devices 180 are referred to as "border" network devices 180 because they sit at the border of each of ISPs 176 and govern the flow of traffic between ISPs 176 over link 178. Commonly, these devices 180, to facilitate the communication of data between ISPs 176, certain configuration properties or certain portions of configuration information 182 are typically agreed upon in order for data to be transferred correctly between ISPs 176. That is, configuration information 182 may have to be similarly configured in some respects on both of devices 180. While devices 180 may agree to these configurations, typically ISPs will not allow an exchange of configuration information 182 through a peering relationship between each of devices 180.

ISPs may be reluctant to share this information 182, for example, because it may expose configuration information 182 that provides a benefit over a competitor ISPs service. The competitor ISP may therefore, upon learning this information 182, reconfigure its ISP network 176 to reduce the benefit.

ISPs 176 may however employ computing devices 188A, 188B ("computing devices 188") that execute vendor-independent network configuration tools 186A, 186B ("network configuration tools 186") to parse those portions of configuration information 182 normally agreed upon. Each of computing devices 188 and each of tools 186 may be substantially similar to computing device 18 and tool 14 of FIG. 2 and parse those properties as tags, such as tags 52, from respective configuration information 180. These tags 52 may then be shared or compared by configuring sharing policies 50 and exchanging only these tags 52 between tools 186 as described above.

Alternatively, a trusted third party may provide a single computing device 188 that executes a tool 186 to facilitate the sharing of the agreed upon ones of tags 52 between devices 180. In either scenario, tool(s) 186 may continually share these tags upon each successive snapshot taken of configuration information 182 to ensure proper configuration between devices 180 over time. In this manner, tools 186 may facilitate the exchange of information between ISPs 176 where normally no such exchange could be agreed upon due the competitive nature of ISPs. By using tool 186 as a trusted third part or as an arbitrator between ISPs 176, those portions of configuration information 182 that may need to be agreed upon, can by automatically exchanged and agreed upon without having to continuously contact each ISP and barter an agreement. Moreover, tool 186 may provide error checking or other algorithms to ensure proper configuration of the agreed upon properties.

While described above with respect to ISPs, vendor-independent network configuration tools 186 may be used in the above manner as a secure arbiter between any two networks owned by any type of entity. For example, tools 186 may swap configuration information between two private networks owned by entities that wish to communicate data across one another's private network. Thus, the techniques should not be strictly limited to the above described example.

In addition to the various embodiments set forth in the subsequently presented claims, the following additional embodiments are described above with respect to FIGS. 1-12.

In one embodiment, a method comprises receiving with a network configuration tool included within a computing device a selection of network devices, wherein the selection identifies a first network device from a first vendor and a second network device from a second vendor and determining for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time. The method also comprises constructing with the network configuration tool a graph data structure from both the first and second sets of tags, analyzing the graph data structure to determine one or more views associated with the data structure, and presenting with the network configuration tool the one or more views associated with the data structure to a user to enable the user to view at least a portion of the first and second sets of configuration information from the respective first and second network devices in a manner that organizes the portions of the first and second sets of configuration information based primarily on a relationship determined between the first and second sets of tags and secondarily on the devices from which the first and second sets of configuration information was extracted. Notably, each of the tags of the first and second sets of tags defines a configuration property for the respective first and second network devices.

Each of the tags of each of the first and second sets of tags may also comprise a name, a kind that identifies a category of similar tags, a context that identifies other tags from which each of the first and second sets of tags depend, and a reference that identifies a file to which each of the respective first and second sets of configuration information are stored.

In the preceding method, construction of the graph data structure may comprise constructing a graph data structure having a plurality of nodes and a plurality of edges, wherein each of the nodes references one of the tags from the first set and the second sets of tags, and each of the edges connect each of the nodes to another one of the nodes in accordance with the context defined for each of the tags of the first and second sets of tags the nodes reference and storing the graph data structure as one of an adjacency list or an adjacency matrix, wherein, in the preceding method, analyzing the data structure comprises traversing the graph data structure from node to node by following the edges connecting each of the nodes to determine the one or more views.

In the preceding method, analyzing the graph data structure may further comprise analyzing the graph data structure with the network configuration tool by comparing tags from the first, second, or both the first and second sets of tags that include the same kind that identifies the same category of similar tags to determine a tags view, and generating the tags views such that the tags from the first, second, or both the first and second sets of tags are organized based primarily on the kind of tags and secondarily on the device, wherein, in the preceding method, presenting the one or more views comprises presenting the tags view with the network configuration tool via a user interface.

In the preceding method, each archive file of the first historical set of archives further stores first meta data associated with the first network device and stores the first set of configuration information as a first raw data file, both at some point in time, and each archive file of the second historical set of archive files further second meta data associated with the second network device and stores the second set of configuration information as a second raw data file, both at some point in time.

In the preceding method, analyzing the graph data structure comprises analyzing the data structure to determine a files view that includes one or more of the first raw data files, second raw data files or both the first and second raw data files, and presenting the one or more views comprising presenting the files view with the network configuration tool via a user interface.

In the preceding method, analyzing the graph data structure to determine one or more views comprises analyzing the graph data structure to determine a historical view that includes any of the first and second tags from the first historical set, the second historical set, or both the first and second historical sets of archive files, and presenting the one or more views comprising presenting the historical view with the network configuration tool via a user interface to enable the user to compare the tags from the first, second, or both the first and second historical sets of archive files.

In the preceding method, wherein analyzing the graph data structure to determine one or more views comprises analyzing the data structure to determine an icon view that includes a plurality of icons representing each of the first and second devices and associated first and second historical sets of archive files, wherein the plurality of icons each include a small image identifying either the first or second vendors, and presenting the one or more views comprises presenting the icon view with the network configuration tool via a user interface to enable the user to quickly select the first or second device associated respectively with the first or second sets of historical archive files.

The preceding method, further comprises executing with the network configuration tool an algorithm to identify one or more tags of the first, second, or both the first and second sets of tags that define improperly configured properties, and presenting with the network configuration tool an error message that warns the user of the error and identifies the one or more tags that define the improperly configured properties via a user interface.

In the preceding method, a tag of the first or second sets of tags includes the algorithm.

In the preceding method, analyzing the graph data structure comprises traversing the graph data structure to construct a graphical view of the graph data structure, and presenting the one or more views comprises presenting with the network configuration tool the graphical view of the graph data structure via a user interface.

In the preceding method, each of the first and second sets of historical archive files stores at least the first and second sets of configuration information as first and second raw data files, and the first and second sets of tags as first and second tag files, and the preceding method further comprises maintaining with the network configuration tool a database in accordance with a database schema that defines a plurality of objects and at least one relationship between the objects, wherein the plurality of objects include a first object defining a structure by which the database stores each of the archive files from the first and second sets, a second object defining a structure by which the database stores the tag files, and a third object defining a structure by which the database stores information related to the plurality of devices.

In the preceding method, analyzing the graph data structure to determine one or more views comprises analyzing the graph data structure in real-time to dynamically determine a view based on a Hilbert curve, the Hilbert view including any tag of the first, second, or both the first and second sets of tags that identify an IP address configuration property, and presenting the one or more views comprising presenting the Hilbert view with the network configuration tool via a user interface to enable the user to compare the tags from the first, second, or both the first and second historical sets of archive files.

In another embodiment, a computing device comprises a control unit that includes a network configuration tool to manage a plurality of network devices from different vendors. The network configuration tool comprises a user interface module that receives a selection of the plurality of network devices, wherein the selection identifies at least a first network device from a first vendor and a second network device from a second vendor, and a graph module that determining for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time, constructs a graph data structure from the first and second sets of tags, and analyzes the graph data structure to determine one or more views associated with the data structure. The user interface module presents the one or more views associated with the data structure to a user to enable the user to view at least a portion of the first and second sets of configuration information from the respective first and second network devices in a manner that organizes the portions of the first and second sets of configuration information based primarily on a relationship determined between the first and second sets of tags and secondarily on the devices from which the first and second sets of configuration information was extracted, wherein each of the tags of the first and second sets of tags defines a configuration property for the respective first and second network devices.

With respect to the preceding computing device, each of the tags of each of the first and second sets of tags comprise a name, a kind that identifies a category of similar tags, a context that identifies other tags from which each of the first and second sets of tags depend, and a reference that identifies a file to which each of the respective first and second sets of configuration information are stored.

With respect to the preceding computing device, the graph module constructs the graph data structure by constructing a graph data structure having a plurality of nodes and a plurality of edges, wherein each of the nodes references one of the tags from the first set, the second set, or both sets of tags, and each of the edges connect each of the nodes to another one of the nodes in accordance with the context defined for each of the tags the nodes reference and storing the graph data structure as one of an adjacency list or an adjacency matrix, and the graph data module analyzes the data structure by traversing the graph data structure from node to node by following the edges connecting each of the nodes to determine the one or more views.

With respect to the preceding computing device, the graph module analyzes the graph data structure by comparing tags from the first, second, or both the first and second sets of tags that include the same kind that identifies the same category of similar tags to determine a tags view and generating the tags views such that the tags from the first, second, or both the first and second sets of tags are organized based primarily on the kind of tags and secondarily on the device. Also with respect to the preceding computing device, the user interface module presents the one or more views by presenting the tags view via a user interface.

With respect to the preceding computing device, each archive file of the first historical set of archives further stores first meta data associated with the first network device and stores the first set of configuration information as a first raw data file, both at some point in time, and each archive file of the second historical set of archive files further second meta data associated with the second network device and stores the second set of configuration information as a second raw data file, both at some point in time.

With respect to the preceding computing device, the graph module analyzes the graph data structure by analyzing the data structure to determine a files view that includes one or more of the first raw data files, second raw data files or one or more of both the first and second raw data files, and the user interface module presents the one or more views by presenting the files view via a user interface.

With respect to the preceding computing device, the graph module analyzes the graph data structure by analyzing the graph data structure to determine a historical view that includes any tags from the first historical set, the second historical set, or both the first and second historical sets of archive files, and the user interface module presents the one or more views by presenting the historical view via a user interface to enable the user to compare those tags from the first, second, or both the first and second historical sets of archive files.

With respect to the preceding computing device, the graph module analyzes the graph data structure by analyzing the data structure to determine an icon view that includes a plurality of icons representing each of the first and second devices and associated first and second historical sets of archive files, wherein the plurality of icons each include a small image identifying either the first or second vendors, and the user interface module presents the one or more views by presenting the icon view a user interface to enable the user to quickly select the first or second device associated respectively with the first or second historical sets of archive files.

With respect to the preceding computing device, the graph module further executes an algorithm to identify one or more tags of the first, second, or both the first and second sets of tags that define improperly configured properties, and the user interface module further presents an error message that warns the user of the error and identifies the one or more tags that define the improperly configured properties via a user interface.

With respect to the preceding computing device, a tag of the first or second sets of tags includes the algorithm.

With respect to the preceding computing device, the graph module analyzes the graph data structure by traversing the graph data structure to construct a graphical view of the graph data structure, and the user interface module presents the one or more views comprises presenting the graphical view of the graph data structure via a user interface.

The preceding computing device further comprises a rules engine that executes a rule defining an algorithm to identify one or more tags of the first, second, or both the first and second sets of tags that define improperly configured properties, wherein the user interface module presents an error message that warns the user of the error and identifies the one or more tags that define the improperly configured properties via a user interface.

With respect to the preceding computing device, the graph module analyzes the graph data structure by traversing the graph data structure to construct a graphical view of the graph data structure, and the user interface module presents the one or more views by presenting with the network configuration tool the graphical view of the graph data structure via a user interface.

With respect to the preceding computing device, the plurality of network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway.

With respect to the preceding computing device, each of the first and second sets of historical archive files stores at least the first and second sets of configuration information as first and second raw data files, and the first and second sets of tags as first and second tag files, and this computing device further comprises a module that maintains a database in accordance with a database schema that defines a plurality of objects and at least one relationship between the objects, wherein the plurality of objects include a first object defining a structure by which the database stores each of the archive files from the first and second sets, a second object defining a structure by which the database stores the tag files, and a third object defining a structure by which the database stores information related to the plurality of devices.

With respect to the preceding computing device, the graph module analyzes the graph data structure to determine one or more views by analyzing the graph data structure in real-time to dynamically determine a view based on a Hilbert curve, the Hilbert view including any tag of the first, second, or both the first and second sets of tags that identify an IP address configuration property, and the user interface module presents the one or more views by presenting the Hilbert view with the network configuration tool via a user interface to enable the user to compare the tags from the first, second, or both the first and second historical sets of archive files.

In another embodiment, a computer-readable medium comprises instructions for causing a programmable processor to receive with a network configuration tool included within a computing device a selection of network devices, wherein the selection identifies a first network device from a first vendor and a second network device from a second vendor and determine for the first and second network devices respective first and second historical sets of archive files, wherein each archive file of the first historical set of archive files stores a first set of tags parsed from a first set of configuration information stored to the first network device at some point in time and each archive file of the historical second set of archive files stores a second set of tags that are parsed from a second set of configuration information stored to the second network device at some point in time. The instructions also cause the programmable processor to construct with the network configuration tool a graph data structure from the first and second sets of tags, analyze the graph data structure to determine one or more views associated with the data structure, and present with the network configuration tool the one or more views associated with the data structure to a user to enable the user to view at least a portion of the first and second sets of configuration information from the respective first and second network devices, wherein each of the tags of the first and second sets of tags defines a configuration property for the respective first and second network devices.

In another embodiment, a method comprises determining, with a network configuration tool executing within a computing device, a relationship between a first tag and a second tags, wherein the first and second tags each define a configuration property associated with a first and a second network device of first and second vendors respectively, presenting, with the network configuration tool, aggregate configuration information in a manner that organizes first and second sets of configuration information based primarily on the determined relationships between the first and second tags and secondarily on the network devices from which the first and second sets of configuration information was received and receiving, with the network configuration tool, a first input that specifies a first change to the first tag associated with the first network device from the first vendor. The method further comprises receiving, with the network configuration tool, a second input that specifies a second change to the second tag associated with the second network device from the second vendor, connecting, with the network configuration tool, to the first network device, wherein the first network device stores the first set of configuration information, and updating, with the network configuration tool, the first set of configuration information stored to the first network device in accordance with the first change to the first tag by interfacing with a first management software interface presented by the first network device. The method further comprises connecting, with the network configuration tool, to the second network device, wherein the second network device stores the second set of configuration information, and updating, with the network configuration tool, the second set of configuration information stored to the second network device in accordance with the second change to the second tag by interfacing with a second management software interface presented by the second network device.

In the preceding method, determining the relationship between the first and second tags comprises the network configuration tool determining whether the first tag and the second tag are of a same kind of tag, and when the first and second tags are of the same kind of tag, the network configuration tool determining that the first tag and second tag each define similar configuration properties that are comparable, and presenting the aggregate configuration information comprise, when the first and second tags are of the same kind of tag, organizing the first and second tags based primarily on the kind and secondarily on the network devices from which the first and second sets of configuration information were received.

In the preceding method, connecting to the first network device comprises connecting to the first network device in accordance with one of a hyper text transfer protocol (HTTP), a secure shell (SSH) protocol, a extensible markup language (XML) based network management (XNM) protocol, a simple network management protocol (SNMP), and a telecommunication network (TELNET) protocol, and connecting to the second network device comprises connecting to the second network device in accordance with one of the hyper text transfer protocol (HTTP), the secure shell (SSH) protocol, a extensible markup language (XML) based network management (XNM) protocol, a simple network management protocol (SNMP), and the telecommunication network (TELNET) protocol.

In the preceding method, updating the first set of configuration information includes issuing a first vendor-specific command to the management software interface presented by the first network device to push the first change to the first set of configuration information, and updating the second set of configuration information includes issuing a second vendor-specific command to the management software interface presented by the second network device to push the second change to the second set of configuration information.

In the preceding method, updating the first set of configuration information comprises executing a first generator that updates the first set of configuration information in accordance with the first change to the first tag, and updating the second set of configuration information comprises executing with the network configuration tool a second generator that updates the second set of configuration information in accordance with the second change to the second tag.

In the preceding method, the first and second generators comprise respective first and second independent software modules defined in accordance with a programming language, and executing the first and second generators includes providing within the network configuration tool an execution environment in which the first and second independent software modules execute to generate first and second vendor-specific commands to update the first and second sets of configuration information in accordance with the first and second changes.

The preceding method further comprises receiving, upon establishing the connection with the first device, identifying information from the first network device that identifies a type of the first network device and a type of the management software interface presented by the first network device, and determining, based on the identifying information, whether to execute the first or the second generator to update the first set of configuration information.

The preceding method further comprises presenting, with the network configuration tool, a first message indicating a status of the update to the first set of configuration information, and presenting, with the network configuration tool, a second message indicating a status of the update to the second set of configuration information.

In the preceding method, the first and second network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway.

In the preceding method, the first and second tags each further define a name of the respective first and second tag, a kind that identifies a category of similar tags, a context that identifies other tags from which each of the first and second tags depend, and a reference that identifies a file to which each of the respective first and second sets of configuration information are stored.

In another embodiment, a computing device comprises a control unit that includes a network configuration tool to manage a plurality of network devices from different vendors. The network configuration tool comprises a module that determines a relationship between a first tag and a second tags, wherein the first and second tags each define a configuration property associated with a first and a second network device of first and second vendors respectively, and a user interface module that presents aggregate configuration information in a manner that organizes first and second sets of configuration information based primarily on the determined relationships between the first and second tags and secondarily on the network devices from which the first and second sets of configuration information was received and presents a user interface to receive a first input that specifies a first change to the first tag associated with the first network device from the first vendor and receive a second input that specifies a second change to the second tag associated with the second network device from the second vendor. The network configuration tool further comprises a management interface module that connects to the first network device and the second network device, wherein the first network device stores a first set of configuration information and the second network device stores a second set of configuration information, and a generator engine that updates the first set of configuration information stored to the first network device in accordance with the first change to the first tag by interfacing with a first management software interface presented by the first network device and updates the second set of configuration information stored to the second network device in accordance with the second change to the second tag by interfacing with a second management software interface presented by the second network device.

With respect to the preceding computing device, the module determines the relationship between the first and second tags by determining whether the first tag and the second tag are of a same kind of tag, and when the first and second tags are of the same kind of tag, determining that the first tag and second tag each define similar configuration properties that are comparable, and the user interface module presents the aggregate configuration information by organizing, when the first and second tags are of the same kind of tag, the first and second tags based primarily on the kind and secondarily on the network devices from which the first and second sets of configuration information were received.

With respect to the preceding computing device, the management interface module connects to the first and second network device by connecting to the first and second network device each in accordance with one of a hyper text transfer protocol (HTTP), a secure shell (SSH) protocol, a extensible markup language (XML) based network management (XNM) protocol, a simple network management protocol (SNMP), and a telecommunication network (TELNET) protocol.

With respect to the preceding computing device, the generator engine updates the first set of configuration information by issuing a first vendor-specific command to the management software interface presented by the first network device to push the first change to the first set of configuration information, and the generator engine updates the second set of configuration information by issuing a second vendor-specific command to the management software interface presented by the second network device to push the second change to the second set of configuration information.

With respect to the preceding computing device, the generator engine updates the first set of configuration information by executing a first generator that updates the first set of configuration information in accordance with the first change to the first tag, and the generator engine updates the second set of configuration information comprises executing with the network configuration tool a second generator that updates the second set of configuration information in accordance with the second change to the second tag.

With respect to the preceding computing device, the first and second generators comprise respective first and second independent software modules defined in accordance with a programming language, and the generator engine executes the first and second generators by providing within the network configuration tool an execution environment in which the first and second independent software modules execute to generate first and second vendor-specific commands to update the first and second sets of configuration information in accordance with the first and second changes.

With respect to the preceding computing device, the management interface module receives, upon establishing the connection with the first device, identifying information from the first network device that identifies a type of the first network device and a type of the management software interface presented by the first network device, and the generator engine determines, based on the identifying information, whether to execute the first or the second generator to update the first set of configuration information.

With respect to the preceding computing device, the user interface module presents a user interface to display a first message indicating a status of the update to the first set of configuration information and a second message indicating a status of the update to the second set of configuration information.

With respect to the preceding computing device, the plurality of network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway.

With respect to the preceding computing device, the first and second tags each further define a name of the respective first and second tag, a kind that identifies a category of similar tags, a context that identifies other tags from which each of the first and second tags depend, and a reference that identifies a file to which each of the respective first and second sets of configuration information are stored.

In another embodiment, a computer-readable medium comprises instructions for causing a programmable processor to determine, with a network configuration tool executing within a computing device, a relationship between a first tag and a second tags, wherein the first and second tags each define a configuration property associated with a first and a second network device of first and second vendors respectively, present, with the network configuration tool, aggregate configuration information in a manner that organizes first and second sets of configuration information based primarily on the determined relationships between the first and second tags and secondarily on the network devices from which the first and second sets of configuration information was received and receive, with a network configuration tool, a first input that specifies a first change to the first tag associated with the first network device from the first vendor. The instructions further cause the programmable processor to receive, with the network configuration tool, a second input that specifies a second change to the second tag associated with the second network device from the second vendor, connect, with the network configuration tool, to the first network device, wherein the first network device stores a first set of configuration information and update, with the network configuration tool, the first set of configuration information stored to the first network device in accordance with the first change to the first tag by interfacing with a first management software interface presented by the first network device. The instructions also cause the programmable processor to connect, with the network configuration tool, to the second network device, wherein the second network device stores a second set of configuration information, and update, with the network configuration tool, the second set of configuration information stored to the second network device in accordance with the second change to the second tag by interfacing with a second management software interface presented by the second network device.

In another embodiment, a method to manage a plurality of network devices from different vendors comprises receiving, with a vendor-independent network configuration tool included within a computing device, input from a user specifying at least one sharing policy, wherein the sharing policy defines a scope of information that the network configuration tool shares with other vendor-independent network configuration tools executing within other computing devices, determining, with the vendor-independent network configuration tool, the other computing devices executing the other vendor-independent network configuration tools in accordance with a discovery protocol, connecting, with the vendor-independent network configuration tool, to one of the other computing devices in accordance with an Authentication, Authorization and Accounting (AAA) protocol, and exchanging the information in accordance with the at least one sharing policy, wherein the information includes one or more of a tagger, a generator, or a tag.

In the preceding method, receiving the input comprises receiving input specifying at least one sharing policy that governs how information determined from configuration information stored on a plurality of border network devices of different networks is shared between the network devices, each of the networks operated by a separate entity.

In the preceding method, the discovery protocol comprises a service location protocol.

The preceding method further comprises logging the exchange of information to a share log.

In the preceding method, the tagger comprises an independent software module that is defined in accordance with one of a plurality of programming languages and parses the tag from a set of configuration information stored to and extracted from one of the plurality of network devices, the generator comprises another independent software module that is defined in accordance with one of the plurality of programming languages and generates vendor-specific commands to push a change to the tag from the vendor-independent network configuration tool to the set of configuration information stored to the one of the plurality of network devices, and the tag comprises a name, a kind that identifies a category of similar tags, a context that identifies other tags from which each of the first and second sets of tags depend, and a reference that identifies a file to which each of the respective first and second sets of configuration information are stored, wherein the kind and name combined represent a single configuration property.

In the preceding method, the information further comprises meta data associated with the extraction of the set of configuration information, wherein the meta data includes one or more of a timestamp, a log message, a package name, a package timestamp, a snapshot identifier, and a user, and raw data files that store the set of configuration information extracted from the one of the plurality of network devices.

In the preceding method, the plurality of network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway.

In another embodiment, a computing device comprises a control unit that executes a network configuration tool to manage a plurality of network devices from different vendors. The network configuration tool comprises a user interface module that presents a user interface to receive input from a user specifying at least one sharing policy, wherein the sharing policy defines a scope of information that the network configuration tool shares with other vendor-independent network configuration tools executing within other computing devices, a management software interface that interfaces with the plurality of network devices to manage configuration information stored to the plurality of network devices, at least two of the plurality of network devices from different vendors, and an exchange module that determines the other computing devices executing the other vendor-independent network configuration tools in accordance with a discovery protocol, connects to one of the other computing devices in accordance with an Authentication, Authorization and Accounting (AAA) protocol, and exchanges the information in accordance with the at least one sharing policy, wherein the information includes one or more of a tagger, a generator, or a tag.

With respect to the preceding computing device, the user interface module receives the input by receiving input specifying at least one sharing policy that governs how information determined from configuration information stored on a plurality of border network devices of different networks is shared between the network devices, each of the networks operated by a separate entity.

With respect to the preceding computing device, the discovery protocol comprises a service location protocol.

The preceding computing device further comprises a logger to log the exchange of information to a share log.

With respect to the preceding computing device, the tagger comprises an independent software module that is defined in accordance with one of a plurality of programming languages and parses the tag from a set of configuration information stored to and extracted from one of the plurality of network devices, the generator comprises another independent software module that is defined in accordance with one of the plurality of programming languages and generates vendor-specific commands to push a change to the tag from the vendor-independent network configuration tool to the set of configuration information stored to the one of the plurality of network devices, and the tag comprises a name, a kind that identifies a category of similar tags, a context that identifies other tags from which each of the first and second sets of tags depend, and a reference that identifies a file to which each of the respective first and second sets of configuration information are stored, wherein the kind and name combined represent a single configuration property.

With respect to the preceding computing device, the information further comprises meta data associated with the extraction of the set of configuration information, wherein the meta data includes one or more of a timestamp, a log message, a package name, a package timestamp, a snapshot identifier, and a user, and raw data files that store the set of configuration information extracted from the one of the plurality of network devices.

With respect to the preceding computing device, the plurality of network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway.

In another embodiment, a computer-readable medium comprises instructions for causing a programmable processor to receive, with a vendor-independent network configuration tool included within a computing device, input from a user specifying at least one sharing policy, wherein the sharing policy defines a scope of information that the network configuration tool shares with other vendor-independent network configuration tools executing within other computing devices, determine, with the vendor-independent network configuration tool, the other computing devices executing the other vendor-independent network configuration tools in accordance with a discovery protocol, connect, with the vendor-independent network configuration tool, to one of the other computing devices in accordance with an Authentication, Authorization and Accounting (AAA) protocol, and exchange the information in accordance with the at least one sharing policy, wherein the information includes one or more of a tagger, a generator, or a tag.

Various embodiments of the invention have been described. These and other embodiments are within the scope of the following claims.

The invention claimed is:

1. A method comprising:

connecting, with a computing device that executes a network configuration tool, to a first network device from a first vendor, wherein the first network device stores a first set of configuration information;

adaptively extracting, with the network configuration tool, the first set of configuration information stored to the first network device by issuing vendor-specific commands to and receiving, in response to the commands, the first set of configuration information from a first management software interface presented by the first network device;

parsing, with the network configuration tool, from the first set of configuration information a first tag, wherein the first tag defines a configuration property for the first network device;

connecting, with the computing device, to a second network device from a second vendor, wherein the second network device stores a second set of configuration information;

adaptively extracting, with the network configuration tool, the second set of configuration information stored to the second network device by issuing commands to and receiving, in response to the commands, the second set of configuration information from a second management software interface presented by the second network device;

parsing, with the network configuration tool, from the second set of configuration information a second tag, wherein the second tag defines a configuration property for the second network device;

determining, with the network configuration tool, whether the first tag and the second tag are of a same kind of tag;

when the first and second tags are of the same kind of tag, determining that the first tag and second tag each define similar configuration properties that are comparable with the network configuration tool; and when the first and second tags are of the same kind of tag, presenting, with the network device, aggregate configuration information in a manner that organizes the first and second tags based primarily on the kind and second tags and secondarily on the network devices from which the first and second sets of configuration information was received.

2. The method of claim 1, wherein connecting to the first network device comprises connecting to the first network device in accordance with one of a hyper text transfer protocol (HTTP), a secure shell (SSH) protocol, a extensible markup language (XML) based network management (XNM) protocol, a simple network management protocol (SNMP), and a telecommunication network (TELNET) protocol, wherein adaptively extracting the first set of configuration information comprises receiving the first set of configuration information as text-based configuration information via the connection to the first network device, wherein connecting to the second network device comprises connecting to the second network device in accordance with one of the hyper text transfer protocol (HTTP), the secure shell (SSH) protocol, a extensible markup language (XML) based network management (XNM) protocol, a simple network management protocol (SNMP), and the telecommunication network (TELNET) protocol, and wherein adaptively extracting the second set of configuration information comprises receiving the first set of configuration information as text-based configuration information via the connection to the first network device.

3. The method of claim 1, wherein adaptively extracting the first set of configuration information includes:

retrieving a first command from a memory of the network configuration tool in response to a user selecting to connect to the first network device;

issuing the first command with the network configuration tool to the management software interface presented by the first network device;

in response to the first command, receiving with the network configuration tool a first portion of the first set of configuration information;

parsing, with the network configuration tool, from the first portion the first tag; and based on the first tag, retrieving a second command from the memory of the network configuration tool, issuing the second command to the management software interface presented by the first network device; and in response to the second command, receiving with the network configuration tool a second portion of the first set of configuration information, and wherein adaptively extracting the second set of configuration information includes:

retrieving a third command from the memory in response to the user selecting to connect to the second network device;

issuing the third command to the management software interface presented by the second network device;

in response to the third command, receiving with the network configuration tool a third portion of the second set of configuration information;

parsing, with the network configuration tool, from the third portion the second tag; and based on the second tag, retrieving a fourth command from the memory, issuing the fourth command to the management software interface presented by the second network device; and in response to the fourth command, receiving with the network configuration tool a fourth portion of the first set of configuration information.

4. The method of claim 1, wherein parsing the first tag comprises executing with the network configuration tool a first tagger that parses the first tag from at least a portion of the adaptively extracted first set of configuration information, wherein parsing the second tag comprises executing with the network configuration tool a second tagger that parses the second tag from at least a portion of the adaptively extracted second set of configuration information, wherein the first and second taggers comprise respective first and second independent software modules defined in accordance with a programming language, and wherein executing the first and second taggers includes providing within the network configuration tool an execution environment in which the first and second independent software modules execute to parse the respective first and second tags form the first and second sets of configuration information.

5. The method of claim 4, further comprising:
maintaining with the network configuration tool a hierarchical directory structure to store a plurality of taggers in an increasing device-specificity from higher to lower levels of the hierarchy, wherein each directory of the hierarchical directory structure stores one or more commands for interfacing with either of the first and second management software interfaces;
receiving from either a user or another network configuration tool the first tagger;
storing the first tagger to the hierarchical directory structure to associate the first tag with one of the commands such that the first tagger is stored to one of the directories that includes one of the commands to extract from the first management software interface the portion of the first set of configuration information for which the first tagger is executed to parse the first tag;
receiving, upon establishing the connection with the first device, identifying information from the first network device that identifies a type of the first network device and a type of the management software interface presented by the first network device; and
determining, based on the identifying information, whether to execute the first or the second tagger to parse the first tag from the first set of configuration information.

6. The method of claim 1, wherein the first and second tags each further define a name of the respective first and second tag, a kind that identifies a category of similar tags, a context that identifies other tags from which each of the first and second tags depend, and a reference that identifies a file to which each of the respective first and second sets of configuration information are stored.

7. The method of claim 1, wherein the first and second tags are stored to respective first and second archives files stored in the memory, the method further comprising:
storing the first and second sets of configuration information as raw data files to the respective first and second archive files; and
storing meta data associated with the extraction of the first and second sets of configuration information to the respective first and second archive files, wherein the meta data includes one or more of a timestamp, a log message, a package name, a package timestamp, a snapshot identifier, and a user.

8. The method of claim 1,
wherein the first and second network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway, and
wherein the memory comprises a database,
wherein storing the first and second tags comprises storing the first and second tags in accordance with a JavaScript Object Notation (JSON) file format, and
wherein parsing the first and second tags includes parsing each of the first and second tags by utilizing one or more of an eXtensible Markup Language (XML) Path (XPath) language, a regular expression, and tokens and pattern matching.

9. A computing device comprising:
a control unit comprising a processor that executes a network configuration tool to manage a plurality of network devices from different vendors, the network configuration tool comprising:
a management interface module that connects to first and second network devices of the plurality of network devices, wherein the first network device is from a first vendor and stores a first set of configuration information, and the second network device is from a second vendor and stores a second set of configuration information;
an extraction module that adaptively extracts the first and second sets of configuration information stored to the respective first and second network devices, interfaces with first and second management software interfaces presented by the first and second network devices, parses from the first and second sets of configuration information respective first and second tags, and stores the stores the first and second tags to a database, wherein the first tag defines a configuration property for the first network device and the second tag defines a configuration property for the second network device;
a graph module that determines whether the first tag and the second tag are of a same kind of tag, and when the first and second tags are of the same kind of tag, determines that the first tag and second tag each define similar configuration properties that are comparable; and
a user interface module that presents aggregate configuration information in a manner that organizes, when the first and second tags are the same kind of tag, the first and second tags based primarily on the kind and secondarily on the network devices from which the first and second sets of configuration information was received.

10. The computing device of claim 9,
wherein the management interface module further connects to the first and second network devices each in accordance with one of a hyper text transfer protocol (HTTP), a secure shell (SSH) protocol, a extensible markup language (XML) based network management (XNM) protocol, a simple network management protocol (SNMP), and a telecommunication network (TELNET) protocol, and
wherein the extraction module further receives the first set, the second set, or both the first and second sets of configuration information as text-based configuration information via the connections to the first and second network devices.

11. The computing device of claim 9,
wherein the extraction module further:
retrieves a first command from a memory of the network configuration tool in response to a user selecting to connect to the first network device;
issues the first command with the network configuration tool to the management software interface presented by the first network device;
in response to the first command, receives a first portion of the first set of configuration information;
parses from the first portion the first tag; and
based on the first tag, retrieves a second command from the memory of the network configuration tool,
issues the second command to the management software interface presented by the first network device; and
in response to the second command, receives a second portion of the first set of configuration information, and wherein the extraction module also:
retrieves a third command from the memory in response to the user selecting to connect to the second network device;
issues the third command to the management software interface presented by the second network device;
in response to the third command, receives a third portion of the second set of configuration information;
parses from the third portion the second tag; and
based on the second tag, retrieves a fourth command from the memory, issues the fourth command to the management software interface presented by the second network device; and
in response to the fourth command, receives a fourth portion of the first set of configuration information.

12. The computing device of claim 9,
wherein the extraction module further executes a first tagger that parses the first tag from at least a portion of the adaptively extracted first set of configuration information tag, and
wherein the extraction module also executes a second tagger that parses the second tag from at least a portion of the adaptively extracted second set of configuration information.

13. The computing device of claim 12,
wherein the first and second taggers comprise respective first and second independent software modules defined in accordance with a programming language, and
wherein the extraction module further provides an execution environment in which the first and second independent software modules execute to parse the respective first and second tags form the first and second sets of configuration information,
wherein the extraction module maintains a hierarchical directory structure to store a plurality of taggers in an increasing device-specificity from higher to lower levels of the hierarchy, wherein each directory of the hierarchical directory structure stores one or more commands for interfacing with either of the first and second management software interfaces, and
wherein the extraction module further receives from either a user or another network configuration tool the first tagger and stores the first tagger to the hierarchical directory structure to associates the first tag with one of the commands such that the first tagger is stored to one of the directories that includes one of the commands to extract from the first management software interface the portion of the first set of configuration information for which the first tagger is executed to parse the first tag.

14. The computing device of claim 12, further comprising:
wherein the management interface module receives, upon establishing the connection with the first device, identifying information from the first network device that identifies a type of the first network device and a type of the management software interface presented by the first network device, and
wherein the extraction module determines, based on the identifying information, whether to execute the first or the second tagger to parse the first tag from the first set of configuration information.

15. The computing device of claim 9,
wherein the first and second tags each define a name of the respective first and second tag, a kind that identifies a category of similar tags, a context that identifies other tags from which each of the first and second tags depend, and a reference that identifies a file to which each of the respective first and second sets of configuration information are stored, and
wherein the extraction module stores the first and second tags to respective first and second archives files stored in the memory, the first and second sets of configuration information as raw data files to the respective first and second archive files, and meta data associated with the extraction of the first and second sets of configuration information to the respective first and second archive files, wherein the meta data includes one or more of a timestamp, a log message, a package name, a package timestamp, a snapshot identifier, and a user.

16. The computing device of claim 9,
wherein the plurality of network devices each comprise one of a router, a wireless access point, a Dynamic Host Configuration Protocol (DHCP) server, a Domain Name System (DNS) server, a Digital Subscriber Line Access Multiplexer (DSLAM), a border gateway controller, a gateway, and an application layer gateway,
wherein the memory comprises a database, and
wherein the extraction module stores the first and second tags in accordance with a JavaScript Object Notation (JSON) file format.

17. The computing device of claim 9, wherein the extraction module, to parse each of the first and second tags, utilizes one or more of an eXtensible Markup Language (XML) Path (XPath) language, regular expressions, and tokens and pattern matching.

18. A non-transitory computer-readable medium comprising instructions for causing a programmable processor to:
connect, with a computing device that includes a network configuration tool, to a first network device from a first vendor, wherein the first network device stores a first set of configuration information;
adaptively extract, with the network configuration tool, the first set of configuration information stored to the first network device by interfacing with a first management software interface presented by the first network device;
parse, with the network configuration tool, from the first set of configuration information a first tag;
connect, with the computing device, to a second network device from a second vendor, wherein the second network device stores a second set of configuration information;
adaptively extract, with the network configuration tool, the second set of configuration information stored to the second network device by interfacing with a second management software interface presented by the second network device;
parse, with the network configuration tool, from the second set of configuration information a second tag;
determine whether the first tag and the second tag are of a same kind of tag;
when the first and second tags are of the same kind of tag, determining that the first tag and second tag each define similar configuration properties that are comparable with the network configuration tool; and
when the first and second tags are of the same kind of tag, present aggregate configuration information in a manner that organizes the first and second tags based primarily on the kind and secondarily on the network devices from which the first and second sets of configuration information was received.

* * * * *